INVENTOR.
JOHN M. HUNT

Jan. 16, 1968  J. M. HUNT  3,364,343
APPARATUS TO FURNISH INSTANTANEOUS VEHICLE POSITION IN
TERMS OF LATITUDE AND LONGITUDE COORDINATES
Filed April 30, 1959  11 Sheets-Sheet 2

INVENTOR.
JOHN M. HUNT
BY
ATTORNEY $$X = -\tan\left(\frac{90-L}{2}\right)\sin\lambda$$

$$Y = \tan\left(\frac{90-L}{2}\right)\cos\lambda$$

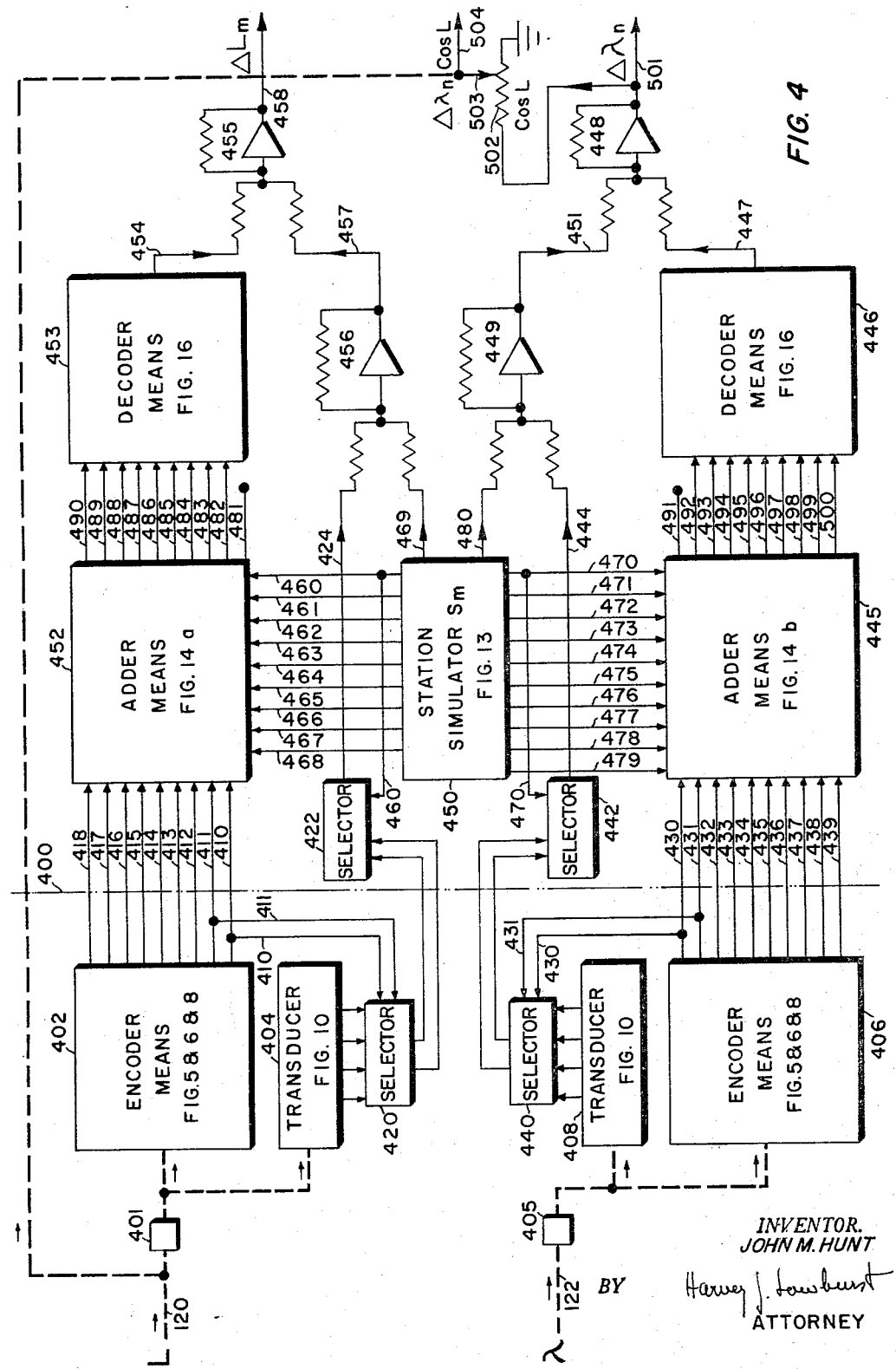

Jan. 16, 1968  J. M. HUNT  3,364,343
APPARATUS TO FURNISH INSTANTANEOUS VEHICLE POSITION IN
TERMS OF LATITUDE AND LONGITUDE COORDINATES
Filed April 30, 1959  11 Sheets-Sheet 8

INVENTOR
JOHN M. HUNT

BY Harvey S. Lowhurst
ATTORNEY

Jan. 16, 1968  J. M. HUNT  3,364,343
APPARATUS TO FURNISH INSTANTANEOUS VEHICLE POSITION IN
TERMS OF LATITUDE AND LONGITUDE COORDINATES
Filed April 30, 1959  11 Sheets-Sheet 10
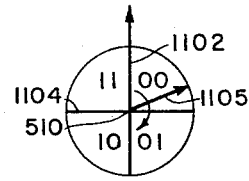
FIG. 11a
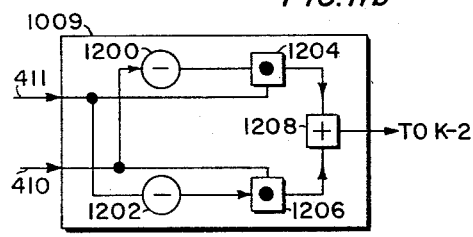
FIG. 11b
FIG. 12
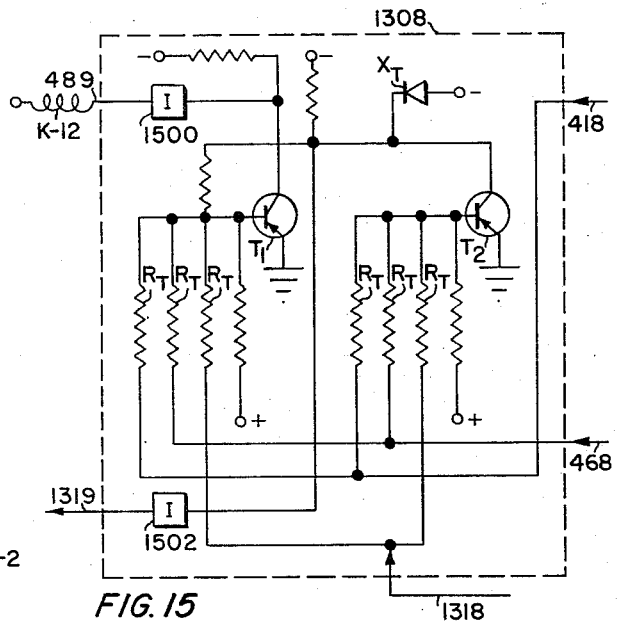
FIG. 15
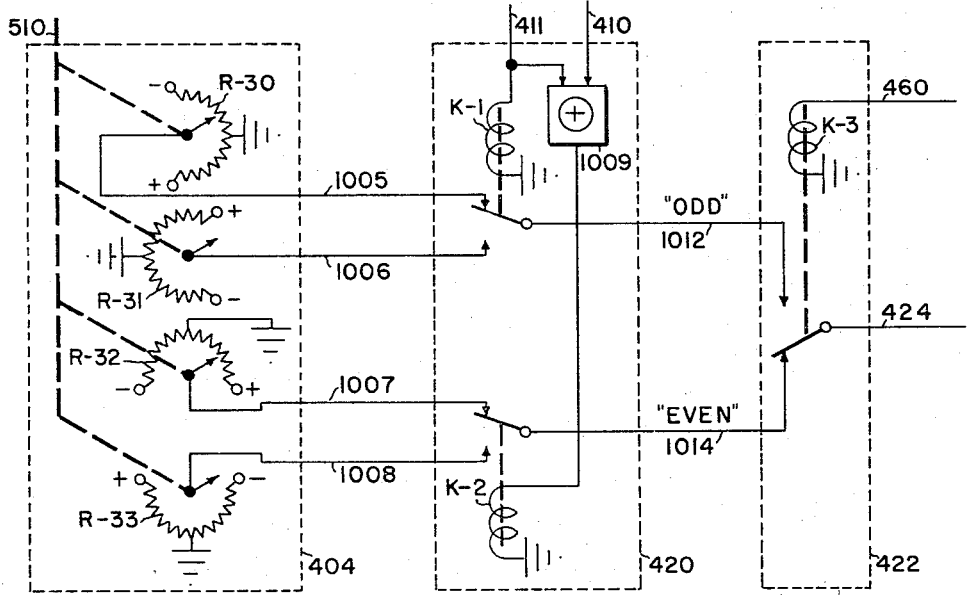
FIG. 10
INVENTOR.
JOHN M. HUNT
BY
Harvey J. Lowhurst
ATTORNEY

INVENTOR.
JOHN M. HUNT

BY Harvey G. Lowhurst

ATTORNEY

United States Patent Office 3,364,343
Patented Jan. 16, 1968

3,364,343
APPARATUS TO FURNISH INSTANTANEOUS VEHICLE POSITION IN TERMS OF LATITUDE AND LONGITUDE COORDINATES
John M. Hunt, Palo Alto, Calif., assignor to General Precision Systems Inc., a corporation of Delaware
Filed Apr. 30, 1959, Ser. No. 810,173
39 Claims. (Cl. 235—150.271)

This invention relates to data processing apparatus and, more particularly, to a data processing apparatus for arithmetically operating upon computer quantities and deriving their sum or their difference. This invention also relates to data processing apparatus for converting input quantities commensurate with a developable coordinate system into output quantities commensurate with a non-developable coordinate system and arithmetically operating thereon to derive their sum or their difference. The term non-developable is well known to those skilled in the map projection art and refers to surfaces, such as a sphere, which cannot be spread out in a plane without some stretching or tearing.

Computer designers are often faced with the problem of providing a computer means for deriving the sum or the difference between two computer input quantities. If the desired resolution is much in excess of 1000:1, physical limitations such as electrical signal-to-noise ratio, component tolerances, mechanical back lash, resolution and indicator or control reliability may make conventional analog computers unsuitable or uneconomical. Reduction of these physical limitations beyond certain levels can only be accomplished at inordinate cost and complexity. Faced with a problem of this kind, the computer designer commonly thinks in terms of pure digital computation. While digital computation may be suitable for the solution of such problems, the existing state of the art is such that it appears to be impossible to develop a simplified digital computer which is comparative with analog techniques from a standpoint of cost and simplicity of maintenance.

While the data processing apparatus of this invention may be utilized for arithmetically operating upon any set of computer quantities, particularly where the desired resolution of the sum and difference exceeds 1000:1, the invention will be described with special emphasis on world-wide navigation problems. The reason for such a choice is that navigation problems involve two degrees of freedom, that is latitude and longitude, and thereby serve to illustrate that the data processing apparatus of this invention is suitable for problems involving more than one degree of freedom. Also, navigation problems are usually referenced to the surface of a sphere, a non-developable coordinate system, and therefore are admirably suited to serve as an illustrative example of how the data processing apparatus of this invention may be employed for transforming to a developable coordinate system. Furthermore, navigation problems involve distances up to 120,000,000 feet and often, when two objects are close to one another, may require output quantities of the order of 100 feet, so that a resolution of 1,000,000:1 is desired.

Among other applications of the data processing apparatus of this invention are the solution of such problems as computing the dimensional change of a structural member having different coefficients of expansion. The desirable resolution for deriving the composite or equivalent coefficients of expansion may be of the order of 100,000:1. Similarly, volumetric changes of substances due to expansion or evaporation often require great resolution. Other problems which may be solved with the data processing apparatus of this invention may involve such phenomena as temperature coefficients of resistance, changes of fine structure lines exhibited by atomic or molecular action, etc.

Accordingly, the data processing apparatus of this invention may be provided with input data commensurate with the motion of a navigable vehicle and may be operative to provide output quantities commensurate with the distance of said vehicle from one or more reference points. Furthermore, while the data processing apparatus of this invention is capable for use in conjunction with problems relating and incident to navigation of actual vehicles, the invention is most suitable for the computation and indication of the path and location of simulated vehicles, such as simulated aircraft and simulated marine craft, with respect to latitude and longitude and, further, to the computation and indication of a simulated vehicle with respect to one or more reference points in terms of differences of latitude or longitude.

The speed and range capabilities of both aircraft and marine craft have increased to such an extent within recent years that navigation problems now commonly involve much longer distances than heretofore, and precise long range navigation requires consideration of various factors which may be approximated or neglected in short range navigation. Numerous contemporary simulator navigation systems employ a rectangular mileage reference system, which inherently assumes that the earth is flat. Utilizing such a system, an aircraft beginning at 30 degrees north latitude and first flying 800 miles at 90 degrees true heading (east), then 800 miles at 360 degrees true heading (north), then 800 miles at 270 degrees true heading (west) and finally 800 miles at 180 degrees true heading (south) will fly a closed square, with the aircraft returning to the starting point. If such a flight is attempted in an actual aircraft, the aircraft will, at the end of the flight, arrive at a point more than 150 miles west of the starting point. Such an apparent anomaly arises due to convergence of the meridians.

Various methods have been devised to overcome this particular problem in prior art flight simulation navigation systems. The instructor may artificially modify the simulated magnetic variation input to the system to correct for meridian convergence, but this is a complex and tedious task. Alternatively, additional computer elements may be introduced to modify the aircraft's computed progress over the earth's surface or to modify the mathematical significance of certain directional computations. Such expedients, however, are little more than stopgaps which attempt to correct basic errors in an unsuitable coordinate reference system. It should be understood, however, that the contemporary systems introduce negligible errors for smaller distance differences, of the order of 150 miles or less.

Use of the contemporary rectangular reference system also renders accurate map plotting difficult, since commonly used map projections are more rigorous mathematically than the simple rectangular array used in the contemporary navigation systems. For example, a group of Lambert conformal charts commonly used for aircraft navigational purposes within the continental limits of the United States is projected on a reference system employing 33 degrees and 45 degrees north latitude as the standard parallels. Appreciable errors in the mileage scale arise in the regions appreciably south of 33 degrees and appreciably north of 45 degrees. Scaling errors are greater than 2 percent in Southern Florida, for example.

While individual points are accurately positioned (within the limitations of the map-making and map reproducing arts) with respect to the latitude and longitude coordinates of the charts, the variation in mileage scale over the entire chart area presents serious problems from a computer standpoint if an attempt is made to employ these charts for accurate position plotting in a flight simulator. The corresponding errors in Lambert charts employing standard parallels 37 degrees and 65 degrees are even more objectionable.

Furthermore, presetting of the geographical location of reference points such as navigational facilities or stations is a time-consuming problem for the operator. Establishment of a continuous trip covering a distance greater than 800 miles or so requires considerable operator effort to synchronize the computation and plotting systems when a new chart is installed and the computer system is reset. Shortcomings of the rectangular array become increasingly apparent when flight is attempted north or south of the central latitude zones. The conventional east/west-north/south computation system becomes virtually worthless for polar travel unless major modifications are switched in for polar travel; and even if the rectangular reference system is modified for polar travel, serious anomalies may arise during transition from polar area travel to sub-polar area travel and vice versa.

A number of navigational data processing systems, including flight simulators, require that the computer establish the craft position with respect to both near objects and far objects. For example, while being required to compute and plot simulated flights over the entire earth's surface, a flight simulator should still be capable of establishing aircraft position within somewhat less than 100 feet in order to simulate properly the operation of an instrument landing system or a Ground-Controlled Approach landing system. Since the circumference of the earth is approximately 120 million feet, it is apparent that prior art computers must be capable of resolving signals over a range of at least a million to one. Such resolution is approximately one thousand times as good as is obtainable in most commercial analog computer components.

It is therefore immediately apparent that for long range flight, a computer must provide output data of the instantaneous vehicle position in terms of longitude and latitude. Such a computer has the additional advantage of providing output data which may be utilized with any one of the well known conventional common recording apparatus which transform latitude and longitude data into chart projection data such as Mercator projection, stereographic polar projection, Lambert azimuth equal area projection, or any of the many other projections employed by map makers.

When attempting to provide a universal system for navigation, it is desirable to derive the distance between the instantaneous position of the vehicle and one or more navigational facilities or stations. Since both the instantaneous position of the vehicle and the station are given in terms of longitude and latitude, the desired difference therebetween is computed by subtracting the two longitudes and the two latitude from one another. If the aircraft and the station are a long distance from one another, the distance in miles between the vehicle and the station is equal to the arc of the great circle connecting them. In order to obtain the distance and the bearing, spherical trigonometry must be used, as is well known to those skilled in the art. It is therefore desirable to provide a computer which provides the difference between the two stations in terms of differences in latitude and longitude. If the vehicle and the station are very close to one another, say within 80 miles or so, the distance and the bearing might be obtained without resort to spherical trigonometry. Of course, the closeness of the station implies the subtraction of two latitudes and longitudes which are substantially equal and differ only in their absolute value by their least significant digits. Consequently, a computer providing a difference having the same accuracy as that of the station location or the instantaneous position of the vehicle is necessary.

It is therefore an object of this invention to provide a data processing apparatus capable of furnishing data of the instantaneous position of a simulated vehicle in terms of latitude and longitude coordinates.

It is another object of this invention to provide a data processing apparatus capable of furnishing data of the instantaneous position of a simulated vehicle with respect to one or more stations in terms of differences of latitude and longitude coordinates therewith.

It is another object of this invention to provide a data processing apparatus which is responsive to north-south ground speed and the east-west ground speed of a navigable craft which is operative to provide positional data of said navigable craft in terms of longitude and latitude coordinates or in terms of differences in longitude and latitude coordinates with respect to one or more stations, or both.

It is another object of this invention to provide a longitude-latitude computer which furnishes data of the instantaneous position of a simulated navigation vehicle through the sub-polar and polar zones.

It is still another object of this invention to provide data processing apparatus capable of providing differences of longitude and latitude between the instantaneous position of the vehicle and one or more stations when the separation therebetween exceeds a thousand miles.

It is still another object of this invention to provide a data processing apparatus suitable for computation with spherical trigonometry.

It is a still further object of this invention to provide a latitude-longitude computer where transition between polar and sub-polar travel can be achieved without discontinuity in cockpit instrument display or other objectionable irregularities.

It is still a further object of this invention to provide a data processing apparatus which is readily adaptable to the automatic plotting of aircraft position on a variety of navigational charts.

It is a still further object of this invention to provide a data processing apparatus which provides computation between a moving vehicle and a number of navigational aids which is truly universal in nature and which encompasses all geographic and cartographic aspects of navigational computing.

It is still a further object of this invention to provide a data processing apparatus which may be used with conventional aircraft simulators regardless of whether said simulators are operating on direct current or alternating current.

It is still a further object of this invention to provide a computer which operates on discrete or quantized data components simultaneously with continuous or interpolated data components to compute a resultant of extremely high accuracy.

It is another object of this invention to provide a computer which converts an input quantity into a digital coded number and which interpolates between consecutive changes of one or more of the least significant digits by the generation of an analog voltage whose magnitude is commensurate with said input quantity.

It is a further object to provide an arithmetic computer having a resolution capability exceeding 1,000,000:1 which is economical, reliable and easy to maintain.

In the specific embodiment disclosed herein, the north-south and east-west component velocities of a vehicle are directly applied to a pair of velocity servomechanism integrators which provide a first pair of output quantities commensurate with the instantaneous latitude and longitude of the vehicle. Since the rate of change of longitude with respect to time increases for a constant east-west component velocity with increase of latitude, a second pair of velocity servomechanism integrators is provided which becomes operative as the vehicle passes a predetermined parallel of latitude. The second pair of integrators provides a second pair of output quantities commensurate with a simple rectangular grid system having the poles at its origin. The grid system is mathematically related to the latitude-longitude system by a simple expression so that conversion between the two systems may be accomplished without any discontinuity. In this manner, two pairs of output quantities are provided at all times, one in terms of latitude-longitude (non-developable coordinate system) and the other in terms of a polar grid system (developable coordinate system).

The output quantities in terms of latitude-longitude may be applied to a special computer cooperatively fusing certain analog and digital techniques. The computer converts the latitude-longitude quantities into digital representations and interpolates between succeeding least significant digits by means of analog signals. Station means are provided which simulate the position of navigational facilities by means of digital and analog representations just as the vehicle position is simulated. The digital representations of the vehicle and station are then subtracted from one another and the difference converted to quantized analog difference signals. Similarly, the analog or interpolation signals of the vehicle and the station are subtracted from one another resulting in interpolation difference signals. Lastly, the appropriate quantized analog difference signals and the appropriate interpolation difference signals are added to one another providing quantities commensurate with the difference of latitude and longitude of vehicle to station.

For a fuller understanding of the nature and objects of the invention, reference should be had to the following detailed description taken in connection with the accompanying drawings in which:

FIG. 3 is a schematic circuit diagram showing certain modifications of the servomechanisms of the computer of FIG. 2;

FIG. 4 is a schematic block diagram of the relative position computer of the data processing apparatus of FIG. 1;

FIG. 10 is an electrical schematic of the interpolation signal generating portion of the computer of FIG. 4;

FIGS. 11a and 11b are tables useful in the understanding of the operation of the interpolation signal generating portion of FIG. 10;

FIG. 12 is a logical diagram of a circuit used in keying the interpolation signal to the digital signal;

FIG. 15 is an illustrative circuit schematic of the full-adder which may be utilized with the adder means of FIG. 14.

The novel features which are believed to be characteristic of the invention, both as to its organization and method of operation, together with further objects and advantages thereof, will be better understood from the following description considered in connection with the accompanying drawings in which several embodiments of the invention are illustrated by pay of example. It is to be expressly understood, however, that the drawings are for the purpose of illustration and description only and are not intended as a definition of the limits of this invention.

Figure 1:
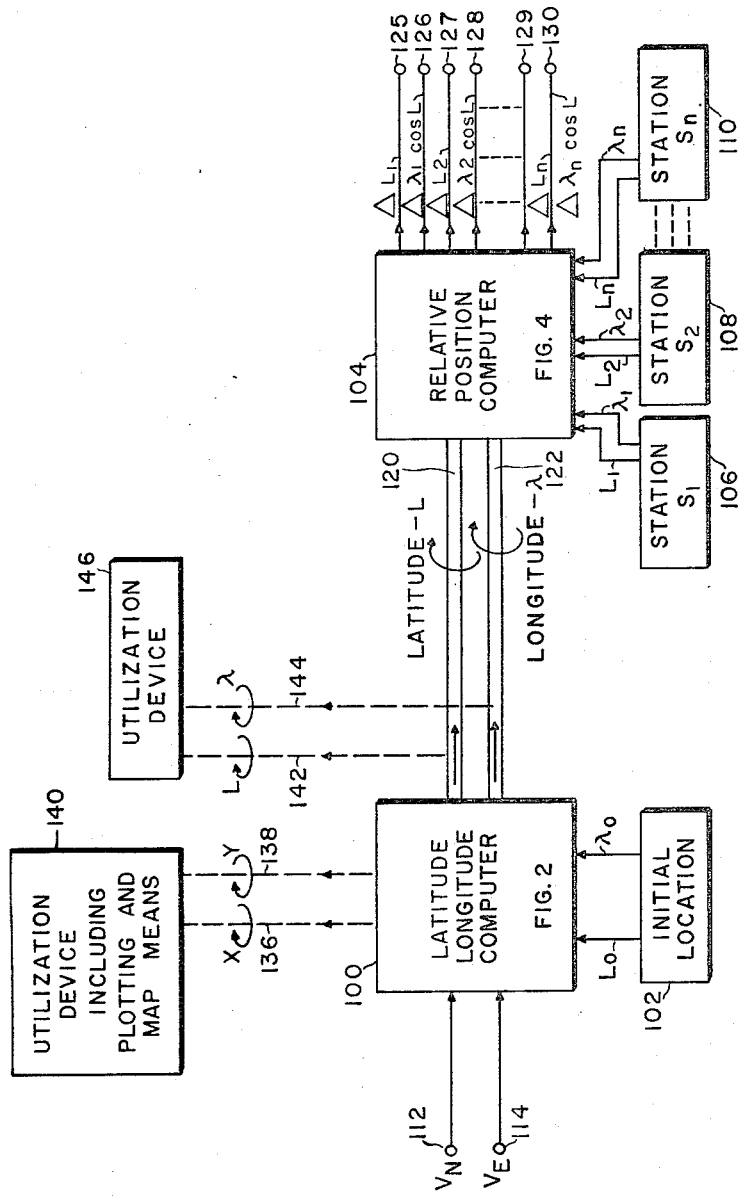
FIG. 1 is a schematic block diagram of the data processing apparatus of this invention.

Referring now to the drawings, wherein like parts are designated by like reference characters, and particularly to FIG. 1 thereof, there is shown a schematic block diagram of the data processing apparatus of this invention. The data processing apparatus comprises essentially a latitude-longitude computer 100 which includes an initial location means 102, and a relative position computer 104 which includes a number of station means 106, 108 and 110, each of which may be a conventional navigation aid. Even though only three station means are shown, it is to be understood that as many station means as desired may be incorporated with relative position computer 104. The total number of station means may be arbitrarily designated by reference character $n$.

Latitude-longitude computer 100 is provided with two separate input terminals 112 and 114 to which the input signals $V_N$ and $V_E$ may be applied respectively. Input signals $V_N$ and $V_E$ may denote the rectangular velocity components of some moving craft such as, for example, an airplane, vessel or craft referenced to a rectangular coordinate system such as the north-south and east-west direction. $V_N$ may be selected as positive for a vehicle traveling in a northerly direction, that is to say along a meridian and towards the North Pole. Similarly, $V_E$ may be selected as positive for a vehicle traveling in an easterly direction, that is traveling along a parallel of latitude towards the east.

For incorporation of the data processing apparatus of this invention with aircraft simulators, input signals $V_N$ and $V_E$ are readily available from conventional simulators which resolve aircraft heading into north and east velocity components. Both input signals $V_N$ and $V_E$ are true rectangular velocity components, and are entirely independent of aircraft position. No matter where the student "flies" his aircraft and no matter what map or chart he may use to navigate the simulated aircraft, $V_N$ and $V_E$ will always be the true northerly and easterly velocity components of the aircraft.

Input signals $V_E$ and $V_N$ are utilized by latitude-longitude computer 100 to derive true instantaneous latitude $L$ and longitude $\lambda$ as will presently be explained. Since computer 100 does not know the starting point, or take off point, it is necessary to supply data representing the initial location of the aircraft which will henceforth be referred to as vehicle V. Location means 102 supplies this information to computer 100 by providing the initial latitude $L_0$ and the initial longitude $\lambda_0$. As will be explained in connection with the description of FIG. 2, computer 100 is capable of providing true latitude $L$ and longitude $\lambda$ for actual and for simulated vehicle travel all over the world. That is to say, the student may "fly" his plane anywhere, even through the polar regions, and computer 100 is operative to provide output quantities accurately commensurate with instantaneous latitude and longitude.

The ouput quantities of computer 100 are provided by angular positions of a latitude shaft 120 and a longitude shaft 122. As will be explained in more detail in connection with FIG. 2, the angular positions of shafts 120 and 122 may be so related to input signals $V_N$ and $V_E$ that each shaft makes three complete revolutions for each degree of latitude or longitude traversed by simulated vehicle V. It is again stressed that the angular shaft positions are commensurate with the true latitude and true longitude of the instantaneous position of the vehicle V and are entirely independent of any charts or maps utilized by the student to derive rectangular velocity components $V_N$ and $V_E$. Accordingly, shafts 120 and 122 are useful for plotting the course of vehicle V on a globe if such a plot is desired. Utilization device 146, connected to shafts 120 and 122 by shafts 142 and 144 may be such a plotting device. Generally speaking, there are a large number of map projections which utilize some function of latitude and longitude for their respective coordinate systems. Utilization device 146 may therefore be any such device which plots or otherwise operates on latitude and longitude directly. Modifying or computer circuitry included within utilization device 146 may be constructed to provide the desired functional relationship between plotting signals and latitude and longitude.

In addition to output quantities commensurate with true latitude and longitude, computer 100 also provides output quantities which are Cartesian in nature and which have either the North or South Pole as origin. These output quantities are referred to as X and Y and may be applied, via shafts 136 and 138 (or leads) to a further utilization device 140. Utilization device 140 may be very useful in providing conventional polar plots such as stereographic polar projection as will be explained in more detail below.

Shafts 120 and 122 also provide the input quantities to relative position computer 104, which is operative to compute distances and bearings between vehicle V and one or more actual or simulated stations. Accordingly, the various station means, such as $S_1$, $S_2$, . . . $S_n$, may provide electrical signals to computer 104 representative of the lattitude and longitude of each of such station means. A station means may signify some fixed object such as a radio navigation aid station, a city, an airport, etc. As will be explained in great detail in conjunction with FIG. 4, each station means, such as station 108, applies two electrical signals to computer 104 in the form of a new code including a digital and an analog signal which represent the position of station 108 in terms of latitude and longitude. The notation here adopted utilizes station number subscripts to latitude L and longitude $\lambda$ so that station $S_2$ is defined by navigation coordinates $L_2$ and $\lambda_2$.

Computer 104, having applied thereto signals commensurate with the instantaneous position of a simulated or actual vehicle V and having applied thereto signals commensurate with the fixed positions of a number of station means, is operative to compute the difference in latitude and longitude between vehicle V and each individual station means. Accordingly, computer 104 is provided with a number of output terminal pairs such as 125, 126; 127, 128; and 129, 130, from which analog output signals commensurate with the latitude and longitude differences between the vehicle V and each station means $S_m$ may be obtained. For example, output terminal 125 provides an output signal in analog form which is commensurate with the instantaneous difference between the latitude $L_1$ of station $S_1$ and the latitude L of vehicle V. This quantity is denoted by the symbol $\Delta L_1$. Output terminal 126 provides an analog output signal commensurate with the instantaneous difference between the longitude $\lambda_1$ of station $S_1$ and the longitude $\lambda$ of vehicle V. This quantity is denoted by the symbol $\Delta \lambda_1$. It is often desirable to derive output quantities which are directly proportional to distance. Since parallels of latitude are always equidistant, $\Delta L_1$ is directly proportional to distance. This is not true of meridians, which converge with increasing latitude. Consequently, the output quantity $\Delta \lambda_1$ (if small) may be modified by the cosine of the latitude to provide distance. The desired output quantity is therefore $\Delta \lambda_1 \cos L$.

The significance of the analog output signals commensurate with $\Delta L_1$ and $\Delta \lambda_1$ will be immediately apparent to those skilled in the art. It is clear that these quantities are again completely independent of chart or map projections utilized by the student or navigator, and represent quantities which may be usefully employed to derive the great circle distance and track from vehicle V to the particular station means. Given the latitude L of a vehicle and the quantity $\Delta L_1$ and $\Delta \lambda_1$, both the great circle distance and track may be easily determined. See, for example, chapter XVII of "Solid Geometry and Spherical Trigonometry" by Hart and Hart, published by D. C. Heath & Co., Boston, U.S.A., 1942.

If the distance betwen vehicle V and station S is small, it is permissible to ignore the effects due to the curvature of the earth and employ plane geometry for obtaining the distance and heading from vehicle V to station S. For this purpose, $\Delta L_1$ is directly proportional to miles and $\Delta \lambda_1$ must be multiplied by the cosine of the vehicle latitude L so that it, too, may be proportional to miles.

Figure 2A:
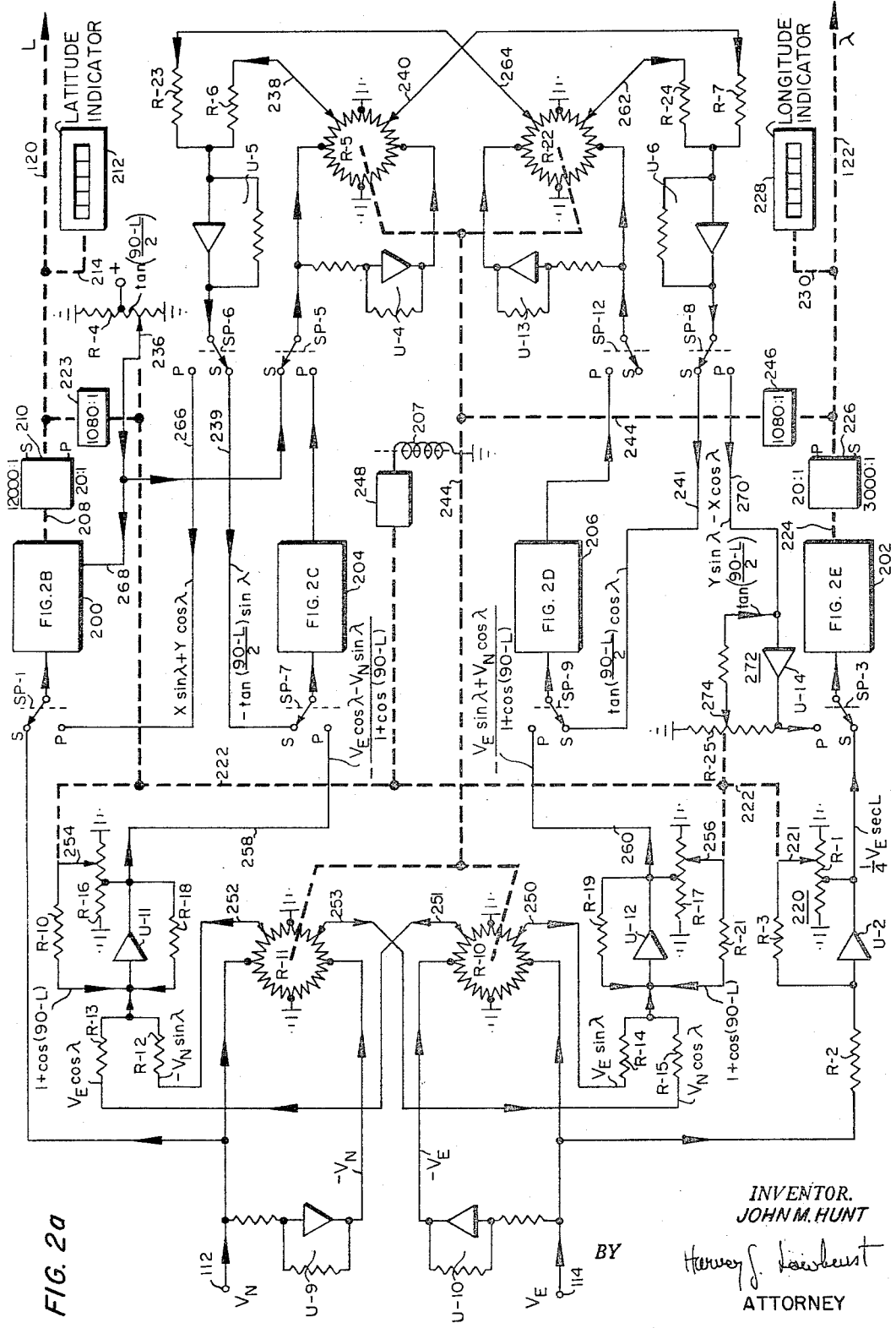
FIG. 2A is a schematic circuit diagram of the latitude-longitude computer of the data processing apparatus of FIG. 1.

FIG. 2a, by way of illustration, shows an exemplary embodiment of latitude-longitude computer 100 of FIG. 1, providing latitude and longitude output quantities from orthogonal velocity component input quantities commonly available from vehicles, flight simulators or other navigation apparatus. Included with computer 100 are components and necessary interconnection leads to permit operation in the polar and the sub-polar regions. Also included are means suitable to derive X and Y output quantities which may be directly utilized for conventional polar stereographic charting.

Reference characters 112, 114, 120 and 122 of FIG. 1 have been retained in FIG. 2a and designate the two input terminals 112 and 114 to which the rectangular velocity component input quantities $V_N$ and $V_E$ are applied, and the two shafts 120 and 122 which provide the latitude L and longitude $\lambda$ output quantities. As has been mentioned herebefore, input quantities $V_N$ and $V_E$ are respectively commensurate with the north-south and the east-west components of the ground speed of an actual or a simulated vehicle V and are available from conventional prior art apparatus as electrical signals in analog form. These velocity input signals are applied, via various computer circuitry, to operate directly one pair of the following two pairs of servomechanisms: the latitude servomechanism 200 and the longitude servomechanism 202; the X-servomechanism 204 and the Y-servomechanism 206. Each servomechanism, as shown in greater detail in FIGS. 2b, 2c, 2d and 2e, may be of conventional design; that is it may include conventional components such as a summing amplifier, generally designated by reference character U, a motor, generally designated by reference character M, and a tachometer generator, generally designated by reference character G. Furthermore, each servomechanism may be operated either as a velocity servomechanism, utilizing tachometer generator output as feedback or as a positioning servomechanism, utilizing motor shaft position as feedback. The motors M and the generators G of the various servomechanisms are more specifically designated by reference characters M-1, M-2, M-3, M-4, and G-1, G-2, G-3, G-4.

Switching means, shown as comprising a plurality of relays generally designated by the reference character SP, are provided to connect the circuitry shown in FIG. 2 in one of two different ways, depending upon whether the "sub-polar" or "polar" mode of operation is desired. Each relay SP is provided with two contacts, respectively labeled S and P, and may comprise a conventional single-pole, double-throw switch which is normally in the "S" position. All SP relays are actuated simultaneously by means of one or more relay coils diagrammatically illustrated by relay coil means 207. During the "sub-polar" mode of operation, which may be arbitrarily defined as travel of vehicle V within the limits of approximately ±70 degree parallels of latitude, all of the S contacts of relays SP are closed, and all the P contacts of relays SP are open. Conversely, during the "polar" mode of operation, which may be arbitrarily defined as travel of vehicle V outside ±70 degree parallels of latitude, all of the P contacts of relays SP are closed and all the S contacts of relays SP are open.

The following description of latitude-longitude computer 100, FIG. 1, is, for the sake of convenience, divided into two portions, the first portion dealing with "sub-polar" mode of operation and the second portion dealing with "polar" mode of operation. The computer operates in one mode or the other at all times. Even though most of the components of computer 100 are utilized during both "sub-polar" and "polar" travel, their functions differ considerably in the two different modes.

Figure 2B:
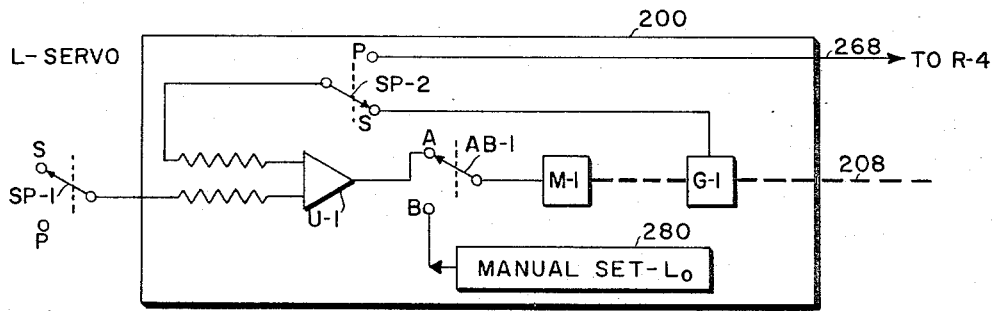
FIG. 2B through 2E are schematic diagrams of the servomechanisms of FIG. 2A.

During "sub-polar" travel, velocity component input quantity $V_N$ is impressed upon terminal 112 and applied, via the S terminal of relay SP–1, to the input circuit of latitude servomechanism 200, which comprises a conventional servomechanism summing amplifier U–1, a conventional motor M–1 driven by amplifier U–1 and having an output shaft 208, and a conventional tachometer generator F–1 driven by shaft 208 (see FIG. 2b). Tachometer G–1, as is well known to those skilled in the art, develops an output voltage proportional to the angular velocity of shaft 208 which may be utilized for velocity feedback. Accordingly, the velocity feedback voltage is applied, via the S terminal of relay SP–2, to the amplifier U–1. Conventional servomechanism 200, connected as shown, provides an output quantity in terms of the angular position of motor shaft 208 commensurate with the time integral of the applied velocity component signal $V_N$ and therefore acts as a conventional integrating or velocity servomechanism. The transfer function of servomechanism 200 may be selected in such a manner that shaft 208 makes one complete revolution for every 1/600 of a minute of latitude traversed. Therefore, a vehicle V proceeding in a northerly direction at a constant speed of, say 600 knots (approximately 0.17 minute of latitude per second) would cause shaft 208 to rotate with an angular velocity of approximately 109 revolutions per second. As is well known to those skilled in the art, conventional generators such as G–1 are easily obtainable with speed ratings considerably higher than 109 revolutions per second.

If it is desired to provide a latitude-longitude computer, such as computer 100, for vehicles having maximum speeds greatly in excess of 600 knots, care must be taken to provide a generator G which may be run at greatly increased rates or else the transfer function of servomechanism 200 requires appropriate changes so that one revolution of shaft 208 becomes commensurate with a number of minutes of latitude traversed which is less than 1/600.

Motor shaft 208 may be directly utilized to provide the desired latitude output quantity; however, it has been found more convenient to increase the number of minutes of latitude traversed per shaft rotation. For this reason a gear box 210 having two different and independent gear reduction ratios, actuated alternately by some clutch means, may be provided. The clutch means may be electromagnetically actuated in much the same way as the individual SP relays, and will be described in greater detail below. For "sub-polar" operation, gear box 210 provides a reduction ratio of 12,000 to 1 so that motor shaft 208 makes 12,000 revolutions in order for shaft 120, the latitude output shaft, to make a single revolution. This is generally indicated by the reference character S in the top of gear box 210. Since motor shaft 208 turns through 360 degrees when the actual or simulated craft traverses 1/600 of a minute of latitude, latitude output shaft 120 will make one revolution for each 20 minutes of latitude traversed.

A latitude indicator 212, driven by shaft 214 directly connected to latitude output shaft 120, may be provided to indicate the instantaneous latitude of vehicle V. Latitude indicator 212 may be a conventional precision counting device such as, for example, is commercially available from the Bowmar Instrument Corp., 2415 Pennsylvania St., Fort Wayne, Ind., and designated as counter No. 2216. Latitude counter 212 may thereby provide an indicator means for indicating the instantaneous position of the simulated vehicle V assuming that the initial position of vehicle V at time zero was properly set into latitude indicator 212. Means for setting initial latitude into latitude-longitude computer 100 will be explained later.

In a similar manner, velocity component input quantity $V_E$ impressed upon terminal 214 is applied, after being modified by a latitude modifying circuit 220, via the S contact of a relay SP–3, to the input circuit of longitude servomechanism 202. Modifying circuit 220 essentially comprises a conventional linear feedback amplifier U–2 having a conventional cosine potentiometer R–1 in its feedback circuit. Cosine potentiometer R–1 has its wiper arm 221 positioned by shaft 222 in accordance with latitude L so that modifying circuit 220 operates to modify velocity component input signal $V_E$ to provide an output signal commensurate with $V_E \sec L$, L of course being the instantaneous latitude of vehicle V. As will be explained in greater detail below, it is also desirable to modify velocity component signal $V_E$ by dividing by a factor of four if it is assumed that velocity components $V_E$ and $V_N$ are of equal magnitude as vehicle V traverses the equator in a true north-east direction, that is have the same scale factor. Accordingly, input resistor R–2 may be selected as having four times the impedance as the feedback resistance R–3. In this manner the signal applied to the S terminal of relay SP–3 is $\frac{1}{4} V_E \sec L$.

Positioning of wiper arm 221 of cosine potentiometer R–1 through shaft 222 requires connection of shaft 222 to latitude output shaft 120. If potentiometer R–1 is selected as a 180-degree potentiometer, a gear box 223 may be utilized to provide a gear reduction ratio of 1080 to 1 so that shaft 222 makes one half of a revolution as vehicle V traverses a distance equal to the distance from one pole to the other, i.e. 180 degrees of latitude. Gear box 223 may have other reduction ratios in accordance with potentiometer R–1, and may be eliminated entirely by connecting wiper arm 221 directly to shaft 524 of the mechanical shaft encoder which is described in connection with FIG. 5 and which rotates once when vehicle V traverses 180 degrees of latitude.

Longitude servomechanism 202 (see FIG. 2e) is similar in construction to latitude servomechanism 200 and includes a conventional amplifier U–3, a conventional motor M–2 driven by the output signal from amplifier U–3 and having an output shaft 224, and a conventional tachometer generator G–2 driven by motor shaft 224. Longitude servomechanism 202, just like latitude servomechanism 200, is utilized as a velocity servomechanism during the "sub-polar" mode of operation so that the feedback voltage generated by generator G–2 is applied via the S terminal of relay SP–4 to amplifier U–3. Without latitude-modifying circuit 220, longitude servomechanism 202 would provide a motor shaft output quantity on shaft 224 directly proportional to the velocity component signal $V_E$. For the purpose of simplification, the transfer function of both servomechanisms 200 and 202 are assumed to be equal.

With latitude-modifying circuit 220 connected as hereinabove described, motor shaft 224 will rotate in accordance with the modified velocity component input quantity, i.e. in accordance with $\frac{1}{4} V_E \sec L$. For constant easterly velocity of an actual or simulated vehicle, the number of degrees of longitude traversed depends entirely on the parallel of latitude L along which the vehicle travels. The closer the craft is located to one of the poles, the greater will be the number of degrees of longitude traversed for a constant easterly ground speed. At approximately 74 degrees of latitude L, the number of minutes of longitude traversed is four times as large as at zero degrees of latitude. As explained above, velocity servomechanism 202 can only follow the input signal as long as generator G–2 provides a feedback voltage which is linearly related to the rotation of the motor shaft 224. Consequently modifying circuit 220 preferably should provide, during "sub-polar" operation, a modified velocity component output quantity which does not exceed $V_E$ unmodified. It is for this reason that a division by a factor of four is provided. As will be explained in connection with "polar" operation, all SP relays are switched at approximately 70 degrees of latitude L so that no provisions for scaling down the component velocity $V_E$ for latitudes exceeding 74 degrees are required. Because of the scale factor of four introduced by the latitude modifying circuit 220, and since the transfer functions of servomechanisms 200 and 202 have been assumed to be equal to one another, one revolution of motor shaft 224 is commensurate with $\frac{1}{150}$ minute of longitude $\lambda$ of travel of the vehicle. The fact that longitude varies with the secant of latitude is well known to those skilled in the art and is immediately apparent from the principles of spherical trigonometry.

Connection of motor shaft 224 to longitude output shaft 122 may be made by a gear box 226, which provides a gear reduction ratio of 3000 to 1 in much the same manner as was described in connection with the latitude servomechanism 200. Gear box 226 includes two different and independent gear reductions which may be activated by some clutch means, such as an electromagnetic clutch, simultaneously with the SP relays. As long as the clutch of gear box 226 is in the S position, one revolution of longitude output shaft 122 is commensurate with a traversal of 20 minutes of longitude by the actual or simulated vehicle since the gear reduction is smaller by a factor of four than the corresponding gear reduction of the latitude shaft 120. To record the change in longitude of the vehicle V, a longitude indicator 228 is connected via shaft 230 to longitude output shaft 122. Latitude and longitude indicators 212 and 228 may be similar in construction and are presently available as fast speed counters for counting rates up to 10 revolutions per second.

The portion of FIG. 2 hereinabove described provides means for deriving the actual instantaneous latitude L and longitude $\lambda$ (assuming proper initial conditions have been set into the system) from the rectangular velocity components $V_N$ and $V_E$ of an actual or simulated vehicle V navigating in a region of the earth lying between the parallels of ±70 degrees of latitude. It includes a first velocity servomechanism means responsive to the northerly velocity component quantity which is operative to provide an output quantity commensurate with instantaneous latitude L in terms of angular shaft position, and also includes a second velocity servomechanism means responsive to the easterly velocity component quantity modified by the secant of latitude L, which is operative to provide an output quantity commensurate with the instantaneous longitude $\lambda$ in terms of angular shaft position.

Latitude and longitude indicators 212 and 228 will operate satisfactorily for shaft rotations up to approximately 10 revolutions per second. However, it will be immediately apparent to those skilled in the art that indicators or counters may be utilized which are designed for higher counting speeds. Furthermore, gear reduction units may be provided and interposed between shafts 120 and 214, for latitude counter 212, and shafts 122 and 230, for longitude counter 228, to overcome this apparent limitation of maximum counter speed. As previously mentioned, the major limitation of computer 100 resides in the ability of the longitude servomechanism to follow the input signal from latitude modifying circuit 220 when the secant of latitude becomes very large. With the transfer functions assumed heretofore by way of illustration, longitude servomechanism 202 would be hard pressed to follow if easterly flight along a parallel of latitude of 85 degrees is attempted, since tachometer generator G–2 must always supply a feedback voltage linearly related to the angular velocity of motor shaft 224. Once a vehicle travels along a parallel of latitude even closer to one of the poles than the 85th degree of latitude, longitude servomechanism 202 may be unable to follow. To provide a latitude-longitude computer suitable for operation anywhere in the world, special provision must be included for "polar" operation, i.e. for travel outside the region extending between 70 degrees north and south latitudes.

Generally speaking, the portion of latitude-longitude computer 100 herebefore described is admirably suited for "sub-polar" navigation but may not follow during "polar" navigation because the time rate of change of longitude becomes too great for the longitude servomechanism 202 to follow. Consequently, latitude-longitude computer 100 of this invention is provided with further circuit means for continuously computing the instantaneous position of a navigable vehicle in a coordinate system more suitable for polar travel. Coordinates suitable for "polar" travel may be loosely referred to as "polar" navigation coordinate systems and may be selected from a number of possible coordinate systems. One common feature of most of the suitable polar navigation coordinate systems is that one of the poles itself is the origin, and the axes or coordinates of the system are orthogonal. The reason for such a choice is obvious if it is remembered that longitude may change at a very rapid rate in the polar region and, therefore, a coordinate system including changing angular quantities is to be avoided.

Figure 2C:
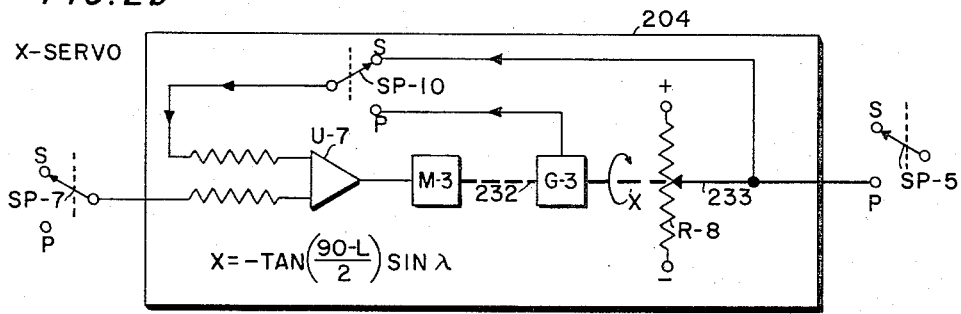
Figure 2D:
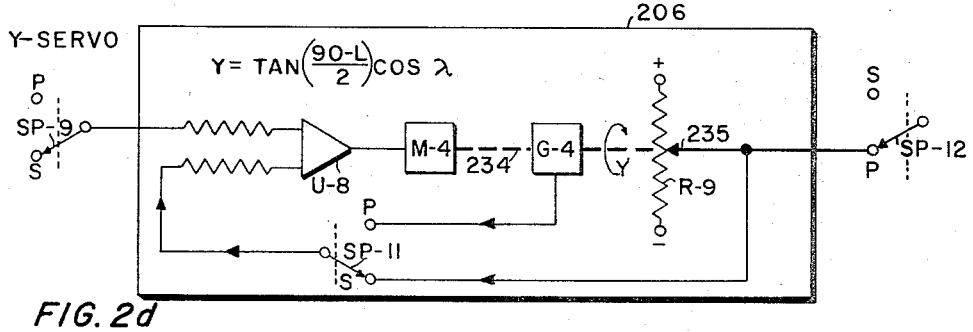
Figure 2E:
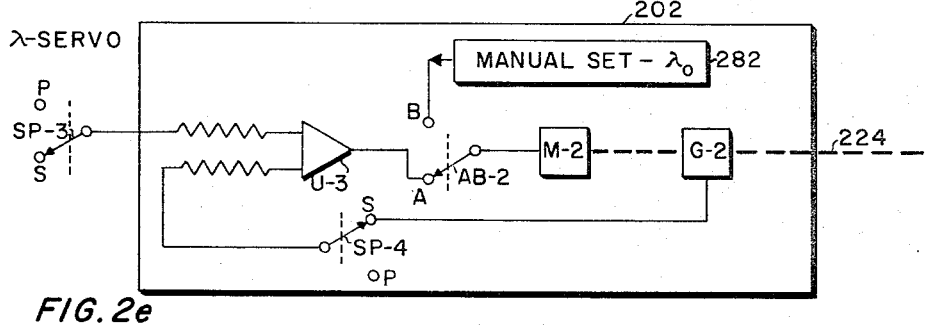

Accordingly, latitude-longitude computer 100 is provided with two additional servomechanisms which are arbitrarily called the X-servomechanism 204 and the Y-servomechanism 206 and are shown in detail in FIG. 2c and 2d. The terminology of X and Y has been adopted to characterize the orthogonality of the coordinate axes. Even though a rectangular Cartesian coordinate system has been selected, the relationship between latitude L, longitude $\lambda$ and the distances given by the reference characters X and Y is still to be fixed. One major requirement of latitude-longitude computer 100 is to provide output quantities in terms of instantaneous latitude L and longitude $\lambda$ regardless of position of vehicle V. Consequently the output quantities from X and Y servomechanisms 204 and 206 must be translatable into latitude and longitude. The simplest relationship possible between L, $\lambda$, X and Y is to utilize the well-known rectangular to polar coordinate conversion system where $X = L \sin \lambda$ and $Y = L \cos \lambda$. Such a relationship is certainly suitable, and if X and Y had no other utility than to provide angular displacement commensurate with the L and $\lambda$ coordinates to the latitude and longitude output shafts 120 and 122 during polar navigation, such a relationship would have been selected.

It may, however, be desirable to utilize latitude-longitude computer 100 of this invention not only for providing the instantaneous position of vehicle V in terms of latitude L and longitude $\lambda$ for use as suitable input quantities to relative position computer 104 and utilization device 146, FIG. 1, but also to plot the path of vehicle V on some readily available navigation charts by means of utilization device 140, FIG. 1. As will be explained later in this specification, either output shafts 120 and 122 or input velocity component signals $V_N$ and $V_E$ may be directly applied to conventional plotting means to plot the path of vehicle V on a suitable map, such as for example Mercator or Lambert projections for sub-polar navigation. These quantities, however, are not suitable for plotting on polar maps and, consequently, a judicious choice of relationship between L, $\lambda$, X and Y may provide the additional advantage of obtaining X and Y in terms of some readily available polar projections. By way of example, quantities X and Y suitable for providing output quantities for plotting stereographic polar projections (by means of utilization device 140) have been selected for the purpose of explaining the invention described herein. Of course, any other relationship which provides quantities X and Y suitable for direct plotting on such charts as Gnomonic polar projection, Lambert equal area projection, orthographic polar projection or azimuthal equidistant polar projection, might have been selected instead as examples and are likewise contemplated for incorporation into or for use with latitude-longitude computer 100 of this invention.

As soon as a suitable relationship between L, λ, X and Y is selected, circuitry must be provided to slave X servomechanism 204 and Y servomechanism 206 to latitude servomechanism 200 and longitude servomechanism 202 so that the output quantities of the four servomechanisms correspond to one another. More specifically, the output quantities of X servomechanism 204 and Y servomechanism 206 must follow the latitude L and the longitude λ near the boundary between "polar" and "sub-polar" navigation so that they may assume control immediately as vehicle V enters the polar zone. In addition to this requirement, it may be desirable for the X and Y output quantities to follow L and λ throughout a portion of "sub-polar" navigation so that the vehicle path may be plotted on polar stereographic map at all times. Utilization device 140, FIG. 1, may provide the desired plotting means.

The following description is directed to an exemplary embodiment of circuitry and components for providing slaving action of the X and Y servo-mechanisms 204 and 206 during "sub-polar" navigation. Explanation of "polar" operation is deferred to the second portion of the description of FIG. 2. Having decided to utilize a relationship providing stereographic polar projection for the X and Y servomechanism output quantities, the well-known relationship between L, λ, X and Y exists.

$$X = -2k \tan\left(\frac{90-L}{2}\right) \sin \lambda \quad (1)$$

$$Y = 2k \tan\left(\frac{90-L}{2}\right) \cos \lambda \quad (2)$$

where X and Y are the rectangular coordinates of polar stereographic projections having the Greenwich Meridian located at the "12 o'clock" position (vertically upwards from the chart's center) and where X is the horizontal coordinate expressed in inches to the right of the chart center, Y the vertical coordinate expressed in inches above the chart center, L is the latitude expressed in radians, λ is the longitude expressed in radians, and $k$ is equal to the chart factor in inches per radians of latitude at the pole.

Equations 1 and 2, strictly speaking, depict sub-polar navigation only for Northern Hemisphere charts if latitude L changes its sign as vehicle V crosses the equator. That is to say, latitude L is usually taken as positive in the Northern Hemisphere and negative in the Southern Hemisphere. Consequently, coordinates X and Y, as given by Equations 1 and 2, provide sterographic projections on a chart whose center is the North Pole and which may extend beyond the equator. However, in the large majority of applications of charting, little interest is found in stereographic projections beyond the equatorial plane and, consequently, no serious limitation is encountered by restricting Equations 1 and 2 to either the Northern or Southern Hemisphere. That is to say, a change of chart is necessary whenever vehicle V crosses the equator. With the above mentioned restrictions, Equations 1 and 2 may be utilized for both the Northern and Southern Hemisphere if latitude L is always taken as positive. In other words, coordinates X and Y provide proper stereographic projection coordinates in both hemispheres if the absolute magnitude of L is used therein. The only other change which has to be made to assure continuity as vehicle V passes from the Northern to the Southern Hemisphere, is to provide for a change of the sign of the X coordinate.

To provide output quantities in accordance with the relationship expressed by Expressions 1 and 2 a non-linear potentiometer R-4 is provided having both end terminals grounded and its center terminal connected to a source of positive potential generally indicated by a plus sign. Potentiometer R-4 may take the form of the 180-degree portion of a single-turn wire wound resistor whose resistance per unit angle varies as the tangent of one-half of the co-latitude. Associated with potentiometer R-4 is a wiper arm 236 actuated by shaft 222, which makes one-half of a revolution as the latitude changes by 180 degrees, thereby providing an output potential proportional to $$\tan\left(\frac{90-L}{2}\right)$$

In practice it may be found convenient to utilize a multi-turn potentiometer for potentiometer R-4 to get greater resolution. Accordingly, wiper arm 236 must be connected to shaft 222 via a gear box so that as latitude L changes from +90 to −90 degrees, wiper arm 236 slides along every point of potentiometer R-4 from one grounded end terminal to the other. In those applications of this invention where polar stereographic maps extending beyond the equatorial planes are to be utilized, one of the grounded end terminals is disconnected from ground and connected to a potential source of very high negative potential. The magnitude of the negative potential depends on the chart limits and is proportional to potential $V_c$ applied to the center of potentiometer R-4 multiplied by $$\tan \frac{90-L'}{2}$$

where L' is the limiting latitude of the chart.

The potential from wiper arm 236 is applied via the S terminal of a relay SP-5 to a conventional sine-cosine potentiometer R-5. It has been found convenient, especially for direct current operation, to energize potentiometer R-5 by applying positive and negative potentials in accordance with the potential developed by wiper arm 236 to opposite ends of potentiometer R-5 and to utilize an inverting amplifier U-4 to obtain the negative potential. Potentiometer R-5, also sometimes referred to as a resolver, has its rotatable portion connected to shaft 244 which, in turn, is coupled to longitude shaft 122 by means of gear reduction unit 246. Gear reduction unit 246 provides reduction of 1,080:1 from shaft 122 to shaft 244 so that shaft 244 makes one revolution as the longitude changes by 360 degrees. Output leads 238 and 240 are connected to potentiometer R-5 via wiper arms and provide output potentials which are proportional to the input potential to potentiometer R-5 modified respectively by the sine and the cosine of longitude. Accordingly, the output potential supplied by lead 238 is proportional to $$-\tan\left(\frac{90-L}{2}\right) \sin \lambda$$

and output potential supplied by lead 240 is proportional to $$\tan\left(\frac{90-L}{2}\right) \cos \lambda$$

These potentials, in accordance with Expressions 1 and 2, must now be converted to angular shaft positions of an X and a Y shaft respectively.

Each of leads 238 and 240 applies its signal to a different one of the summing amplifiers U-5 and U-6 via scaling resistances R-6 and R-7 respectively. Lead 238 is connected to potentiometer R-5 in such a manner that its output potential is of different polarity than the output potential on lead 240. The output signal from summing amplifier U-5 is then applied via the S terminal of a relay SP-6, lead 239 and the S terminal of relay SP-7 to X servomechanism 204, and the output signal from summing amplifier U-6 is applied via the S terminals of relay SP-8, lead 241 and the S terminal of relay SP-9 to Y servomechanism 206.

X servomechanism 204 (FIG. 2c) includes a conventional amplifier U-7 which applies its output voltage to drive a motor M-3. Motor M-3 includes an output shaft 232 which drives a conventional tachometer generator G-3 and which is also utilized to position the slider arm 233 of a linear feedback potentiometer R-8, which has voltage applied to its ends indicated generally by a plus and a minus sign. The signal developed by slider arm 233 is applied through the S terminal of a relay SP-10 to amplifier U-7 so that X servomechanism operates as the conventional position servomechanism. Of course, a suitable gear reduction, not shown in FIG. 2, may be utilized between shaft 232 and slider arm 233 so that potentiometer R-8 may be selected to have a number of turns sufficient to provide a desired resolution. Similarly, Y servomechanism 206 (FIG. 2d) includes a conventional summing amplifier U-8 which applies its output voltage to drive a motor M-4. Motor M-4 includes an output shaft 234 which drives a conventional tachometer generator G-4 and which is also utilized to position the slider arm 235 of a linear feedback potentiometer R-9. The signal developed by slider arm 235 is utilized as a feedback signal and is applied, via the S terminal of a relay SP-11, to amplifier U-8 so that Y servomechanism 206 is connected to operate as a conventional position servomechanism. As is evident from the connections of relays SP-10 and SP-11, both the X and Y servomechanisms may be operated as either position or velocity servomechanisms. As long as relays SP-10 and SP-11 are in the S position, which is the case during "sub-polar" travel, both servomechanisms operate as position servomechanisms.

From Expressions 1 and 2 it is immediately seen that the angular position of shafts 232 and 234 may vary generally between the limits of $\pm 2k$. Since "sub-polar" navigation has been defined as navigation in the zone lying between the parallels of $\pm 70$ degrees latitude, the tangent factor is approximately equal to 0.18 so that during "sub-polar" navigation the angular limits of shafts 232 and 234 are $\pm .18k$, or $\pm 18$ percent of total angular position. Such considerations will be important to determine what kind of potentiometer should be used for R-8 and R-9. If a single-turn potentiometer is employed, the total angular rotation of the X shaft 232 is limited to 130 degrees, which may be insufficient if great resolution is desired. On the other hand, the resolution increases with increasing latitude and may be acceptable at the transition region between "sub-polar" and "polar" zones. If greater resolution is desired, multiple-turn potentiometers must be utilized for R-8 and R-9.

The portion of latitude-longitude computer 100 hereinabove described provides an apparatus eminently suitable to derive latitude L and longitude $\lambda$, and also X and Y coordinates, from the rectangular velocity components $V_N$ and $V_E$ in the "sub-polar" region. As vehicle V navigates into the "polar" region, the input signal to longitude servomechanism 202 may increase with increase of latitude to a value too large for servomechanism 202 to follow. Theoretically, the input signal for a latitude approaching $\pm 90$ degrees becomes infinite. Accordingly, latitude-longitude computer 100 of this invention is provided with additional circuitry to provide longitude $\lambda$ and latitude L during polar flight. Generally speaking, means are provided so that during polar flight X servomechanism 204 and Y servomechanism 206 exchange roles with latitude servomechanism 200 and longitude servomechanism 202.

The following description explains the operation of latitude-longitude computer 100 in the polar region. As the vehicle crosses the parallel of latitude separating the "sub-polar" from the "polar" zone, all SP relays change their switching state so that the S contacts are open and the P contacts are closed. This change of switching state may be initiated by changing the state of relay coil 207 which symbolically represents the actuating coil of each of the SP relays. One method suitable for initiating this change of state of relay coil 207 is to utilize a rotary voltage relay switch generally indicated by the rectangle designated by reference character 248 and connected to shaft 222. As described above, shaft 222 makes one-half of a revolution when the latitude changes by 180 degrees so that rotary voltage switch may be directly calibrated in terms of latitude. The voltage applied to relay coil 207 may be caused to change whenever shaft 222 crosses the points corresponding to $\pm 70$ degrees of latitude. No great accuracy is required of relay switch 248 since a switching error of $\pm 5$ degrees is of little consequence. Only if the switching error becomes much greater than $+5$ degrees is there any danger of damaging a generator such as G-1 or G-2. Other means of providing a change of the switching state of the SP relays will be obvious to those skilled in the art.

During "polar" navigation, the S contacts of relays SP-1 and SP-3 are open so that velocity component potentials $V_N$ and $V_E$ are not applied to latitude and longitude servomechanisms 200 and 202. Instead, component potentials $V_N$ and $V_E$ are suitably modified in a manner to be described and applied, via the P terminals of relays SP-7 and SP-9, to X and Y servomechanisms 204 and 206. Since during "polar" navigation the P terminals of all SP relays are closed, servomechanisms 204 and 206 are operating as velocity servomechanisms by virtue of relays SP-10 and SP-11, which apply velocity feedback voltages developed by generators G-3 and G-4 to the input circuits of the amplifiers U-7 and U-8. The output signals, developed by servomechanisms 204 and 206 are applied to slider arms 233 and 235 of potentiometer R-8 and R-9 and must, of course, remain commensurate with the selected X and Y coordinates of vehicle V in the selected polar coordinate system. Such consideration will immediately make self-evident to those skilled in the art the requirements for input signals to the X and Y servomechanisms. No matter what coordinate system has been selected to govern the X and Y coordinates, the fact that the X and Y output quantities must be commensurate with vehicle position on both sides of the boundary between "polar" and "sub-polar" will determine the proper modifying function to which the velocity components $V_E$ and $V_N$ must be subjected.

Keeping in mind that both X and Y servomechanisms 204 and 206 are connected as velocity servomechanisms during "polar" navigation and that the proper rotational positions of shafts 232 and 234 for the selected coordinate system are given by Expressions 1 and 2, it will become apparent that proper input signals for servomechanisms 204 and 206 may be obtained by differentiating Expressions 1 and 2 with respect to time. The proper input signals are therefore given by the expressions:

$$\dot{X} = \frac{-2k}{R}\left[\frac{V_E \cos \lambda - V_N \sin \lambda}{1+\cos(90-L)}\right] \quad (3)$$

$$\dot{Y} = \frac{-2k}{R}\left[\frac{V_E \sin \lambda + V_N \cos \lambda}{1+\cos(90-L)}\right] \quad (4)$$

where R is the radius of the earth in feet, and $\dot{X}$ and $\dot{Y}$ are, respectively, the proper input signals to servomechanisms 204 and 206 in inches per second, $V_E$ and $V_N$ are respectively the easterly and the northerly components of aircraft ground speed in feet per second, and all other quantities are as previously defined.

The application of voltages commensurate with the bracketed portions of Expressions 3 and 4 will provide the proper position values of X and Y since the constants of integration are the values of X and Y at the time when latitude-longitude computer 100 switches its relays from "sub-polar" to "polar" operation. The initial positions of X and Y are, of course, available because, during sub-polar operation, servomechanisms 204 and 206 are slaved to servomechanisms 200 and 202.

Modifying circuits to provide voltages commensurate with the bracketed portions of Expressions 3 and 4 utilize a pair of conventional sine-cosine potentiometers R–10 and R–11 rotatably coupled to shaft 244, which makes one revolution as the longitude changes by 360 degrees. Velocity components $V_N$ and $V_E$ are respectively applied to opposite input leads to resolvers R–10 and R–11, using inverting amplifiers U–9 and U–10 in the conventional manner well known to those skilled in the art. The remaining two input leads may be grounded. Each of the resolvers R–10 and R–11 is provided with a pair of slider arms designated respectively by reference characters 250, 251; and 252, 253. Slider arm 252 is connected to provide a pick-off potential of opposite polarity from that of the other slider arms such as 250.

The pick-off potentials from wiper arms 251 and 252 are impressed upon the two summing resistors R–12 and R–13, which provide the input circuit of a conventional summing amplifier U–11. The input signal to summing amplifier U–11 is therefore proportional to $$V_E \cos \lambda - V_N \sin \lambda$$

Similarly, the pick-off potentials from wiper arms 250 and 253 are impressed upon the two summing resistors R–14 and R–15 which provide the input circuit of a conventional summing amplifier U–12. The input signal to amplifier U–12 is therefore proportional to $$V_E \sin \lambda + V_N \cos \lambda$$

Both amplifiers U–11 and U–12 are provided with a feedback path which generates a feedback voltage proportional to $1+\cos(90-L)$ by utilizing conventional cosine potentiometers R–16 and R–17 having slider arms 254 and 256 which are positioned respectively by shaft 222 in accordance with latitude L. The ends of cosine potentiometers R–16 and R–17 may be grounded and the center connected to the output circuit of the associated amplifier so that the pick-off potentials vary as the co-latitude of L and are always of the same sign and independent of the position of vehicle V as far as the Northern or Southern Hemisphere is concerned.

The output circuits of each of the amplifiers U–11 and U–12 are connected to respective input circuits through resistors R–18 and R–19. Also, slider arms 254 and 256 apply their respective pick-off potentials to the input circuits of amplifiers U–11 and U–12 through resistors R–20 and R–21 so that the combined feedback signal for each amplifier is proportional to $1+\cos(90-L)$. As is well known to those skilled in the art, the feedback signal adds to the input signal and provides an output signal which is equal to the input signal divided by the feedback signal. Consequently, output signals in accordance with Expressions 3 and 4 are applied to output leads 258 and 260. Of course, a single cosine potentiometer may be utilized for the function generators and may be readily substituted for R–16 and R–17.

The pick-off signals on slider arms 233 and 235 provide, as has previously been explained, output signals commensurate with the position of vehicle V in the "polar" zone with reference to the selected rectangular coordinate system; to wit, the stereographic polar charts. These signals, which may be referred to as the X and Y output signals, next may be utilized to slave latitude and longitude servomechanisms 200 and 202, so that shafts 208 and 224 always are in the proper rotational position corresponding to the instantaneous latitude and longitude of vehicle V. This is important for two reasons, one being that both servomechanisms 200 and 202 must always be ready to take over when the vehicle crosses the polar zone (i.e. provide the proper constant of integration), and the other reason being that latitude and longitude shafts 120 and 122 usually provide input quantities to further operate other apparatus, such as relative position computer 104 and utilization device 146, FIG. 1.

During "polar" navigation, latitude and longitude servomechanisms 200 and 202 operate as position servomechanisms by virtue of relays SP–2 and SP–4 which disconnect the feedback voltage developed by generators G–1 and G–2 from the input circuits of amplifiers U–1 and U–3. To find the proper input potentials to be applied to the P contacts of relays SP–1 and SP–3, it is only necessary to consider the transformation equations applicable to transfer coordinates from a rectangular to a polar coordinate system having the same origin. The polar coordinate system is, of course, formed by the co-latitude, which takes the place of the radius vector, and the longitude, which takes the place of the angle which the radius vector makes with a base line such as the Greenwich Meridian. The transformation equations, well known to those skilled in the art, are:

$$\text{Radius vector} = \tan\left(\frac{90-L}{2}\right) = X \sin \lambda + Y \cos \lambda \quad (5)$$

$$0 = Y \sin \lambda - X \cos \lambda \quad (6)$$

where all quantities have been defined heretofore. In these equations the values of X and Y are functions of L and $\lambda$ as given heretofore in Expressions 1 and 2.

Modifying circuits to provide signals commensurate with Expressions 5 and 6 may include a pair of conventional sine-cosine potentiometers R–5 and R–22. Potentiometer R–5, which also provides the signals necessary for slaving X and Y servomechanisms 204 and 206 during "sub-polar" navigation, is disconnected during "polar" navigation from slider arm 236 by relay SP–5 and, therefore, may be used as one of the required pair of potentiometers. The rotor of potentiometer R–22 is coupled to shaft 244 just as the rotor of potentiometer R–5. The output signals from slider arms 233 and 235 provide signals commensurate with X and Y, and are respectively applied, via the P contacts of relays SP–5 and SP–12, to opposite input leads of resolvers R–5 and R–22. More particularly, potentials commensurate with signals ±X and ±Y are applied to opposite input leads of resolvers R–5 and R–22 through relays SP–5 and SP–12, utilizing conventional inverting amplifiers U–5 and U–13 in a manner well known to those skilled in the art. The remaining input leads may be grounded as shown for direct current operation. Resolver R–22 is provided with a pair of slider arms 262 and 264, from which modified signals may be picked off. Pick-off signals from wiper arms 238 and 264 are respectively impressed upon a summing circuit including two summing resistors R–6 and R–23. The output signal from the summing circuit provides an input signal to summing amplifier U–5 commensurate with Expression 5. Similarly, pick-off potentials from wiper arms 240 and 262 are respectively impressed upon a summing circuit including summing resistors R–7 and R–24 which, in turn, provide the input signal to summing amplifier U–6 commensurate with Expression 6.

The output signals from summing amplifiers U–5 and U–6 art the desired signals for providing follow-up actions of latitude and longitude servomechanisms 200 and 202 in accordance with Expressions 5 and 6. Therefore, the output signal from amplifier U–5, which is commensurate with $X \sin \lambda + Y \cos \lambda$, is applied via the P terminal of relay SP–6, lead 226 and P terminal of relay SP–1 to the input circuit of servomechanism 200. A positional type feedback signal commensurate with $$\tan\left(\frac{90-L}{2}\right)$$

may be obtained from slider arm 236 of potentiometer R–4, as explained herebefore, which may be applied, via lead 268 and terminal P of relay SP–2, to the input circuit of amplifier U–1. Similarly, the output signal from amplifier U–6, which is commensurate with $Y \sin \lambda - X \cos \lambda$, is applied via the P terminal of relay SP-8, lead 270, a sensitivity modifying circuit 272, and P terminal of relay SP-3, to the input circuit of servomechanism 202. Connected as shown, latitude and longitude servomechanisms 200 and 202 will follow X and Y servomechanisms 204 and 206 during "polar" operation.

Modifying circuit 272 provides an automatic sensitivity control during "polar" travel of vehicle V when longitude servomechanism 202 follows servomechanisms 204 and 206. Modifying circuit 272 is a refinement of computer 100 and comprises a conventional summing amplifier U-14 with a feedback arrangement in which slider arm 274 picks off a feedback potential from potentiometer R-25 to provide a feedback signal commensurate with $$\tan\left(\frac{90-L}{2}\right)$$

Slider arm 274 is positioned by shaft 222 which makes one revolution as longitude $\lambda$ changes by 360 degrees. In this manner, the slaving signal applied to the P terminal of relay SP-3 is proportional to:

$$\frac{Y \sin \lambda - X \cos \lambda}{\tan\left(\frac{90-L}{2}\right)} \quad (7)$$

and exhibits a constant sensitivity per degree of longitude. Without modifying circuit 272, the slaving signal applied to servomechanism 202 during "polar" navigation would be commensurate with $Y \sin \lambda - X \cos \lambda$ and would vary with vehicle position so that the closer vehicle V came to the pole, the poorer would be servomechanism sensitivity. With modifying circuit 272, the slaving signal becomes independent of vehicle position.

During "polar" operation, it is obviously desirable that longitude output shaft 122 continue to change its angular position at the rate of 20 minutes of longitude per 360 degrees of shaft rotation so that no new scale factor need be introduced into the system. For an input signal $V_E$ commensurate with an easterly ground speed of 600 knots along the 70 degrees parallel of latitude, motor shaft 224 has an angular velocity approximately equal to 109 revolutions per second, regardless of whether operation is in the "polar" or "sub-polar" mode. The same ground speed at a parallel of latitude nearer the pole will subject the motor shaft to an angular velocity in excess of 109 revolutions per second in accordance with the secant of the latitude. At some point the safe limit of angular velocity of motor shaft 224 would be exceeded and damage to servomechanism 202 may result. In order to prevent exceeding the safe limit of angular velocity of shaft 224, gear unit 226 is provided with some clutch means, such as a conventional electromagnetic clutch, which may be activated by, say, relay coil 207 to reduce the gear ratio between shafts 224 and 122 to a smaller ratio. If a new gear ratio of 20:1 is selected, the required angular velocity of motor shaft 224 for a constant easterly speed of given magnitude is reduced by a factor of 150. Such a reduction will provide satisfactory performance for an easterly speed along all "polar" latitudes except, perhaps, immediately adjacent to the pole. For example, secant of latitude of 89 degrees is approximately 60, or only 15 times as great as the secant of 75 degrees of latitude. Because of the low gear ratio during polar travel, easterly ground speed along a parallel of approximately 89.9 degrees of latitude is permissible. Of course, there is no similar need to provide a lower gear reduction for the latitude servomechanism output shaft 208 since the northerly ground speed is always along a great circle by definition of the coordinate system, and the angular velocity of the latitude speed does not change with latitude or longitude. Nevertheless, there is a further reason for providing a low gear ratio. In order to set the initial vehicle position into the computer 100, the computer must "run" or in other words, the vehicle must be transported to the initial position by rotating shaft 120.

Unless a small ratio is provided between shafts 208 and 120, an inordinate amount of time would be consumed for setting the initial position of a vehicle into the computer. For this reason, the same ratio as is required for unit 226 has been arbitrarily selected. It might be mentioned that the lower the reduction ratio, the faster the initial latitude $L_0$ and the initial longitude $\lambda_0$ may be set into the system. However, a certain amount of output torque is required to drive the counters 212, 228 or other output equipment, and if the selected lower ratio is very small, motors M-1 and M-2 may be hard-pressed to supply the required output torque.

The need for changing the gear ratio between shafts 208 and 120 may best be illustrated by an example. Assume that the last employment of the computer resulted in a final vehicle latitude position of 60 degrees north and that the desired initial vehicle latitude position in the next problem is 40 degrees south. As mentioned herebefore, one rotation of shaft 120 corresponds to 20 minutes of latitude. Therefore, three revolutions are required for one degree and 300 revolutions for the desired change of 100 degrees of latitude. Since, during "sub-polar" navigation, gear unit 210 provides a reduction of 12,000:1, the total number of revolutions of shaft 208 necessary to effect a 100 degree change of latitude is 3,600,000. It has been mentioned before that the angular velocity of shaft 208 is limited to approximately 109 revolutions per second, or in round numbers, about 100 revolutions per second. Using these numbers, it is immediately seen that it would take 10 hours to make the required change. Of course, this is a prohibitively long time to reset the computer for the next navigational problem. Accordingly, a reduction unit 210, similar to unit 226, is provided which changes the gear reduction ratio to 20:1 during the setting of the initial position. With such a reduction ratio the time for traversing 100 degrees of latitude is reduced to approximately one minute, a more practical time for reset.

For introducing the initial coordinates ($L_0$, $\lambda_0$) of vehicle V into latitude-longitude computer 100, the manual set means, designated by reference characters 280 and 282, may be utilized. Manual set means 280 and 282 may comprise, in simplest form, a source of voltage whose magnitude is selected to provide a near maximum-permissible shaft rotation of velocity to shafts 208 and 224 when the voltage is applied respectively to motors M-1 and M-2. Utilizing design values heretofore assumed in connection with an illustrative example, the permissible shaft rotation is of the order of 100 revolutions per second. Consequently, shafts 120 and 122 will rotate with an angular velocity of about 5 revolutions per second, which is permissible as far as indicators 212 and 228 are concerned.

To apply the latitude and longitude "set" voltages, manual switches AB-1 and AB-2 may be utilized, each set voltage being applied to respective motor M through the "B" terminal of the AB switches. Since it is desirable to have latitude-longitude computer 100 operable in the polar mode during the setting of the initial coordinates $L_0$ and $\lambda_0$, switches AB-1 and AB-2 must actuate relay coil 207 when shaft 120 has an angular position which corresponds to "sub-polar" operation. Consequently, switches AB-1 and AB-2 must also provide an override signal to relay coil 207 to assure "polar" operation regardless of the position of latitude shaft 120. Implementation of such a desired override command on relay coil 207 directly, or on relay switch 248, to assure that all SP relays have their respective P contacts closed and S contacts open whenever the B contact of either or both AB switches are closed, is well known to those skilled in the art. No connections of such an implementation are shown in FIG. 2 for the sake of simplicity, but it is easily seen that, for example, the voltage of the setting means 280 and 282 may be directly connected to relay coil 207 by a switch which is activated simultaneously with either one of the AB switches.

In the foregoing description of FIG. 2, the rectangular velocity components have been assumed to be direct current signals. Of course, computer 100 may also be operated in the same manner with alternating current signals. In fact, alternating current operation may decrease the number of components required. For example, direct current resolvers R–10 and R–11 may be replaced with a single alternating current resolver, eliminating the requirement for inverting amplifiers U–9 and U–10. The same applies to direct current resolvers R–5 and R–22, which may be replaced by a single alternating current resolver making inverting amplifiers U–4 and U–13 unnecessary. Generally speaking, the choice of direct or alternating current operation of computer 100 depends on input signals $V_N$ and $V_E$, which may be available from existing equipment either as direct current or alternating current having frequencies of 60 to 400 cycles per second.

The availability of the instantaneous latitude L and longitude λ of a vehicle V is not only important to actuate plotting means, such as utilization device 146 and relative position computer 104, but may be utilized for a large number of other purposes. For example, in modern flight simulators it is often desirable to provide compass errors to simulated polar gyro system which are functions of latitude or longitude or both. Availability of longitude permits the addition of the earth's rotation rate by means of a conventional differential synchro coupled to longitude shaft 224. Also, the algebraic sum of the true heading, as provided by latitude and longitude rates, and the output from the differential synchro represent an angular quantity which is an accurate representation of unslaved directional gyros under all flight conditions (including sub-polar and polar flights in either Northern or Southern Hemispheres). This angle is truly a fundamental requirement for faithful simulation of a directional gyro. Magnetic north slaving may be introduced by an auxiliary servomechanism which provides a differential error by the fundamental gyro output angle of sufficient magnitude to cause compass indication to agree with magnetic north. This same servomechanism may be employed to introduce system malfunctions, drift, turn-on errors, and simulation of earth rate correction circuitry in polar compass systems.

Figure 3A:
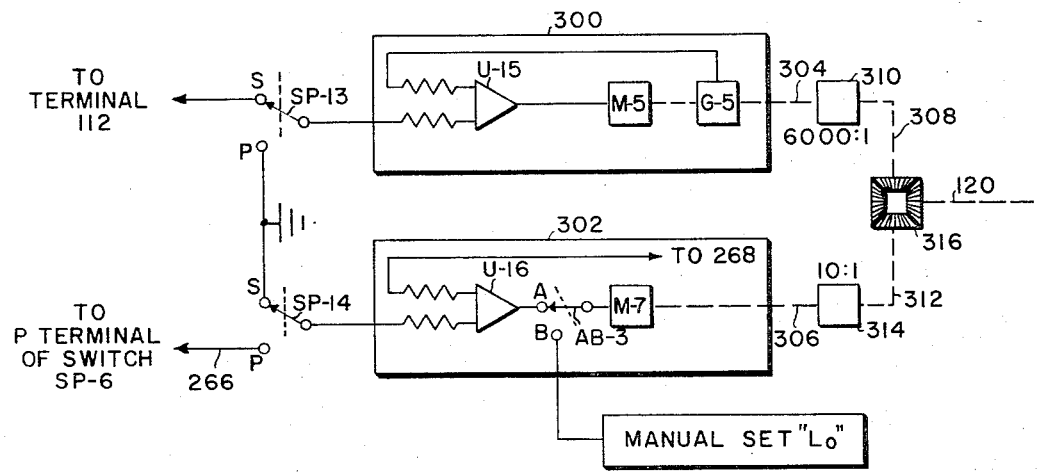
FIGS. 3A and 3B are schematic circuit diagrams of alternate arrangements of the servomechanisms of the computer of FIG. 2.

Gear and clutch units 210 and 226, FIG. 2, may be dispensed with if so desired by replacing each of the servomechanisms 200 and 204 with separate position and velocity servomechanisms and connecting their respective output shafts to a differential. As was explained in connection with FIG. 2, latitude and longitude servomechanisms 200 and 202 are operable in a velocity and a position mode by appropriately switching feedback signals. FIG. 3a shows an alternate arrangement for latitude-longitude computer 100 which replaces latitude servomechanism 200, gear and clutch unit 210 and relay SP–2. Similarly FIG. 3b shows an alternate arrangement which may be substituted for longitude servomechanism 202, gear and clutch unit 226 and relay SP–3.

Referring now to FIG. 3a, a latitude velocity servomechanism 300 and a latitude position servomechanism 302 are provided, having respective output shafts 304 and 306. Velocity servomechanism 300 comprises a conventional summing amplifier U–15 whose output signal drives a motor M–5 whose shaft 304, in turn, is coupled to generator G–5. The signal generated by generator G–5 is utilized as a velocity feedback signal and is applied to the input circuit of amplifier U–15. Position servomechanism 302 includes an amplifier U–16 whose output signal is applied to a motor M–3 having a motor output shaft 306. The feedback signal generated by potentiometer R–4, FIG. 2, is applied to the input circuit of U–16 by means of lead 268 and may be separated therefrom by means of an additional relay if so desired. Component potential $V_N$ from terminal 112, FIG. 2, is applied via the S terminal of relay SP–13 to the input circuit of amplifier U–15. Similarly, the input signal to position servomechanism 302 is applied via lead 266, FIG. 2, and P terminal of relay SP–14 to the input circuit of amplifier U–16. The P terminal of relay SP–13 and the S terminal of relay SP–14 may both be grounded. From the above description, it is immediately seen that upon "sub-polar" operation only velocity servomechanism 300 is supplied with an input signal, and during "polar" operation only position servomechanism 302 is supplied with an input signal. Motor shaft 304 is coupled to shaft 308 by means of a gear reduction unit 310, which provides a gear reduction of 6,000:1. Similarly, motor shaft 306 is coupled to a shaft 312 by means of a gear reduction unit 314 which provides a gear reduction of 10:1. Also, shafts 308 and 312 are each connected to a conventional differential 316 having an output shaft 120, which output shaft provides the latitude L as explained in connection with FIG 1. It is therefore seen that the gear and clutch unit 210 of FIG. 2, which may be found objectionable in some applications, may be entirely eliminated by utilizing two servomechanisms and connecting the output shaft thereof to a differential which drives the output shaft 120.

Figure 3B:
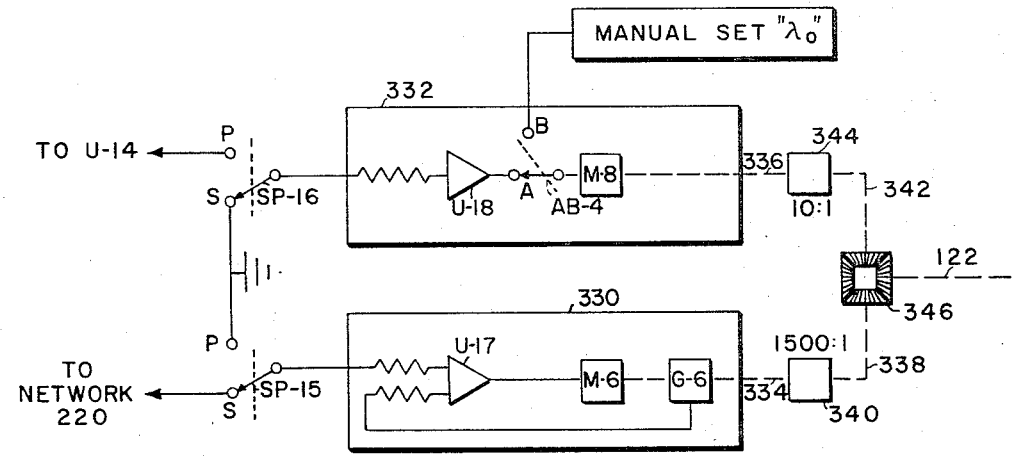

FIG. 3b shows an arrangement similar to that of FIG. 3a which may be used to eliminate gear and clutch unit 226 of FIG. 2. Longitude velocity servomechanism 330 and longitude position servomechanism 332 are provided with output shafts 334 and 336 respectively. Velocity servomechanism 330 includes a conventional amplifier U–17 whose output signal is applied to motor M–6. Motor M–6 drives a conventional tachometer generator G–6 by means of shaft 336. Generator G–6 supplies the feedback voltage which is applied to the input circuit of amplifier U–17. Position servomechanism 332 is perhaps improperly designated as a servomechanism since it merely includes a conventional amplifier U–18 which drives a motor M–8. No means for providing a feedback voltage is incorporated into position servomechanism 332 since the input signal thereto is summed with the feedback signal at a different portion of the circuit of FIG. 2. The input signal to velocity servomechanism 330 is component signal $V_E$ modified by circuit 220 and is applied thereto by the S terminal of relay SP–15. The position error voltage is applied to servomechanism 332 from the output of amplifier U–14, FIG. 2, by the P terminal of relay SP–16. Shaft 334 is coupled to shaft 338 through a gear reduction unit 340 which provides a gear reduction of 1,500:1. Similarly, shaft 336 is connected to shaft 342 through gear reduction unit 344 which provides a reduction ratio of 10:1. Both shafts 338 and 342 are connected to conventional differential 346 whose output shaft 122 provides the longitude λ.

Inserting the initial conditions, that is coordinates $L_0$ and $λ_0$, is accomplished in the same way as explained in connection with FIG. 2 by utilizing manual switches AB–3 and AB–4 and closing the P terminals of all SP relays.

There has been described a computer which essentially comprises four servomechanism means 200, 202, 204 and 206, each of which includes a switching means, SP–2, SP–4, SP–10 and SP–11, which is responsive to a switch signal. The switch signal is provided by a switch signal means, such as relay switch 248, and is applied by an actuating device, such as coil 207, to each of the switching means. Of course, each servomechanism means is equivalent to a velocity servomechanism and a position servomechanism and may be substituted therefor if found convenient. Circuit 220 may be said to comprise a first modifying means which is responsive to the computer input quantity $V_E$ and which is operative to modify $V_E$ in accordance with latitude L, a computer output quantity. This modification is provided by connecting the slider arm of potentiometer R–1 to output shaft 120 by means of connecting shaft 122. The input circuits of each of servomechanisms 200, 202, 204 and 206 are provided with switching means which are respectively SP–1, SP–3, SP–7 and SP–9, which may be of the double-pole, single-throw variety and which are responsive to the switch signal means 248. A second modifying circuit means comprising potentiometers R–10, R–11, R–16 and R–17, and interconnecting circuits have applied thereto the input quantities $V_N$ and $V_E$. The second modifying circuit is responsive to the computer input quantities $V_N$ and $V_E$ and is operative to modify these input quantities with one another and also with computer output quantities latitude L and longitude λ by means of shafts 222 and 244. The output quantities from the second modifying circuit means are therefore modified computer input quantities which are applied to the P terminal of switching means SP–7 and SP–9. The computer described includes a third modifying means comprising potentiometers R–4 and R–5 which modify the computer output quantity latitude L from shaft 202 in accordance with computer output quantity longitude λ by means of shaft 244 to modify computer quantities respectively applied to the S terminals of switching means SP–7 and SP–9. Also included in the computer of this invention is a further modifying circuit comprising potentiometers R–5 and R–22 which are responsive to the output servomechanisms 204 and 206 and which are operative to modify their output quantities with one another and with the computer output quantity longitude λ by a shaft 244 to provide modified computer output quantities. These modified computer output quantities are respectively applied to the P terminals of switching means SP–1 and SP–3.

As has been touched upon briefly in connection with the description of FIG. 1, relative position computer 104 is responsive to input quantities commensurate with the instantaneous position of a vehicle V and the fixed position of one or more stations $S_1$ to $S_n$, and is operative to provide output quantities commensurate with the range and bearing of each station $S_1$ to $S_n$ with respect to vehicle V. As vehicle V changes its position, the range and bearing of each station, such as station $S_m$, changes accordingly. However, as has been mentioned hereinbefore, computer 104 may be utilized for the solution of problems outside the navigation field and is particularly useful whenever arithmetic operations requiring a resolution in excess of 1000:1 are involved and where economic considerations make pure digital computers unfeasible. As will be explained in greater detail, computer 104, as applied to navigation problems, requires two channels, one for latitude and one for longitude. In other applications, such as for example the subtraction of two linear measurements for calculating linear coefficients of expansion of some material, only a single channel is required. In still other applications, such as for example the determination of range and bearing of celestial bodies in three dimensional space, three channels may be required, each channel being associated with a different position coordinate.

Referring now to FIG. 4, there is shown a relative position computer in accordance with this invention which includes two channels, one being associated with latitude and the other channel being associated with longitude. Basically, the relative position computer comprises a common input section and comprises that portion of FIG. 4 lying to the left of line 400. The common input section includes means for converting the angular positions of latitude and longitude shafts 120 and 122, commensurate respectively with the instantaneous latitude and longitude of vehicle V, into electrical computer input signals. Relative position computer 104 also comprises a plurality of output sections, each one being associated with a different one of stations $S_1$ to $S_n$. Since each output section is essentially the same, the only difference being that the electrical station signals applied thereto are commensurate with a different station, only a single output section is being shown in FIG. 4 and comprises the portion of FIG. 4 lying to the right of line 400. All output sections are coupled to the common input section, the coupling points being located along section line 400.

As will become more apparent in connection with the following detailed description of FIG. 4, the common input section of each channel is responsive to the angular position of a shaft and is operative to provide electrical computer signals commensurate therewith. The electrical input signals developed by the common input section are in a new code which is neither digital nor analog but has characteristics common to both. More specifically, the code utilized by the relative position computer of this invention comprises a digital signal providing a coarse indication of the rotational position of the input shaft and an analog signal providing a fine indication of the rotational position of the input shaft, within the angular interval indicated by the digital signal. The digital signal increases progressively as the input shaft keeps turning in the same direction and the analog signal, which is synchronized with the digital signal, changes linearly from a minimum value, usually zero, at the beginning of a predetermined digital interval, to a maximum value at the end of that interval. At the end of the interval, the analog signal drops back to its minimum value. Since the analog signal interpolates in the predetermined digital interval, this signal may be aptly referred to as the interpolation signal.

Referring now generally to the common input section, latitude shaft 120 may be connected through a mechanical gear reduction box 401 to an encoding means such as a conventional analog-to-digital shaft encoder 402 which provides an output quantity (the digital signal) commensurate with the electrical digital representation of the angular position of shaft 120. The number of digits required for digitally representing 180 degrees of latitude is, of course, a matter of choice, it being obvious that the greater the number of digits, the smaller will be each latitude zone as defined by a single digit. Also, the smaller the zone, the more economical it is to provide the interpolation signal which determines the rotational position of shaft 120 within the zone. Consequently, the greater the desired accuracy, the greater will be the total number of latitude zones. For an exemplary embodiment, a nine-digit binary number has been selected so that the 180 degrees of latitude may be divided into 512 zones. Since latitude extends only from minus 90 degrees to plus 90 degrees, each selected latitude zone spans 21.09375 minutes of latitude or nautical miles. Of course, other embodiments may be provided which make use of a zone width of, say, 20 minutes of latitude, thereby simplifying the relationship between minutes of latitude and digits. Such a simplified zone width, however, introduces complications in the requirements of additional logical circuitry to eliminate the obviously introduced redundancies. Also, since the longitude zones close upon themselves, a simple logical coding scheme is preferred. A detailed description of encoder 402 is given in connection with FIG. 5, FIG. 6 and FIG. 8.

Since it is desired to provide electrical computer quantities which are commensurate with vehicle position and which locate the vehicle V with an accuracy of a few feet, latitude shaft 120 is also connected to a transducer 404 which may, in the simplest case, be a conventional single turn potentiometer providing an electrical analog output signal linearly related to shaft position. Appropriate gearing may be provided so that change from full to zero voltage output from transducer 404 coincides with every change in the least significant digit of encoder means 402. In this manner, the digital representation from encoder means 402 provides a coarse indication of the vehicle position in terms of zones, and the analog output signal from transducer 404 provides a fine indication of the vehicle position in terms of position within the zone indicated by encoder 402. A detailed description of transducer 404 is given in connection with FIG. 10.

A similar scheme is employed to provide electrical computer signals commensurate with the longitude of vehicle V. Accordingly, longitude shaft 122 is connected, via a mechanical gear reduction unit 405, to an encoding means 406 which provides a digital representation of the longitude of vehicle V and also to a transducer 408 which provides an analog output signal commensurate with the vehicle position within a zone as defined by the digital representation of encoder 406. In the exemplary embodiment, 10 digits are utilized to divide the 360 degrees of longitude into 1024 zones, each having a width of 21.09375 minutes of longitude. The necessity for the tenth digit is due to the fact that longitude changes from 0 to 360 degrees and, consequently, requires twice as many zones if the zone width of longitude zones is selected to have the same width as the latitude zones. Except for the additional tenth digit supplied by encoder 406, the longitude and latitude encoders and transducer may be similar in all respects and will be described without specific reference to longitude or latitude.

Figure 9A:
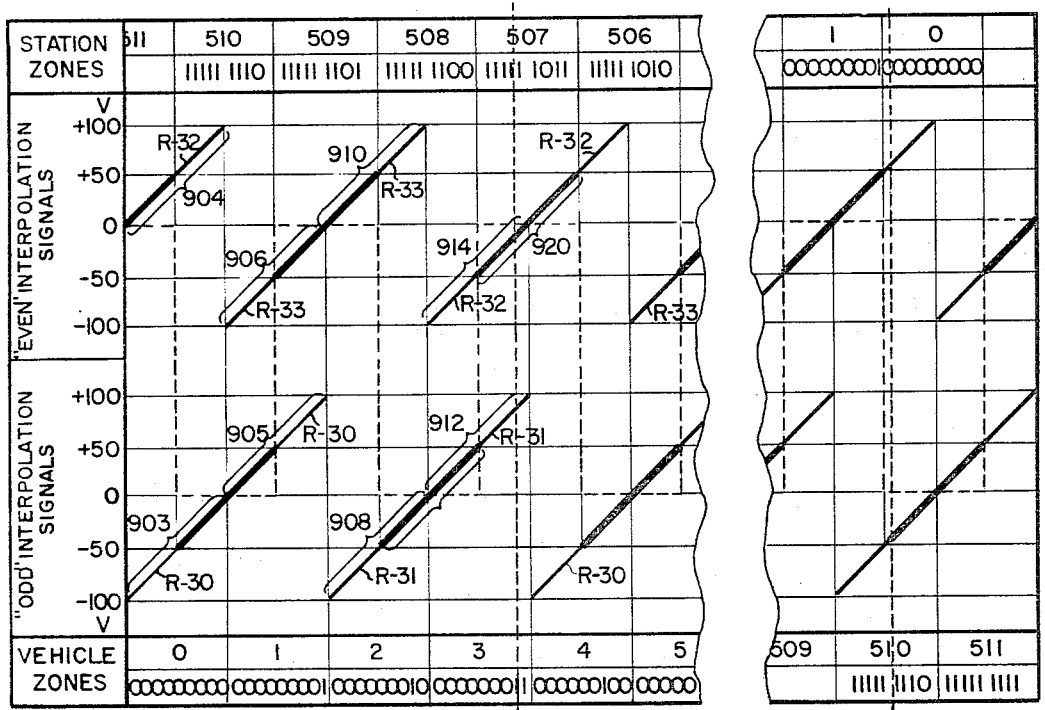
FIGS. 9a and 9b are zoning charts useful in the description of the zoning or coding of the computer of FIG. 4.

The digital representation of the latitude zone of vehicle V, which will be further explained in connection with FIG. 9a, is applied to the nine output leads from encoder means 402 which are respectively designated by reference characters 410 to 418, lead 410 carrying the least significant digit. The analog signal from transducer 404, providing the interpolation signal commensurate with the position within one or more zones, may be directly applied to output lead 424 if transducer 404 is of the simple type described above. However, it has been found more convenient to utilize a more sophisticated type of transducer 404, having four output signals which are applied to a selector circuit 420. Selector circuit 420, which will be further explained in connection with FIG. 10, selects two of the four signals in accordance with which of the four zones vehicle V is located in. Leads 410 and 411 apply zone information to selector 420. The two output signals of selector 420 are applied to a further selector 422 which selects one of the two applied signals in accordance with the zone in which station $S_m$ is located, as will be explained in more detail below. The selected signal from selector 422 is then applied to output lead 424.

Similarly, the digital representation of the longitude zone of vehicle V is applied to the ten output leads from encoder means 406, which output leads are respectively designated by reference characters 430 to 439, lead 430 carrying the least significant digit. The analog signal from transducer 408 provides the position within one or more longitude zones and may be directly applied to output lead 444 or, similar to the discussion with respect to transducer 404, has its four output signals subjected to a selector 440 and a selector 442. Selectors 420 and 440 are part of the common input section and selectors 422 and 442 are associated with an output section.

The common input section hereabove described utilizes mechanical-to-electrical conversion means responsive respectively to the rotational position of the latitude and longitude shafts and is operative to provide digital electrical output quantities commensurate with quantized rotational shaft positions and analog electrical output quantities commensurate with rotational shaft positions within one or more of such quantized rotational shaft positions. In other words, the digital quantities provide shaft position in stair-step fashion and the analog quantities provide shaft position with respect to one or more stair-steps. It will be apparent that any quantity may thus be operated upon and first broken up into finite increments by digital representation, and thereafter have the residue converted into an analog voltage indicative of exact magnitude with reference to the finite increments.

Even though the common input section of the relative position computer has been explained in terms of input quantities which are angular shaft positions, it is to be understood that input quantities may also be applied in terms of electrical signals or mechanical signals commensurate with linear position. The input section is, essentially, a device which has applied to it an input quantity commensurate with some number or numbers representing some physical or mathematical phenomena and which operates upon said quantity to provide a digital output signal and an analog output signal for bridging the gap between successive digital numbers. The analog output signal is referred to as the interpolating signal, a term particularly descriptive of the analog signal since it provides an output quantity commensurate with that portion of the input quantity which is insufficient either to increase or decrease the binary number by a digit, and which ought to be added to the binary number just like a fractional part to obtain an electrical signal commensurate with the actual angular position of the input shaft. In other words, the interpolating signal linearly interpolates between two or more successive changes in the least significant digit of the binary number, so that it bridges the discontinuity or stair-stepped character of binary numbers. The input quantity may be an analog signal, which may be converted into a digital representation, and its residue may be utilized as the interpolating signal. The input quantity may also be a digital number having more than the desired number of digits. For such an input quantity, a selected number of the least significant digits may be converted into an analog signal and thereby provide the interpolating signal to the remaining digits of the input quantity. Or the input quantity may be mechanical motion of any kind whatsoever, which is converted into a digital number and an interpolating signal.

The output section associated with station $S_m$ includes a station simulator, such as the one shown in block form and designated by reference character 450, which is operative to apply electrical computer output signals to 21 output leads respectively designated by reference characters 460 to 480. Output leads 460 to 468 have applied thereto a digital number representative of the latitude zone of station $S_m$, the latitude interpolating signal providing information of the location of station $S_m$ within the latitude zone being applied to output lead 469. Similarly, output leads 470 to 479 have applied thereto a digital number representative of the longitude zone of station $S_m$, the longitude interpolation signal providing information of the location of station $S_m$ within the longitude zone being applied to lead 480. In this manner, simulator 450 provides electrical output quantities of the same type provided by the common input section, namely digital signals and interpolating signals. Of course, the electrical output quantities from encoder means 402 and transducer 404 continually change with change of position of vehicle V, whereas station $S_m$ has been assumed as fixed. Simulator 450, which will be described in connection with FIG. 13, may take the form of a wired plug, the prongs of which provide the various output leads. If a plug is utilized, appropriate "ones" and "zeroes" may be easily provided by a suitable connection to two different voltage sources. The analog or interpolating signals may be obtained by connecting resistors of suitable impedance in series with such voltage sources.

The digital signal representing the instantaneous latitude zone of vehicle V (output leads 410 to 418) and the digital signal representing latitude zone of station $S_m$ (output leads 460 to 468) are applied to the input circuits of a conventional digital adder means 452. Adder means 452, which will be described in connection with FIG. 14, is operative to provide, at its output circuit, a digital signal commensurate with the number of latitude zones between vehicle V and station $S_m$. Since vehicle V and station $S_m$ may be at opposite poles, the difference between respective latitude zones may be equal to the total number of zones into which the world is divided. Consequently, a nine digit output number may be necessary to provide latitude zone difference. Output leads 481 to 489 provide this latitude zone difference number, lead 481 carrying the least significant digit. In order to calculate bearing, it is necessary to know whether vehicle V is south or north of station $S_m$. For this purpose, a tenth output lead 490 is provided which supplies the algebraic sign of the latitude zone difference. The latitude zone difference is applied via leads 481 to 490 to the input circuit of a conventional decoder means 453, which is fully described in connection with FIG. 16. Decoder means 453 is operative to convert the applied digital latitude zone difference to an analog output voltage which is, of course, quantized or stair-stepped. The quantized analog output signal is either negative or positive depending on whether vehicle V is north or south of station $S_m$.

The quantized analog signal from the output circuit of decoder means 453 is applied, via output lead 454, to a conventional summing means such as summing amplifier 455. Output leads 424 and 469, upon which interpolator signals commensurate with the vehicle and stations positions within the vehicle and station latitude zones are impressed, apply their respective signals to the input circuit of another summing means such as conventional summing amplifier 456. Summing amplifier 456 is operative to sum up these signals and provide an interpolator difference output signal on output lead 457 commensurate with the distance between vehicle V and station $S_m$ disregarding their zonal or digitized separation. Output lead 457 is also applied to summing amplifier 455, which is operative to combine the interpolation difference output signal with the quantized analog difference output signal representing zonal separation. The summation of the signals on output leads 454 and 457 finally provides the desired output signal $\Delta L_m$ on output lead 458, which is commensurate with the total difference between the latitude of vehicle V and station $S_m$.

Similarly, the digital signal commensurate with vehicle longitude zone (output leads 430 to 439) and the digital signal commensurate with station latitude zone (output leads 470 to 479) are applied to the input circuits of a conventional digital adder means 445, which is operative to provide at its output circuit a digital signal commensurate with the number of longitude zones separating vehicle V from station $S_m$. Since the meridians of longitude close upon themselves, that is form a closed-ended system, there may be two answers when subtracting station zone from vehicle zone. One answer will provide the short way and the other answer provide the long way. For most navigation problems, only the shortest distance between vehicle V and station $S_m$ is of interest and, consequently, the other distance may be ignored. The shorter distance can never be more than one-half of the total number of zones into which the earth is divided and, thus, the digital number which provides the desired zone difference will always have one less digit than is necessary to specify the zone number. Therefore, only nine output leads are required, namely leads 491 to 499, to provide the longitude zone difference signal in binary form. The tenth digit, namely output lead 500, is reserved to indicate the relative direction (east or west) from vehicle V to station $S_m$. Conventional decoder means, such as digital-to-analog converter 446, has applied to its input circuit output leads 491 to 500 and is operative to provide a quantized analog output signal commensurate with the zonal or digital longitude separation between vehicle V and station $S_m$. This output signal is applied via output lead 447 to a summing means such as conventional summing amplifier 448.

Output leads 444 and 480, upon which interpolation signals commensurate with the vehicle and station positions within vehicle and station longitude zones are impressed, apply their respective signals to the input circuit of a further summing means such as conventional summing amplifier 449. Summing amplifier 449 is operative to provide an interpolation difference output signal along output lead 451 commensurate with the distance between vehicle V and station $S_m$, neglecting the zonal or digitized separation. Output lead 451 is also applied to summing amplifier 448 which is operative to combine this signal with the quantized zonal difference signal representing the zonal separation. The summation of the signals on output leads 447 and 451 finally provides the desired output signal $\Delta \lambda_m$ on output lead 501.

Since this output signal is commensurate with separation in terms of longitude and since the separation of longitudes in terms of miles or some other convenient units of linear distance is a function of latitude, a conventional cosine potentiometer 502, having a slider arm 503, may be utilized to convert this longitudinal difference into terms of linear distance. Accordingly, slider arm 503 is coupled to and positioned by latitude shaft 120 in a manner well known to those skilled in the art. Output lead 504, coupled to slider arm 503, will then provide the signal $\Delta \lambda_m \cos L$ which is the desired east-west separation between vehicle V and station $S_m$ in terms of linear dimensions.

Output signals on leads 458 and 504 are again orthogonal quantities which may now be combined to obtain range and bearing. If the separation between vehicle V and station $S_m$ is large, spherical trigonometry must be employed for accurate combination. If the separation is small, then a flat earth may be assumed, and well-known methods for combining the output quantities to obtain range and bearing may be utilized. See for example Chapter 6, Section II of "Electronic Analog Computers" by Korn and Korn, published by McGraw-Hill Book Company, Inc., 1956. As described therein, the most common method of combining orthogonal output quantities employs resolvers in direct current operation. For orthogonal alternating current operation, it is possible to use phase-sensitive networks to provide range and bearing without the use of resolvers.

For most of the circuits shown in block form in FIG. 4, such as for example encoder means 402, 406, transducers 404, 408, adder means 452, 445 and decoder means 453, 446, conventional well-known circuits may be employed. Since some circuits are more suitable than others, preferred circuit embodiments particularly suitable for the navigation problem selected as the illustrative example of the data processing apparatus of this invention are described below.

Any of the many well-known analog-to-digital shaft converters may be utilized to provide coding means 402 and 406 of FIG. 4. See, for example, Chapter VI of "Notes on Analog-Digital Conversion Techniques" edited by Alfred K. Susskind and published jointly by the Technological Press of the Massachusetts Institute of Technology and John Wiley & Sons, Inc., New York (1957), which describes in detail the better known converters. By way of example, a cam-and-switch coder, not described in the reference and particularly suitable for incorporation with the common input section of the relative position computer of this invention, will be explained in detail in connection with FIGS. 5, 6 and 7. This cam-and-switch coder utilizes a principle similar to the well known double brush (V brush) method as the logical reading method for natural binary code.

Figure 5:
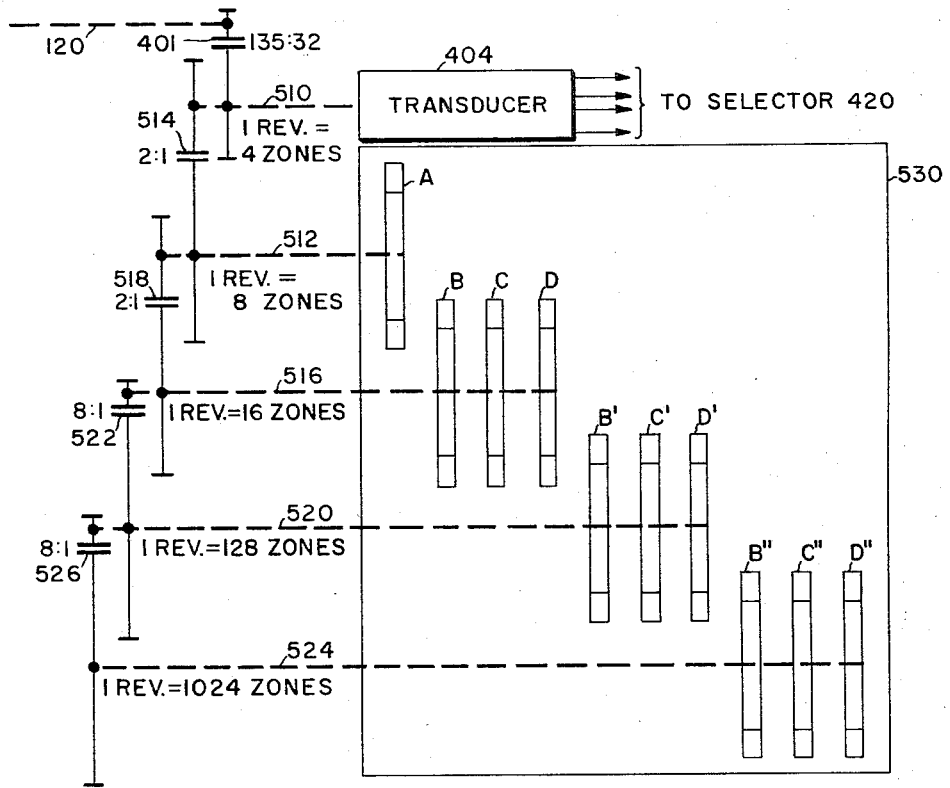
FIG. 5 is a schematic mechanical diagram of the digital encoder of the computer of FIG. 4.

Referring now to FIG. 5, latitude output shaft 120 is connected, via gear reduction unit 401 (also shown in FIG. 4), to a transducer actuating shaft 510. The gear ratio of gear reduction unit 401 is selected such that transducer actuating shaft 510 traverses an integer number of zones each time it makes one revolution. In other words, when latitude output shaft 120 traverses 180 degrees of latitude, which corresponds to 540 revolutions, transducer actuating shaft 510 is geared to traverse $512/n$ zones for a nine-digit output signal, where $n$ is the desired number of zones per revolution of shaft 510. For the exemplary cam-and-switch coder, $n$ has been selected as 4 for reasons which will become more obvious in connection with the description of transducer 404 of FIG. 10 which provides the interpolation signals. Accordingly, for each 540 revolutions of shaft 120, shaft 510 makes 128 revolutions, and the desired reduction ratio of unit 401 is 135:32.

Shaft 510 actuates a shaft 512 via the gear reduction unit 514 providing a reduction ratio of 2:1 so that one revolution of shaft 512 corresponds to 8 zones of latitude. Shaft 512 actuates shaft 516 via a gear reduction unit 518 which provides a reduction ratio of 2:1 so that one revolution of shaft 516 corresponds to 16 zones of latitude. Similarly, a shaft 520 is actuated by shaft 516 via a gear reduction unit 522 which provides a reduction ratio of 8:1 so that one revolution of shaft 520 corresponds to 128 zones of latitude. Lastly, a shaft 524 is actuated by shaft 520 via a gear reduction unit 526 which provides a reduction ratio of 8:1 so that one revolution of shaft 524 corresponds to 1024 zones of latitude, which is of course twice the required number of zones. Since 1024 zones of latitude correspond to 360 degrees of latitude, it can be seen that shaft 524 makes one-half of a revolution as a vehicle traverses the earth from one pole to the other. As mentioned in connection with the description of FIG. 2, if the relative position computer is used to provide input signals to the latitude-longitude computer, gear reduction unit 223 may be omitted and shaft 222 may be directly coupled to shaft 524.

The cam-and-switch unit 530 of the exemplary shaft coder includes a plurality of cams and switches as shown. As will be noted in connection with FIG. 6, a single switch is used in connection with the cam providing the least significant digit and two switches are used in connection with all other cams providing all the other digits. Cam A is driven by shaft 512 and actuates the switch which provides the least significant latitude zone digit. Cams B, C and D are driven by shaft 516 and actuate, respectively, switches which provide the 2nd, 3rd and 4th least significant latitude zone digits. Cams B', C' and D' are driven by shaft 520 and actuate, respectively, switches which provide the 5th, 6th and 7th least significant latitude zone digits. Finally, cams B'', C'' and D'' are driven by shaft 524 and actuate switches which provide the two most significant latitude zone digits of the shaft encoder and a further digit which need not be observed. Cam D'' is shown because it is useful in connection with longitude encoder 406.

Figure 6:
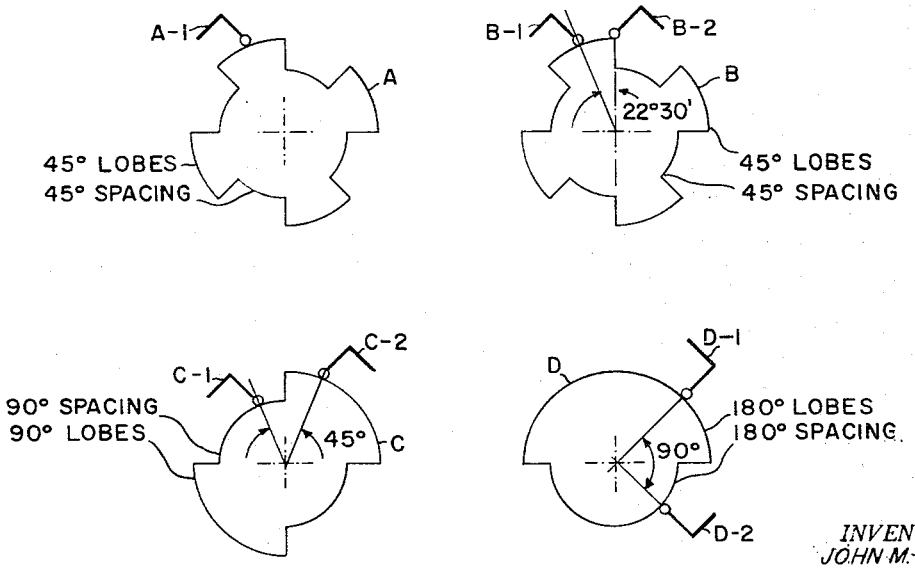
FIG. 6 is a plan view of the cams which are employed in the digital encoder of the computer of FIG. 4.
Figure 7:
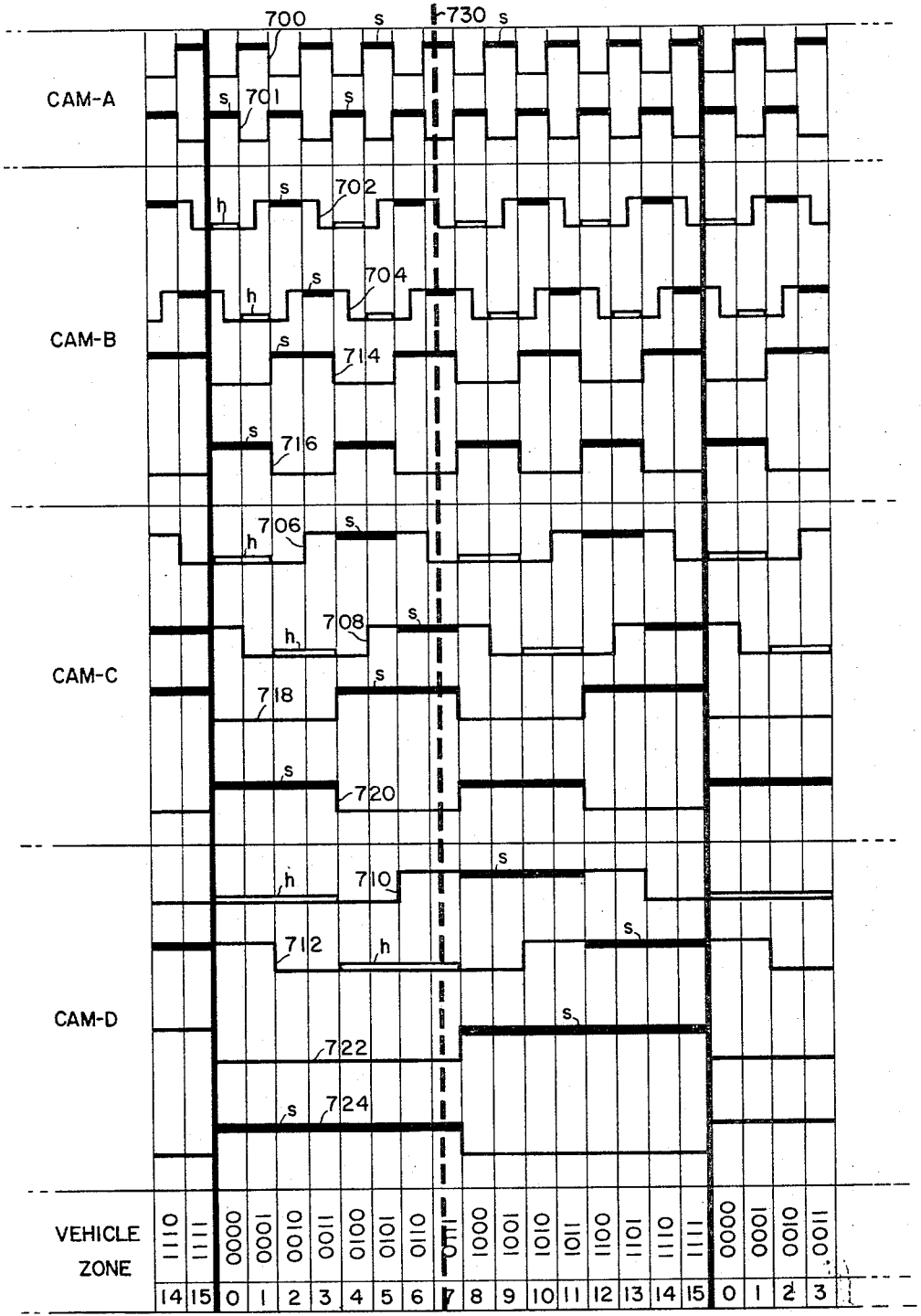
FIG. 7 is a timing diagram useful in the description of the digital encoder of the computer of FIG. 4.
Figure 8:
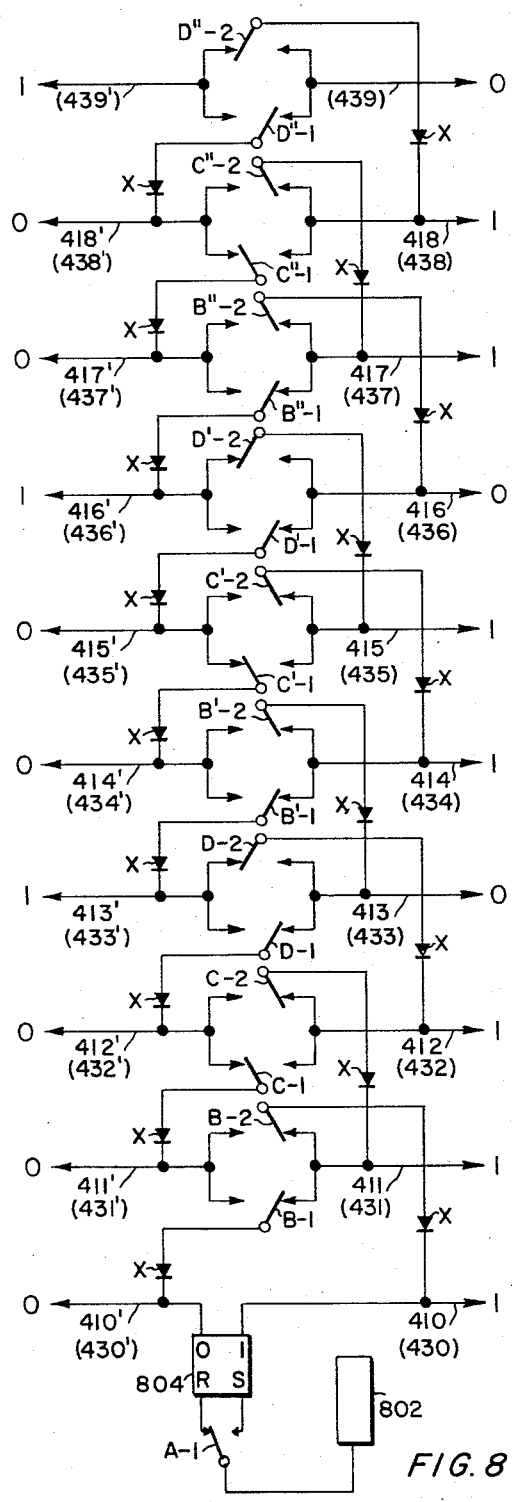
FIG. 8 is a schematic circuit diagram of the digital encoder of the computer of FIG. 4.

FIG. 6 illustrates the various forms which the cams may take and the relative position of the switches associated with each cam. Cam A, shown symbolically, may take the form shown in FIG. 6 having four 45-degree lobes separated by 45-degree spaces forming valleys. Switch A-1, associated with cam A and only shown symbolically, is "closed" when riding on a lobe and "open" when between lobes. Since cam A is driven by shaft 512, which makes one revolution every 8 latitude zones, switch A-1 will close and open four times during one revolution of cam A. If switch A-1 is utilized to close and open the output circuit of a voltage source, the output circuit would provide an output signal having the voltage form of a square wave as shown in FIG. 7 as curve 700. Curve 700 also illustrates the relationship between the opening and closing of switch A-1 and the zones traversed. For example, since one revolution of cam A corresponds to 8 zones, and since switch A-1 closes and opens four times in one revolution, a change in the output signal of switch A-1 corresponds to a zone change of one. Accordingly, a horizontal scale in terms of zones in decimal and binary numbers is provided with FIG. 7. This output signal, as will become clearer in connection with the description of FIG. 8, provides the least significant latitude zone digit in natural binary numbers. Since cam A is really the trigger of each of the remaining zone digits, cam A must be accurately machined and its lobes and lobe separations should be held to close tolerances.

Cam B may be similar in configuration to cam A but need not be machined to the same close tolerances because of the double switch method employed. Two switches, namely B-1 and B-2, are associated with cam B and are angularly separated by 22.5 degrees. If switches B-1 and B-2 are connected into the output circuit of a voltage source, the voltage waveforms of the rectangular waves, shown in FIG. 7 as curves 702 and 704 respectively, are obtained. Since a revolution of cam B corresponds to 16 zones, and since each switch opens and closes 4 times during each revolution of cam B, each switch will change its output state every 2 zones. The switches are so placed that a change of output state occurs in the middle of a zone. Further, the effect of separating switch B-1 from switch B-2 by 22½ degrees is to provide two output signals (each switch actuates a source) which are displaced from one another by a zone width.

Cam C may take the configuration shown in FIG. 6 having two 90-degree lobes which are separated by 90-degree spacings. Associated with cam C are two switches C-1 and C-2 angularly separated from one another by a half lobe width or 45 degrees. If switches C-1 and C-2 are connected into the output circuit of two voltage sources, the output circuits would provide rectangular shaped output signals as illustrated by curves 706 and 708, FIG. 7, respectively. As can be seen from the horizontal scale, the switching state is changed every four zones and the output voltages from switch C-1 lead the output voltage of switch C-2 by 2 zones. Switch C-1 is positioned to close when entering zone 3 and, therefore, switch C-2 opens when entering zone 1.

Cam D may take the configuration shown in FIG. 6, having a single 180-degree lobe and having two switches D-1 and D-2 associated therewith. Since one revolution of cam D corresponds to 16 zones, each switch opens and closes once every 8 zones. The switches are separated again by a one-half lobe width so that switch D-1 leads switch D-2 by 4 zones. If switches D-1 and D-2 are connected into the output circuit of two voltage sources, the output voltages will have the voltage form shown by curves 710 and 712. Switch D-1 closes when entering zone 6 and switch D-2, which leads by 4 zones, closes when entering zone 2.

As will become clearer in connection with the description of FIG. 8 showing the schematic electrical diagram of the decoder, the switch associated with cam A provides the least significant digit of the digital zone number. The switches associated with cams B, C and D, driven by shaft 516 (FIG. 5) provide the second, third and fourth least significant digits of the digital latitude zone number. Since a four-digit number can uniquely identify 16 latitude zones, the four least significant digits will repeat themselves each time 16 latitude zones are traversed.

The fifth, sixth and seventh least significant digits may be obtained in a manner similar to that described above with the aid of cams B', C' and D' driven by shaft 520. Cams B', C' and D' may be similar in all respects to cams B, C and D since they are rotated eight times as slow as cams B, C and D. Similarly, the three most significant digits, that is the eighth, ninth and tenth digits, may be provided by cams B'', C'' and D'' driven by shaft 524 which makes one revolution every 1024 latitude zones. Again, since shaft 524 rotates ⅛ as fast as shaft 520, cams B'', C'' and D'' may be similar in all respects to cams B, C, and D.

What is true of the cams is also true of the switches associated with the various cams. Consequently, cams B' and B'', having switches B'-1, B'-2 and B''-1, B''-2 respectively associated therewith, have an angular separation of 22½ degrees. Similarly, cams C' and C'', having associated therewith respectively switches C'-1, C'-2, and C''-1, C''-2, have an angular separation of 45 degrees. Also, cams D' and D'', having associated therewith respectively switches D'-1, D'-2, and D''-1, D''-2, have an angular separation of 90 degrees. The curve shown in FIG. 7 likewise can be applied to the output of the switches associated with the "dash" and "double dash" designated cams if it is remembered that each group of cams, that is the three cams driven by a single shaft, signifies a different group of digits of the longitude zones.

For example, curve 706 depicts the action of switch C'–1, showing a closure when passing from zone 0010 to zone 0011, will also depict the action of switch C"–1 in passing from zone 001 . . . 0 to 001 . . . 1. In other words, the curve 706 depicts the switch action for the first group of three digits, the second group of three digits and the third group of three digits, the least significant digit acting as a clock pulse.

The portion of latitude encoder means 402, FIG. 4 (and of longitude encoder means 406 which may be of like configuration) actuated by cam-and-switch unit 530, shown in FIG. 8, will now be described in detail. A source of trigger voltage, such as indicated by reference character 802, having an output voltage of sufficiently high magnitude and correct polarity to switch the state of a bistable device, has its output terminal connected to the pole or input terminal of single-pole, double-throw switch A–1. The two output terminals of switch A–1 will be referred to respectively as the "up" and "down" terminals in accordance with their special positioning in FIG. 8. The same terminal designation will also be used in connection with the description of all other switches to avoid the introduction of further reference characters. Switch A–1 is, of course, the switch schematically shown and designated as A–1 in FIG. 6 actuated by cam A. The switching state of the various switches will be identified by referring to the particular output terminal which is connected to the single-pole terminal. Consequently, the statement that a switch is "up" means that the pole terminal of that switch is connected to the "up" terminal. As will become clearer as the description of FIG. 8 progresses, the mechanical drive shown in FIG. 5 controls the switching state of the various cam switches.

The output terminals of cam switch A–1 are connected, respectively, to the "set" and the "reset" terminals R and S of a bistable device such as a conventional "reset-set" or R–S flip-flop 804 so that the trigger voltage from source 802 controls the state of the flip-flop in accordance with the switching state of switch A–1. The output signals from flip-flop 804 are applied respectively to leads 410 and 410', one being "high" and the other one being "low," in accordance with the switching state of flip-flop 804. The reason for selecting a flip-flop, and preferably a flip-flop having clamped output voltages equal to the desired "high" and "low" output voltages, is to ensure that when one lead is "high" the other is "low." If leads 410 and 410' were directly applied to the output terminals of switch A–1 so that the terminal connected to the switch pole had applied to it a voltage commensurate with that provided by source 804, the other terminal would be floating. Of course, floating may likewise be avoided by utilizing a double-pole, double-throw switch having one input terminal grounded and the other input terminal connected to source 802. The advantage of flip-flop 804 is the rapidity with which the switching state may be changed by the application of a suitable trigger voltage and the inherent characteristic of mutual exclusiveness of "high" and "low" output signals. Each of output leads 410 and 410' is also connected, via individual unidirectional conducting devices, such as conventional diodes generally designated by reference characters "X," to one of the input terminals of cam switches B–1 and B–2. Leads 410 and 410' are therefore the output leads of encoder 402 providing the least significant digit and its complement of the digital latitude zone number as shown in FIG. 4 and the input leads to the succeeding stage providing the second least significant digit and its complement. The bracketed reference characters refer to the output leads from the longitude encoder means 406, FIG. 4, and depict the corresponding output leads from the encoder means which may be utilized for the longitude channel. Both the latitude and longitude encoder may have the same circuit configuration.

Cam switches B–1 and B–2, driven by cam B, form a pair of cam switches having a common "up" and a common "down" terminal. These terminals will be referred to as the terminals of switching pair B. In a similar manner, each of the two cam switches associated with a single cam form a pair of cam switches having a common "up" and a common "down" terminal. In this manner, nine pairs of switches are formed comprising the following switches: B–1 and B–2; C–1 and C–2; D–1 and D–2; B'–1 and B'–2; C'–1 and C'–2; D'–1 and D'–2; B"–1 and B"–2; C"–1 and C"–2; and D"–1 and D"–2. The nine pairs of cam switches have their common "down" terminals respectively connected to output leads 411, 412, 413, 414, 415, 416, 417 and 418, which provide respectively the second to ninth digit of the latitude zone number, the last pair of cam switches having no output lead since only nine digits are necessary to code the latitude zones. For use as the longitude encoder means, the last pair of cam switches is required and the corresponding output leads are shown in FIG. 8 parenthesis. Additionally, output leads may be connected to the "up" terminals of the switch pairs for providing the complement of each of the zone digits. These output leads are designated by reference characters of the zone digits with a dash affixed thereto.

Just like the "up" terminal of cam switch A is connected, via a diode X, to the input terminal of switch B–1 and the "down" terminal of cam switch A is connected, via a diode X, to the input terminal of switch B–2, so each of the sequentially arranged cam switches are connected to one or the other of the "up" and "down" terminals of the preceding switch pair. For example, cam switch C–1 is connected, via a diode X, to the "up" terminal of switch pair B and cam switch C–2 is connected, via a diode X, to the "down" terminal of switch pair B.

The reason for inserting diodes X between succeeding stages is to effectively isolate each stage from the preceding stages. In the absence of the isolation diodes, a utilization device connected to, say lead 13, might give rise to back currents flowing back through switch D–1 to lead 412', and so forth, and cause erroneous read-out. Diodes X effectively prevent the current from backtracking and ensure the application of power to the poles of succeeding switches. Diodes X may comprise silicon junction rectifier cells, such as are commercially designated as 1N537, and are shown suitably connected for the "high" output signal from flip-flop, being negative. For reasons which will become more apparent in connection with the description of FIG. 15, the clamped voltages providing the "high" and "low" output signals from flip-flop have been selected, by way of example, as being respectively −10 and zero volts.

The operation of the encoder means of FIG. 8 will now be explained with the aid of the curves shown in FIG. 7 which also provide the necessary information on the angular positions of the various cams. The switching state of cam switch A–1, which incidentally controls the coder in a manner similar to a clock-pulse, is depicted by curve 700 showing a change of switching state each time a zone is traversed. The solid outlined portion of curve 700, designated generally by reference character "S," represents voltage output on output lead 410 and signifies the presence of a "one." For example, curve 700 shows that a digit of "one" appears in odd zones and a "zero" appears in even zones. Curve 701 shows the digital state of output lead 410', the complement of the digital number of output lead 410. Of course, curves 700 and 701 also represent the input voltage to cam switches B–1 and B–2. Switching state of cam switch A–1 is shown in the "down" position, which may be arbitrarily said to be the position where the lobe of cam A engages cam swtich A–1.

The switching action of cam switch B–1 is shown by curve 702, from which it may be seen that a change of switching state occurs every two zones. The angular positions of the lobes on cam A are angularly disposed such that the change of switching state of cam switch B-1 occurs at the center of each odd zone. Similarly, curve 704 shows the switching action of cam switch B-2 whose change of switching state precedes the change of switching state of cam switch B-1 by one zone. Curves 702 and 704 have superimposed thereon solid outlined portions and hollow outlined portions respectively designated by the characters "s" and "h." The significance of the "s" and "h" portions of curve 702 will now be described. Input terminal of cam switch B-1 is connected to the "up" terminal of cam switch A-1 and therefore receives an input signal only when the "up" terminal is in the "one" or "high" state. This occurs in accordance with the "s" portions of curve 701. The "s" and "h" portions of curve 702 are therefore indicative of when voltage is applied to the input terminal of cam switch B-1. The significance of the difference between the "s" and the "h" portions themselves is that they commute the switching state of the switch. For example, "s" denotes that the switch is in the "down" position and "h" denotes that the switch is in "up" position. The same information is graphically shown in all other cam switch curves such as 704, 706, 708, 710 and 712.

Now consider the result obtained from such an arrangement. Output lead 411 will be "high" (digitally a "one") whenever the "down" terminal of switch pair B is "high." This will occur whenever the switching state of switch B-1 is "down" and lead 410 is "low" or when the switching state of switch B-2 is "down" and lead 410 is "high." For example, such a set of conditions is indicated for switch B-1 by curve 702 for zones 2, 6, 10 and 14, and for switch B-2 by curve 702 for zones 3, 7, 11 and 15. Consequently, the "down" terminal of switch pair B (and also lead 411) is "high" during zones 2, 3; 6, 7; 10, 11; and 14, 15, as indicated by curve 714. This is, of course, the second least significant digit of the zone number in natural binary code. The converse applies to the "up" terminal of switch pair B whose output can be constructed by utilizing the "h" portions of curves 702 and 704. Lead 411', connected to the "up" terminal, therefor provides the complement of the digit on lead 411, shown by curve 716.

It is interesting to note that extremely loose switching action may be tolerated of the switch and cam combination providing switch pair B. As can be seen from curve 702, during zone 1 no demands are made on switch B-1 and it is quite immaterial when the switch changes its state within zone 1. The same is, of course, true of switch B-2 which may be permitted to change its state anywhere within zone 0 without influencing the accuracy of the coding means. This clearly brings out the advantage of such a double switch coder in that the cams may be machined to loose tolerances, the angular positioning of cams and switches is not critical, and the gearing between shafts 512 and 516 (and 520 and 524) may include considerable backlash wtihout detriment to the accuracy of the coder means.

Just as the "s" portions of curves 700 and 701 represent the input voltage to the input terminals of switch pair B, so the "s" portions of curves 714 and 716 represent the input voltage to the input terminals of switch pair C. Curves 714 and 716 respectively represent the switching state of cam switches C-1 and C-2 with "s" and "h" portions superimposed thereon to indicate when a high voltage is applied to an input terminal and the switching state of the cam switch at that time. From the "s" and "h" portions on these curves the state of the output leads 412 and 412' may be easily constructed as shown by curves 718 and 720. The "s" portions of curves 718 and 720 again represent the input voltages to the input terminals of the next switch pair, which is switch pair D. In the same manner, succeeding switch pairs are actuated in the following order: switch pair B', C', D', B", C" and D". Curves 710 and 712 show the switching state of cam switches D-1 and D-2 with the "s" and "h" portions superimposed thereon to indicate when high voltage is applied to an input terminal and the switching state at that time. Curves 722 and 724 represent, as before, the output voltages on output leads 413 and 413' respectively and, at the same time, the input voltages, which are applied to the input terminal of the next succeeding switch pair. The curves shown in FIG. 7 have been drawn to illustrate the operation of the four least significant digits of the coder means. To those skilled in the art it will be obvious that curves 702, 704, 714 and 716 also represent the operation of switch pair B' and B" if the zone number in digital code is regarded as respectively representing the fifth and eighth least significant digits of the zones. Similarly, curves 706, 708, 718 and 720 may be thought to represent the operation of switch pair C' and C" and provide the sixth and ninth least significant digital zone digits, etc.

The above description of the operation of the coder means may be summarized with the aid of an illustrative example. Assume that the vehicle has just entered longitude zone 439 which is written in natural binary code as 0110110111. The switching states for the four least significant digits can be immediately determined from FIG. 7. Line 730, representing this vehicle position, passes through zone 0111 (7) and its intersection with curves 700, 702, 704, 706, 708, 710 and 712 immediately provides the desired answer. Line 730 intersects curve 700 in an "s" position so that cam switch A-1 must be in the "down" position. Line 730 also intersects curve 702 in the "down" position but, since no "s" portion is intersected, it is immaterial whether switch B-1 is "up" or "down." Of course, it is about to change its switching state from "down" to "up" and is illustrated as "down" in FIG. 8 since it has not changed yet. Line 730 also intersects curve 704 in the "down" position passing through an "s" portion. Consequently, switch B-2 must be in the "down" position as shown in FIG. 8. Line 730 also intersects curve 706 in the "up" position, but does not cut an "s" portion. Consequently, switch C-1 may be either "up" or "down." Line 730 also cuts curve 708 in the "down" position intersecting an "s" portion. Therefore, switch C-2 must be in the "down" position. Finally, line 730 intersects curves 710 and 712 in the "down" and "up" positions respectively, cutting the "h" portion of curve 712. Since no "s" or "h" portion is cut when intersecting curve 710, the switching state of switch D-1 is immaterial. However, it is shown as "down" since it is getting ready for the next zone. Switch D-2, however, must be in the "up" position since an "h" portion is next. It will be obvious to those skilled in the art that the position of the remaining switch can also be determined from the instant chart by drawing a line similar to line 730 in a zone corresponding to the fifth, sixth and seventh least significant digits and first, second and third most significant digits. The switch positions shown in FIG. 8 are all obtained by means of line 730 since the digital numbers of the fifth, sixth and seventh, and eighth, ninth and tenth digits are the same as those of the second, third and fourth digits.

It may also be mentioned that even though the various cam switches have been described as being the same ones which provide the switch pairs, it is, of course, quite evident that the cam switches energize relays which, in turn, switch the switch pairs. The system described combines these switches for the sake of simplicity only.

As has been stated in connection with the description of FIG. 4, transducers 404 and 408 are utilized as interpolator means and are operative to provide analog output signals whose magnitudes are respectively commensurate with the position of shafts 120 and 122 within one or more zones. More specifically, encoder means 402 provides a digital number whose least significant digit changes every time shaft 120 traverses an angular distance corresponding to a change of position of vehicle V of 21.0937 minutes of latitude (nautical miles) if the earth is divided into 512 latitude zones. Transducer 404 is in cooperation with encoder 402 and bridges the gap between two or any selected number of successive digital numbers by generating an analog or interpolator output signal whose magnitude indicates vehicle location within the selected number of zones so that the vehicle position is determined with great accuracy. For example, if the interpolator signal from transducer 404 linearly increases as the vehicle V traverses the selected number of zones from a point corresponding to the beginning of the selected zones, say from 0 to 100 volts, the interpolator signal is indicative of the position of vehicle V within the selected number of zones. If the number of zones is equal to one, the interpolation signal gradient is approximately 0.21 nautical mile per volt, or 1281 feet per volt. Assuming that transducer 404 is carefully constructed, having a linearity of 0.1 percent, the maximum error will not exceed ±64 feet. From the above discussion, it is immediately evident that the combination of the digital number from encoder means 402 and the interpolator output signal from transducer 404 may fix the distance of a vehicle with respect to some reference point within, say ±65 feet. Such accuracy corresponds to a resolution of about a million to one if the circumference of the earth is taken as sixty million feet. For a vehicle positioned (instantaneously or otherwise) at a longitude corresponding to 74.0000 degrees, the digital number designating the zone is obtained by dividing 74.0000 degrees (converted to minutes) by 21.0937 minutes (the zone width) resulting in 210.4894. Therefore, vehicle V is located in longitude zone 210 and, if the interpolation signal spans a single zone increasing from zero to one hundred, the magnitude of the interpolation signal is equal to 48.9 volts. The position is therefore given by digital signal 11011100 and the interpolation signal 48.9 volts.

Transducers 404 and 408 may be of like construction if so desired, one serving as interpolator means for the latitude channel and the other serving as interpolator means for the longitude channel. Accordingly, no further reference will be made to latitude or longitude in the description of the transducer. Generally speaking, transducer 404 may comprise a single 360-degree potentiometer coupled via proper gear reduction units to shaft 510 (FIG. 5) so that its associated slider arm makes one complete revolution per zone. Such a potentiometer may have one end of its winding connected to ground and the other end to some suitable voltage source. An output lead connected to the slider arm then provides the desired interpolator signal. While the above described transducer would be admirably suitable to interpolate between zones, it may, in certain applications, be desirable to employ a somewhat different transducer embodiment to be described hereinafter. The simple transducer utilizing a single 360-degree potentiometer exhibits, at least to some extent, a discontinuity as the slider moves across the space between the ends of the windings. This discontinuity, which may be objectionable, occurs as the vehicle moves across the boundary separating adjacent zones. Consequently, an uncertainty may result at that point. Further, it is usually quite difficult to provide a potentiometer which exhibits the same degree of linearity near the ends of the windings as in the midsection.

Accordingly, a transducer may be provided which includes two 180-degree potentiometers, each having a slider arm coupled to a shaft which is geared to make two revolutions per zone. Either the potentiometer windings or the slider arms are positioned in such a way that only one slider arm engages a potentiometer winding at any one time. A common lead may be coupled to the potentiometer slider arms to provide a single output lead. Both potentiometers may be energized in the same manner by a common source. The advantage of such a transducer is that each winding may be extended somewhat beyond the required 180 degrees to assure linearity near the boundary line of two zones. Of course, such an arrangement introduces some uncertainty since, during zone transition, both potentiometers contribute to the analog output signal. This may be avoided by replacing the common output lead with two separate output leads which are also connected to a single-throw, double-pole switch actuated by the least significant digit of the binary zone number. This last mentioned arrangement of a transducer is highly satisfactory and economical, and provides an errorless interpolator signal commensurate with vehicle position within a zone, one potentiometer serving even zones and the other potentiometer serving odd zones. It will be apparent to those skilled in the art that a large number of different arrangements of potentiometers of different angular lengths, together with switching means actuated by the digital zone numbers, may be utilized to provide a transducer in accordance with the teachings of this invention. Another exemplary transducer, especially well suited to the particular zoning scheme to be explained in connection with FIGS. 9a and 9b, will be described in connection with FIG. 10.

Referring now to FIG. 9a, there is shown a latitude zone chart extending from the South Pole to the North Pole, and spanning 180 degrees of latitude. The distance between the South Pole and the North Pole is divided into 512 equal parts, each part being the equivalent of 21.09375 minutes of latitude and being referred to as a latitude zone. The division into 512 zones has been selected so that, if 9 binary bits are utilized for coding the zones, there are no redundancies. Of course, in certain applications where greater accuracy is desired, the distance may be divided into 1024 or into even larger numbers of zones, the number of zones preferably being $2^n$ where $n$ is an integer. In other applications, where redundancies may be tolerated and where a zone width commensurate with degrees of latitude is desired, division in multiples or fractions of 360 may be provided.

Vehicle zones are indicated and defined in the lower portion of FIG. 9a and refer to the position of a vehicle. The first vehicle zone, to which the number 0 is assigned, commences at the South Pole, corresponding to 90 degrees south latitude, and ends at 89 degrees, 34.90625 minutes south latitude. The last vehicle zone, to which the number 511 is assigned, commences at 89 degrees, 38.90625 minutes north latitude and ends at the North Pole, corresponding to 90 degrees north latitude. For convenience, the digital vehicle zone numbers are given below the natural vehicle zone numbers. Since the zone chart commences with the South Pole and terminates at the North Pole, it may be referred to as an open-ended system. Station zones are similarly indicated and defined in the upper portion of FIG. 9a and refer to the position of a station, say $S_m$. Station zones may be of the same width as vehicle zones, and are shown shifted one-half a zone width with respect thereto. In other words, the boundary between two station zones falls at the center of a vehicle zone. More specifically, only a half-station zone extends between the South Pole and the boundary of the first full station zone, the boundary line lying on the meridian of 89 degrees 49.45312 minutes south latitude. The next station zone starts at this boundary line and extends to the meridian lying along the 89 degree, 28.35937 minute south latitude.

The zone number designations associated with the vehicle zones are entirely arbitrary, but a judicious choice may be helpful in simplifying components. The zone designation of FIG. 9a has been selected so that added means 452, FIG. 4, may operate as a straight forward adder instead of a subtractor. This is accomplished by starting the numbering of the vehicle zones at the North Pole. Of course, any other numbering scheme may be substituted therefor, the numbering scheme being merely a matter of convenience. The vehicle zones are shown by the dashed lines in FIG. 9a. The reason for the one-half zone shift will be described in connection with FIGS. 10 and 13.

Having established a suitable latitude zone chart, it is still necessary to select suitable interpolation signals with reference to the zone chart. Of course, each problem to which the data processing apparatus of this invention may be applied may benefit from a judicious selection of interpolation signals, each one being most suitable for a particular problem. As will become more evident as this description progresses, suitable interpolator signals are shown by the curves designated by reference characters R–30, R–31, R–32 and R–33 which represent the instantaneous magnitude of the interpolator signals from a transducer as a function of vehicle position. The interpolator signals are provided by potentiometers R–30, R–31, R–32 and R–33 of FIG. 10, and the same reference characters have been retained merely as a matter of convenience in understanding the operation of the transducer.

The latitude zone chart may now be utilized to define the required cooperation of the latitude encoder means 402, transducer 404 and selector 420, FIG. 4. The first requirement is that encoder means 402 provide a digital number corresponding to the zone in which the vehicle is located. The second requirement is that the combination of transducer 404 and selector 420 provide two interpolator signals one corresponding to the portion of the chart marked "even" interpolation signals (curve R–32 or R–33) and one corresponding to the portion of the chart marked "odd" interpolation signals (curve R–30 or R–31). By way of example, the signals have been shown as varying from $-100$ to $+100$ volts so that a variation of 100 volts per zone width is obtained. For a vehicle at a position designated by line 900, the latitude encoder means provides the digital number 000000011 and the transducer provides an "odd" interpolation signal of $+80$ volts and an "even" interpolation signal of $-20$ volts. For a vehicle at a position designated by line 902, the latitude encoder provides the digital number 111111110, and the transducer provides an "odd" interpolation signal of $-40$ volts and an "even" interpolation signal of $+60$ volts.

Figure 9B:
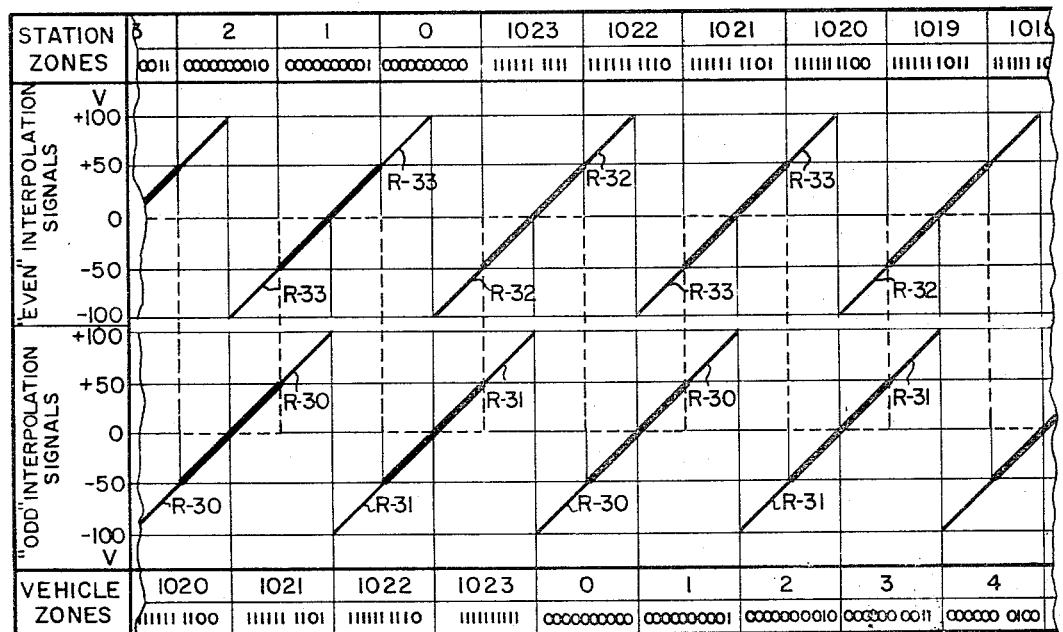

FIG. 9b shows the longitude zone chart which preferably, but not necessarily, is divided into zones having the same width at the equator as the individual latitude zone. Since it is necessary to fix the position of a vehicle with respect to 360 degrees of longitude, twice as many zones are required as for latitude determination for equal zone width. Accordingly, 1024 zones are needed and 10 binary bits are required to provide a binary nuumber uniquely fixing the longitude zone. Arbitrarily, the boundary between zones 1024 and 0 is selected as the Greenwich Meridian. Of course, the longitude zones represent a closed-ended system. Except for the above outlined differences, the latitude and longitude zone charts are alike and the description of FIG. 9a is equally applicable to FIG. 9b.

The reason for the half-zone shift between the vehicle and the station zones and utilization of an interpolation signal spanning two zones can now be explained. Just as the vehicle position is given by a digital number and an interpolation signal, so the station position requires a digital zone number and an interpolation signal. If the vehicle and station zones were not shifted with respect to one another, then, if both the vehicle and the station happen to be located at the very beginning or the very end of a zone, the interpolation signal may just have been or be about to suffer a shift as the zone changes. This may cause inaccurate results just at the point of operation where greatest accuracy is desired, namely when the distance between vehicle and station becomes a minimum. In the preferred embodiment of the input section of the latitude-longitude computer, this possible inaccuracy is entirely eliminated by shifting the station zones by a one-half zone width and operating with the interpolation signal of the vehicle over two zones.

In this manner, it is impossible to locate a station within a zone in such a manner that the transfer (which occurs within the transducer when entering the next zone) occurs nearer than a half-zone width from the station. Accordingly, the interpolation signals of the stations vary from $-50$ volts to $+50$ volts in a station zone and repeat this for each zone. The station interpolation signal is indicated by the heavy portions of curves R–30, R–31, R–32 and R–33. The location of the station determines whether the "even" or the "odd" vehicle interpolation signal will be selected for the arithmetical operations. For example, if a station is located within an "even" numbered station zone, the "even" interpolation signal is utilized for computing the distance and direction between V and $S_m$ since it only transfers in "odd" numbered station zones. It is to be understood, of course, that the particular relationship between the interpolation signals of the vehicle and station, their magnitude and respective variation with respect to one or more zones are shown only by way of example and for the purpose of illustrating a preferred arrangement. Variation of the coding scheme and relationships between interpolation signals should be evident to those skilled in the art from the description here given.

FIG. 10 shows details of transducer 404 together with the potentiometer selection circuit 420 and "odd" or "even" selection circuit 422. The combination thereof provides the vehicle interpolation signal, which combination may therefore be called the vehicle interpolation signal means of station $S_m$. The latitude and the longitude channels each require a vehicle interpolation signal means, but they may be of similar construction and, consequently, no further reference will be made to latitude and longitude. Since it is desirable to compute the distances and bearings from a vehicle with respect to a number of different stations, say $S_1$ to $S_n$, and since each station must select its own vehicle interpolation signal which is either "odd" or "even," a different "odd" or "even" selection circuit 422 is associated with each station. Therefore, the portion of the vehicle interpolation signal means common to all stations comprises transducer 404 which, with its associated potentiometer selection circuit 420, may generally be referred to as the common interpolation signal means.

Transducer 404 includes four potentiometers R–30, R–31, R–32 and R–33 which may be conventional single-turn potentiometers having a center tapped winding spanning an electrical angle of approximately 180 degrees or greater. In practice, the electrical angle should be greater than 180 degrees, which constitutes the desired usable angular portion of the potentiometer by, say 20 to 40 degrees, so that no sudden discontinuties are encountered at the beginning and end of the usable portion. The rotors of the potentiometers which actuate the individual slider arms are connected to common shaft 510, FIG. 5, which makes one complete revolution for a linear distance of vehicle travel corresponding to four zones. The relative position between each potentiometer and its associated slider arm is such that every slider arm contacts the center tap of its associated potentiometer at a different shaft angle of shaft 510. The respective shaft angles of contact are 0, 90, 180 and 270 degrees. There are, of course, two ways of achieving such staggered potentiometer outputs: either the potentiometer windings are paralleled and the slider arms are staggered in 90-degree intervals or the slider arms are paralleled and the potentiometer windings are staggered in 90-degree intervals. In FIG. 10 the second way is illustrated by way of example. As shown, all four slider arms are paralleled and potentiometer windings are arranged so that windings R–30, R–31, R–32 and R–33 respectively occupy shaft angles 0 to 180, 180 to 0, 270 to 90 and 90 to 270 degrees.

Potentiometers R–30 and R–31 form a pair which provides the "odd" interpolation signal, and potentiometers R–32 and R–33 form a pair which provides the "even" interpolation signal. Assume, for example, that the ends of each potentiometer winding are respectively connected to conventional −100 volt and +100 volt supplies. Assume further that, when the slider arms are straight up, the shaft position of shaft 510 corresponds to 0 degrees, which shaft position is commensurate with a vehicle position on the boundary line between the $4n^{th}$ and $4n+1^{th}$ vehicle zone, where $n$ is any integer. Since shaft 510 makes one revolution every 4 zones, the $4n^{th}$ zone corresponds to a vehicle position at the boundary separating a zone whose two least significant digits are 11 from a zone whose two least significant digits are 00. FIG. 11a illustrates graphically the relationship between a slider arm 1105 coupled to shaft 510 and rotating clockwise. The end point of slider arm 1105 describes a circular path which is divided by lines 1102 and 1104 into four sectors, each sector corresponding to a zone. The zones are identified by the two least significant binary digits.

Referring again to FIG. 10, as slider arm 1105 traverses zone 00, the interpolation signals on leads 1005 and 1007 change from −100 to 0 volts (R-30) and from 0 to +100 volts (R-32) respectively, output leads 1006 and 1008 having no output signal. These changes are illustrated in FIG. 9a by curves having reference characters 903 and 904. During traversal of the zone 01, the interpolation signals on leads 1005 and 1008 change from 0 to +100 volts (R-30) and from −100 to 0 volts (R-33) respectively, output leads 1006 and 1007 having no output signal. These changes are illustrated in FIG. 9a by curves having reference characters 905 and 906. During traversal of zone 10, the interpolation signals on leads 1006 and 1008 change from −100 to 0 volts (R-31) and from 0 to +100 volts (R-33) respectively, there being no output signals from leads 1005 and 1007. These changes are illustrated in FIG. 9a by curves having reference characters 908 and 910. During traversal of zone 11, the interpolation signals on leads 1006 and 1007 change from −100 to 0 volts (R-31) and from 0 to +100 volts (R-32) respectively, there being no output signals from lead 1005 and 1008. This condition is shown by curves 912 and 914 in FIG. 9a. The above is, of course, repeated for the next four zones and so on in the same manner.

Potentiometer selection circuit 420, FIG. 10 includes two switch means such as the conventional single-pole, double-throw relays K-1 and K-2, and a control means such as logic circuit 1009. The purpose of selection circuit 420 is to operate upon the interpolation signal on leads 1005 to 1008 in such a manner as to provide the "odd" and "even" interpolation signals in accordance with curves R-30 to R-33 of FIG. 9a (or FIG. 9b). By connecting leads 1005 and 1006 to the two poles of relay K-1 and leads 1007 and 1008 to the two poles of relay K-2, the proper "odd" and "even" interpolation signals may be obtained. Relay K-1 must provide contact to lead 1005 in zones 00 and 01 and to lead 1006 in zones 10 and 11. Similarly, relay K-2 must provide contact to lead 1007 in zones 11 and 00 and to lead 1008 in zones 01 and 10. This switching arrangement is shown in tabulated form in FIG. 11b. To provide synchronism between interpolation signals and digital zone numbers and thereby improve accuracy, it is desirable to actuate relays K-1 and K-2 directly from the two least significant binary digits which are available on leads 410 and 411, FIG. 4. Lead 411 may, therefore, be directly connected to relay K-1 and leads 410 and 411 are connected, via an "EXCLUSIVE-OR" circuit 1009 to relay K-2. Conventional "EXCLUSIVE-OR" circuit 1009, shown in FIG. 12, includes two complementing circuits 1200 and 1202, two "AND" circuits 1204 and 1206 and an "OR" circuit 1208 as well known to those skilled in the computer art. Other well known "EXCLUSIVE-OR" circuits may be substituted therefor.

Output lead 1012, providing the "odd" interpolation signal and output lead 1014 from potentiometer selection circuit 420 are the output leads from the interpolator means and are applied to the "odd" or "even" selection circuits (such as circuit 422) of each station. Selection circuit 422 may be a well known switching means such as conventional single-pole double-throw relay K-3 actuated by the least significant binary digit of the station zone, as applied via lead 460. Output lead 424 then provides the properly selected vehicle interpolator signal. If station $S_m$ is located in zone 503, FIG. 9a, its least significant digit is a "one" and relay K-3 connects lead 1012 to output lead 424. If station $S_m$ is located in zone 502, its least significant digit is a "zero" and relay K-3 connects lead 1014 to output lead 424. In this manner the desired vehicle interpolation signal is provided. The above description is likewise applicable to the longitude vehicle location which is available on lead 444, FIG. 4.

From the above description it is now evident that the digital signal and the interpolation signal are in synchronism. Both the encoder providing the digital signal and the transducer providing the interpolation signal are actuated by the same shaft 510. In addition to a common actuating shaft, the digital signal may also be utilized, for increased accuracy, to control switching means 420 and thereby to control the interpolation signal to assure that a change in interpolation signal only takes place as the digital signal changes. In this manner, all errors or inaccuracies due to backlash or other defects of gearing are avoided and proper synchronized output is assured.

Figure 13:
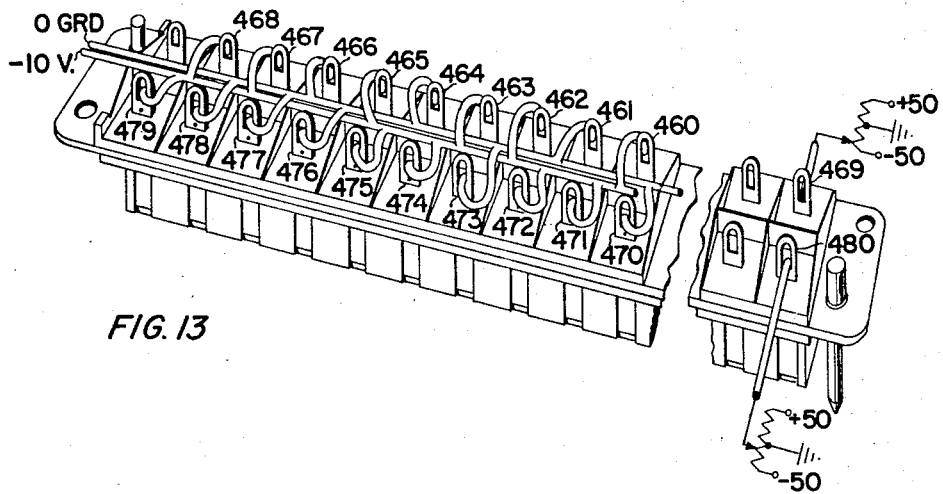
FIG. 13 is a perspective view of a station simulator which may be used in connection with the computer of FIG. 4.

One embodiment of station simulator 450, FIG. 4, for station $S_m$ is shown in FIG. 13 as comprising a conventional Amphenol Blue-Ribbon male connector bearing 19 jumper wires for digit information and 2 potentiometers to establish the station interpolation signals. One row of male connectors may be utilized for providing a digital number commensurate with station latitude zone and the other row may be utilized to provide a number commensurate with station longitude zone. This may be accomplished by connecting all male connectors which are to provide a binary bit equal to a "one" to a source having an output potential of −10 volts, and connecting the remaining male connectors which are to provide a binary bit equal to a "zero" to a common ground connector. All male connectors are numbered by the reference characters utilized in FIG. 4, where connectors 460 and 470 respectively provide the least significant binary bits of the latitude and the longitude station position. Also, male connectors 469 and 480 respectively provide the analog output signals of the latitude and longitude station position.

By way of illustration, the station simulator of FIG. 13 simulates a station $S_m$ located in latitude zone 110101101 which corresponds to natural zone number 429, and longitude zone number 1000110110 which corresponds to natural zone number 566. Digital zone numbers are always positive even though the interpolation signals may be either positive or negative. In the particular zoning system shown in FIG. 9a and FIG. 9b, the station interpolation signal within a station zone changes from −50 volts to +50 volts, being zero at the center of the station zone. The station interpolation signal is preferably a linear function of station position within a selected zone having a gradient of 100 volts per zone as shown by curve 920 for station zone 507 and curve 922 for station zone 508, FIG. 9a. It is of interest to note that the interpolation signals of vehicle V and station $S_m$ coincide when both are within one-half zone widths from one another.

The remaining male connectors of the station simulator may be utilized to provide certain desired information regarding the station. For example, if the latitude-longitude computer of this invention is used in connection with flight simulators, station $S_m$ may simulate a radio aid navigation facility, and therefore information such as type of facility, call letters, width or length of runway, etc. may be supplied to the student by utilizing the remaining unused male connectors in a manner which will become apparent by reference to my copending application Ser. No. 648,462, filed Mar. 22, 1957 and assigned to the same assignee as the present invention.

Instead of utilizing a connector as station simulator 450, FIG. 4, it may be advantageous in certain applications to employ conventional card or tape readers for providing the digital latitude and longitude zone numbers and other information. For example, the Taurus Corporation, Lambertville, N.J., manufactures a card reader called Punched Card Sensor. Model K–1 of this reader accepts conventional Remington Rand punched cards having 540 hole positions and model M–1 accepts conventional IBM punched cards having 960 hole positions. When a reader is utilized, the latitude and longitude station interpolation signals may be supplied by conventional potentiometers coupled directly to leads 469 and 480, FIG. 4. There are certain advantages in utilizing readers. For example, a connector such as shown in FIG. 13, once wired, cannot readily be changed. If the latitude-longitude computer of this invention is used in connection with flight simulators, there may be need to simulate thousands of different stations in the course of training aviation students. Even though only a small number of stations are employed in any given flight problem, there may be many different flight problems used for different purposes and for different students and for different vehicles. Consequently, an unduly large number of differently wired plugs may be required. Utilization of punched cards, such as the well-known IBM punched cards, obviates the problem almost entirely. Also, radionavigation stations are often relocated or recoded necessitating changed coordinates or code letters. With punched cards, a change of station characteristics merely necessitates the substitution of an inexpensive card, which is always cheaper and more economical than reworking or replacing connectors which may have many internal jumpers. Accordingly, the term "station means" or "station simulator" is to encompass plugs, readers and other well-known apparatus which are adopted to apply and maintain a digital number into some utilization device such as an adder.

Conventional digital adders or subtractors, such as are fully described in the literature, may be utilized to provide latitude and longitude adder means 452 and 445, FIG. 4. See, for example, Chapter 4 of "Arithmetic Operation in Digital Computers," by R. K. Richards, Van Nostrand Company, Inc., 1955; or Chapter 9 of "Logical Design of Digital Computers" by M. Phister, Jr., John Wiley & Sons, 1957. Input signals in binary form are applied to latitude adder means 452 by latitude encoder means 402 and station simulator 450. The binary input signals are applied via leads 410 to 418 and 460 to 468, and comprise two nine-digit binary numbers if the earth is divided into 512 latitude zones. Similarly, input signals in binary form are applied to longitude adder means 445 by longitude encoder means 406 and station simulator 450. The binary input signals comprise two ten-digit binary numbers if the earth is divided into 1024 longitude zones. Of course, the number of digits of the binary signal representing the zone depends entirely on the total number of zones into which the earth (or any other quantity) is divided as will be obvious to those skilled in the art.

Ordinarily, all binary numbers impressed upon adder means 452 and 445 may be regarded as positive numbers. The adder means operates upon the impressed binary number and derives a binary number representative of the number of zones separating vehicle V from station $S_m$. This zone difference may be either positive or negative depending on which side of vehicle V the station $S_m$ is located. Accordingly, one digit of the binary number representing the zone difference must be reserved to provide the sign or polarity. In some applications of this invention, it may be found necessary to provide ten-digit binary numbers for the latitude zone difference and an eleven-digit binary number for the longitudinal zone difference. For example, if the interpolation signal repeats every zone (spans only a single zone instead of two zones as illustrated in FIG. 9a) ten- and eleven-digit binary numbers may be required.

Interconnection of the various adder circuits to provide the desired zone difference depends, at least to some extent, on the digital numbers assigned to the vehicle and station zones and on the adder circuits, as is well known to those skilled in the art. For example, an arithmetic full-adder may be utilized to subtract one binary digit from another in the subtrahend is first complemented. The latitude and longitude adder means respectively shown in FIGS. 14a and 14b have been selected as illustrative examples because of their suitability in connection with the illustrated coding scheme of FIGS. 9a and 9b. Connections are different for the open-ended latitude system, FIG. 14a, and the closed-ended longitude system, FIG. 14b, as will become more evident hereinafter. Since the digital number associated with each particular vehicle and station zone is an important fact to be considered in designing the proper adder means, the digital numbers shown in FIGS. 9a and 9b will be used. The zone numbers of the station zones increase to the left, whereas the zone numbers of the vehicle zones increase to the right. The reason for such a convention is that the station zones as shown are really the "ones-complement" of station zone numbers in increasing order in the same direction as the vehicle zones. Of course, the same result is obtained by numbering both the vehicle and station zones in increasing order in the same direction and generating, by means of station simulator 450, FIG. 4, the "ones-complement" of the station zones and applying the "ones-complement" to the adder means.

Figure 14A:
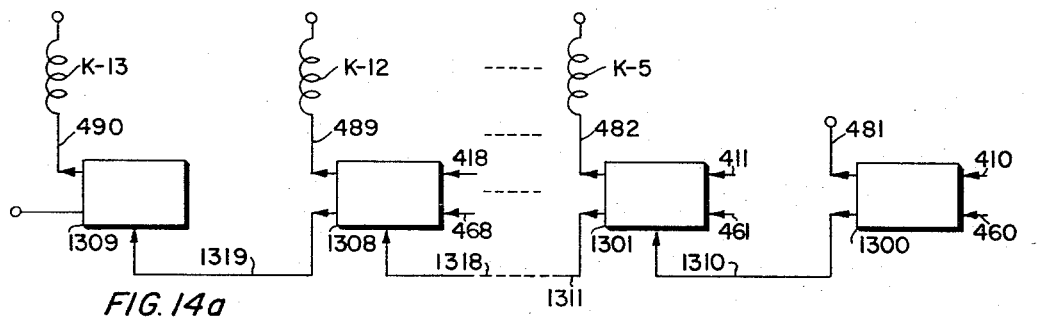
FIGS. 14a and 14b are electrical schematic diagrams of the adder means of the computer of FIG. 4.

Referring now to the specific latitude adder means of FIG. 14a, it can be seen to include a number of conventional adder circuits of which the first two and the last two are shown and designated respectively by reference characters 1300, 1301, 1308 and 1309. Each bit of a latitude zone number is associated with a different adder circuit so that, for a division of the earth into 512 latitude zones, at least nine adder circuits are required. The tenth adder circuit 1309 is superfluous, but has been included so that like adder means may be utilized for both the latitude and longitude channels. Further, a small saving of components may, in some instances, be effected by utilizing half-adders for the least significant zone bits in both the latitude and the longitude channels if the interpolation signal spans two zones.

Adder circuit 1300 is responsive to the least significant vehicle and station latitude zone bits, applied thereto by leads 410 and 460 respectively, and is operative to develop the sum and carry output bits upon output leads 491 and 1310. Similarly, adder circuit 1301 is responsive to the second least significant vehicle and station latitude zone bits and the carry bit of adder circuit 1300 applied thereto by leads 411, 461 and 1310, and is operative to develop the sum and carry bits upon output leads 482 and 1311. This method of interconnection is repeated for each succeeding adder circuit, which is responsive to the next more significant bit and the carry of the preceding adder circuit. Adder circuit 1308 is responsive to the most significant vehicle and station latitude zone bits and the carry output bit from the preceding adder circuit applied thereto via leads 418, 468 and 1318, and is operative to develop the sum and carry output bits upon leads 489 and 1319. Output lead 1319 may be directly connected to lead 490 or, as shown may be connected as the sole input lead to adder 1309 whose sum output lead 490, of course, provides the same output bit. The sum output bits of the latitude zone difference impressed upon leads 481 to 490 are applied to decoder means 453, FIG. 4, which may include some activating means such as the actuating coils K–5 to K–13 of a set of relays which will be described in detail in connection with FIG. 16.

For the particular coding scheme and interpolation signals selected as an illustrative example in connection with the explanation of this invention, the least significant sum digit impressed upon lead 481 is not utilized any further, it being immaterial whether it is "one" or "zero." Of course, it remains the least significant digit of the zone difference binary number, but the zone difference only changes by two zones. Therefore, the significant digits of the zone difference are provided by eight bits (on leads 482 to 489) and the zone difference itself must be multiplied by a factor of two. The sum bit on lead 490 provides information of the relative positions of the vehicle with respect to the station. If the zones are numbered and the interpolation signals supplied in accordance with the scheme of FIG. 9a, the following rules will provide the correct latitude zone difference on leads 482 to 489. If lead 490 is "one," the latitude zone difference is positive, meaning that station $S_m$ is south of vehicle V and one bit must be added to the digital number applied to leads 482 to 489 before converting to a natural number and multiplying by a factor of two. For example, if leads 482 to 489 provide the digital number 00110100 and lead 490 is a "one," add one bit to get 00110101. This binary number corresponds to the natural number 53. After multiplying by two, the correct latitude zone difference of 106 zones is obtained and station $S_m$ is 106 zones south of vehicle V. If lead 490 is "zero," the zone difference is negative meaning that station $S_m$ is north of vehicle V and the "ones complement" of the digital zone difference must be formed before obtaining the natural number and multiplying by a factor of two. For example, if leads 482 to 489 provide the digital number 01010101 and lead 490 is "0," form the "ones complement" to get 10101010. This binary number corresponds to natural number 170. After multiplying by two the correct latitude zone difference of −340 zones is obtained and the station $S_m$ is 340 zones north of vehicle V.

Figure 14B:
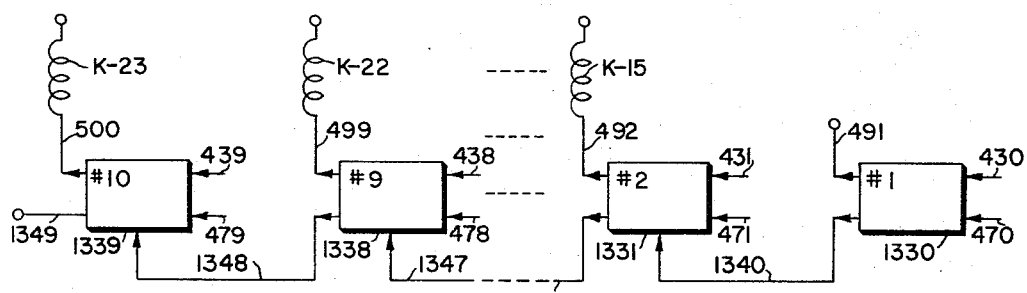

Longitude adder means, FIG. 14b, may be similar in construction to the latitude adder means except that the tenth adder circuit, which was optional in FIG. 14a, is absolutely necessary. The reason for the tenth adder is, of course, that the longitude zone number requires a ten-digit number. Accordingly, adder circuits 1330 to 1339 are provided, each being associated with a different longitude zone bit. Adder circuit 1330 is responsive to the least significant vehicle bit and the station longitude zone bit applied thereto by leads 430 and 470, and is operative to provide the least significant longitude zone difference sum and carry output bits via output leads 491 and 1340. Similarly, adder circuit 1331 is responsive to the second least significant vehicle and station longitude zone bits and the carry output bit of the least significant longitude zone difference applied thereto via leads 431, 471 and 1340, and is operative to develop the second least significant sum and carry longitude zone difference output bits via output leads 492 and 1341. In a similar manner, the remaining adder circuits 1338 and 1339 are responsive to the two most significant vehicle and station longitude zone bits applied thereto via leads 439, 479, 439, 479 and the two most significant sum and carry longitude zone difference output bits upon output leads 499, 1348, 500 and 1349. The carry output bit from adder 1339 is not required in some applications so that the most economical adder means may include eight full adders (1331 to 1338) and two half-adders 1330 and 1339, and may be used either as longitude or latitude adder means if modular units are desired. The longitude zone difference is provided by leads 491 to 499, lead 500 providing a bit representing the relative positions of vehicle V and station $S_m$. The longitude adder means may be coupled to a conventional decoder means, such as decoder 446, which may include actuating means such as relays having relay activating coils K–15 to K–23, each coupled to a different one of output leads 492 to 500.

For reasons explained in connection with the latitude adder means of FIG. 14a, output lead 491, providing the least significant bit of the longitude zone difference, need not be decoded if the interpolation signal spans two zones. Of course, if a coding scheme is selected in which the interpolation signal repeats itself every zone, then the least significant zone difference must be decoded just like all the other binary bits. The main difference between the latitude and longitude adder means is that the latter is utilized with a closed-ended system and usually only the shortest distance between vehicle V and station $S_m$ is desired. Since the shortest distance is equal to or less than one-half of the total number of zones into which longitude is divided, the most significant sum zone difference bit need not be decoded to derive the quantized analog zone difference signal. However, the most significant sum bit is required to provide the sign, i.e. the determination whether vehicle V is east or west of station $S_m$.

Accordingly, the digital number representing the longitude zone difference is provided by output leads 492 to 499. This number must be multiplied by a factor of two after converting to natural numbers since the least significant digit is not used. Utilizing the coding scheme of FIG. 9b, the following rules must be observed. If lead 500 is "one" the zone difference is negative; that is, station $S_m$ is east of vehicle V and the digital number from leads 492 to 499 must be "ones complemented" before converting to natural numbers and multiplying by two. For example, if leads 492 to 499 provide a digital number 01010101 and lead 500 is "one," form the "ones complement" to get 10101010. This binary number corresponds to the natural number 170. After multiplying by two the correct longitude zone difference 340 is obtained, and station $S_m$ is 340 zones east of vehicle V. If lead 500 is "zero," the digital zone difference is positive; that is station $S_m$ is west of vehicle V and the digital number from leads 492 to 499 must be increased by one digit before converting to natural numbers and multiplying by two. This is, of course, the same as adding two zones to the digital number supplied by leads 492 to 499, keeping in mind that one bit on lead 492 is the second least significant digit. For example, if leads 492 to 499 provide the digital number 10010110 and lead 500 is a "zero," add one bit to get 10010111. This binary number corresponds to the natural zone number 151. After multiplying by two, the correct longitude zone difference of 302 zones is obtained and station $S_m$ is 302 zones west of vehicle V.

The circuit shown in FIG. 15 illustrates a transistorized full adder and is exemplary of adder circuits 1301 to 1308 of FIG. 14a and 1331 to 1338 of FIG. 14b. To illustrate the various input and output signals which are applied to and obtained from the exemplary full adder of FIG. 15, adder circuit 1308 of FIG. 14a has been selected. Adder 1308 may comprise two PNP type transistors, each having a collector, a base and an emitter electrode. The two binary bits to be added are applied to input leads 418 and 468 in the form of negative pulses, say −10 volts as was assumed in connection with the explanation of the clamped voltages of the encoder means of FIG. 8. The carry output bit from the preceding adder circuit is applied likewise in the form of a negative pulse via lead 1318. Each one of leads 418, 468 and 1318 is connected to each of the base electrodes of transistors $T_1$ and $T_2$ through impedances $R_T$. The collector electrode of transistor $T_2$ is clamped at a voltage equal to that of the magnitude of the negative bit pulse by means of a diode $X_T$ and a negative voltage supply. The sum bit is obtained on lead 489 from the collector electrode of transistor $T_1$ which is negative biased through a conventional load resistor. The carry bit is impressed on lead 1319 from the clamped collector electrode of transistor $T_2$.

Both the sum output bit and the carry output bit are "ones complements" of the desired output bits and may require inverting. Accordingly, conventional inverter 1500 may be inserted into output lead 489 and conventional inverter 1502 may be inserted into output lead 1319 so that the output pulses have the proper polarity. Those skilled in the digital computer art will, of course, realize that inverters 1500 and 1502 may be dispensed with if a proper selection of input signals is made. For example, the encoder of FIG. 8 provides each of its binary output bits either in complemented or uncomplemented form. Likewise, the station bits which are derived from a punch card reader or a wired plug may easily be provided either complemented or uncomplemented by simply reversing a lead or punching appropriate holes. Therefore, it may be possible to select input bits to the various adders in such a manner that all inverters operating upon the carry bit may be eliminated. One scheme is to apply complemented input bits to alternate adder circuits so that the proper carry bit for the succeeding stages is developed. The sum bit, of course, then includes complemented alternate bits. But such a digital number may easily be converted to a proper quantized analog signal by proper circuit connections as will be explained in connection with the decoder of FIG. 16. Such a scheme does not involve added components since the digital zone difference must be complemented anyhow if the vehicle passes a station and thereby changes the sign of its zone difference.

It is, of course, to be understood that most conventional adders are suitable for incorporation with the adder means of FIGS. 14a and 14b. For a selection of such adders see Chapter 4 of "Arithmetic Operation in Digital Computers" by R. K. Richards, published by Van Nostrand Co., Inc., 1955. Also, the circuit of FIG. 15 may be modified to receive positive pulses by substituting an NPN transistor for transistors $T_1$ and $T_2$ and changing the biasing voltages for proper operation of NPN transistors, as is well known by those skilled in the art.

The latitude and longitude zone differences, provided in digital form by adder means 452 and 445 respectively, may then be applied to conventional decoder means 453 and 446, which are operative to convert the applied digital zone differences into corresponding analog electrical signals, also referred to as quantized analog zone difference signals or simply as quantized analog signals. Conventional decoder means are well known to those skilled in the art and are fully described in the literature. For example, see Chapter 5, Section B, C and D in "Notes on Analog-Digital Conversion Techniques" Ibid.

Figure 16:
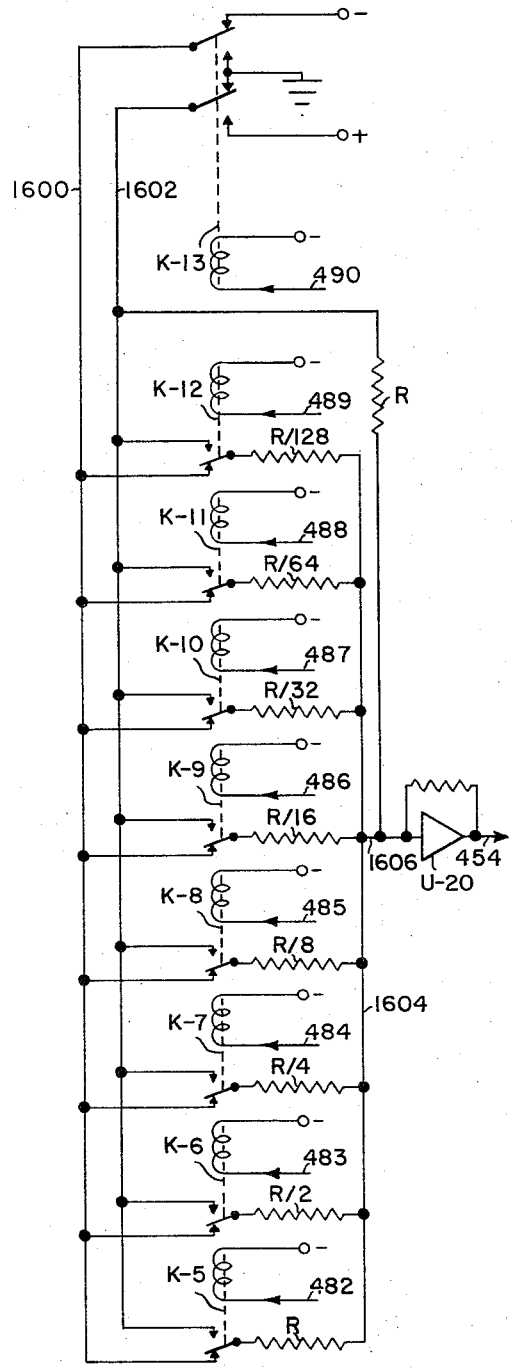
FIG. 16 is an electrical schematic diagram of the decoder of the computer of FIG. 4.

An exemplary decoder means, particularly suitable for the data processing apparatus of this invention because of its simplicity, reliability and low cost and which effectively complements the applied binary zone difference number whenever required, is shown in FIG. 16. The exemplary decoder operates upon the well-known principle of utilizing the individual binary bits of the applied binary zone difference number to switch weighted resistors into the output circuit of a current source means in accordance with the applied binary zone difference number. The exemplary decoder means of FIG. 16 has been selected to operate with the latitude adder means of FIG. 14a and includes nine relays K-5 to K-13, each one including an actuating coil to which leads 482 to 490 respectively are connected. The same reference characters are used to designate either the actuating coil or the relay or both for the sake of simplicity.

Accordingly, a current source, generally indicated by a plus and a minus sign, applies its output potential to two of the terminals of a conventional double-pole, double-throw relay K-13 whose actuating coil is coupled to lead 490 and which provides the "sign" bit. The remaining two terminals of relay K-13 are connected to ground. The two common terminals of double-pole, double throw relay K-13 are connected respectively to two buss bars 1600 and 1602. In this manner, buss bar 1600 is connected to the negative potential and buss bar 1602 to ground when relay K-13 is in its normal state, i.e. lead 490 is "zero." When lead 490 is "one," relay K-13 is in its energized state and buss bar 1602 is connected to the positive potential while buss bar 1600 is grounded.

A plurality of single-pole, double-throw relays, each actuated by a different one of coils K-5 to K-12, are connected across buss bars 1600 and 1602. The common terminal of each relay is connected through a different one of a set of weighted resistors to a common output lead 1604. Each relay is associated with a different digit of the latitude zone difference number to be decoded and the impedance value of the resistances between each switch and common lead 1604 decrease by a factor of two as the significance of the digit increases by one. For example, the least significant digit of the latitude zone difference number is applied via lead 482 to relay K-5. The resistive value of the impedance connecting a selected one of buss bars 1600 and 1602 to common lead 1604 is R. Relay K-6 is actuated by lead 483 upon which the second least significant digit of the latitude zone difference number is impressed. Its associated impedance has a value of R divided by 2. More generally, the relay actuated by the $i^{th}$ least significant digit of the latitude zone difference number has an associated impedance whose resistive value is equal to R divided by $2^{i-1}$.

Common lead 1604 is connected via lead 1606 to a conventional summing amplifier U-20 having an output lead 454 (also shown in FIG. 4). Connected between buss bar 1602 and input lead 1606 is an impedance having a resistive value equal to R. The purpose of this last mentioned impedance, the shunt impedance, is to provide an additional amount of quantized analog signal at output lead 454 equal in effect to adding a "one" to the least significant latitude zone difference number when relay K-13 is energized. If relay K-13 is in its normal state, the shunt impedance is grounded and is of no effect. As may be remembered from the discussion in connection with FIG. 14a, if lead 490 is "one" the desired quantized difference signal is positive and two zones are required to be added. This is exactly the effect of shunted impedance R when relay K-13 is energized, if it is remembered that the least significant latitude zone difference number corresponds to two zones.

The operation of the decoder of FIG. 6 is as follows. As long as relay K-13 is in its normal or neutral state, that is lead 490 is "zero," buss bar 1602 is grounded and buss bar 1600 is negative with respect to ground. The latitude zone difference number is impressed upon relays K-5 to K-12. Any "zero" digit will cause current to flow through the weighted resistor associated with the appropriate digit relay, and a negative quantized analog signal is obtained from lead 454. This corresponds to a complementation of the zone difference number since a "one" digit merely grounds the associated weighted resistor. This, of course, is exactly the desired result described in connection with FIG. 14a; namely to obtain a negative quantized analog signal from the complemented latitude zone difference number.

When relay K-13 is actuated, that is lead 490 is "one," buss bar 1600 is grounded and buss bar 1602 is positive with respect to ground. The shunting impedance R is now in the circuit causing a current flow and thereby developing a quantized analog signal commensurate with the effect produced by a "one" least significant zone difference number digit. Also, a "one" bit applied to a relay will develop an appropriate positive quantized analog signal in accordance with the weighted resistor associated with said relay. A "zero" bit applied to a relay is of no effect. This is again the desired result; namely the addition of a "one" to the least significant latitude zone difference number and a positive quantized analog signal.

It can now easily be seen that inverters like inverter 1500, FIG. 15, may be eliminated entirely by reversing the circuit connections to alternate relays such as relays K-5, K-7, K-9, etc. shown in FIG. 16, if appropriate changes, suggested in connection with the description of FIG. 15, are made. That is, alternate adder circuits have applied thereto input quantities which are the complements of those described in connection with FIGS. 14a and 14b.

The decoder means suitable for the longitude channel may be similar in construction to the one described in connection with FIG. 16, except that the polarity to the input terminals of relay K-13 is reversed. The reason for this change of polarity is that a "one" impressed upon lead 500 requires a complementing of the longitude zone difference number and a negative quantized analog signal in accordance with the zone numbering and sign convention adopted in connection with the zone chart of FIG. 14b. It is, of course, to be understood that slight modifications of the decoder may become necessary with a change of the zoning charts and polarity conventions as will be obvious to those skilled in the art.

Referring once more briefly to FIG. 4, the quantized analog difference signal from decoder means 453 is applied to conventional summing amplifier 455 together with the interpolation difference signal from summing amplifier 456. The sum of the latitude interpolation difference signal, commensurate with latitude difference of vehicle V and a station $S_m$ as measured from a line defining the beginning of latitude zone in which vehicle V and station $S_m$ respectively are located, and the quantized analog difference signal, commensurate with the latitude zone separation between vehicle V and station $S_m$, provides the desired output signal $\Delta L_m$ commensurate with the total latitude separation between vehicle V and station $S_m$. Likewise, the quantized analog difference signal from decoder means 446 is applied to conventional summing means 448 together with the interpolation difference signal from summing amplifier 449, and provides the desired total longitude separation $\Delta \lambda_m$ between vehicle V and station $S_m$, which may be reduced to mileage separation by multiplication by a factor equal to cos $L$ where L is the latitude of vehicle V.

There has been described a data processing apparatus in which a latitude-longitude computer may be utilized to convert rectangular velocity components of an actual or simulated vehicle into a non-developable coordinate system such as spherical coordinates. The computer described provides a pair of output quantities, in terms of angular shaft position, which are commensurate with the instantaneous latitude and longitude of the vehicle, and another pair of outout quantities which are commensurate with rectangular position coordinates of an actual or simulated vehicle with respect to the poles. Of course, computer 100 may likewise be employed to provide output quantities commensurate with any other non-developable coordinate system such as ellipsoidal coordinates, as will be obvious to those skilled in the art, since constancy of radius is immaterial. For an ellipsoidal coordinate system the only change necessary is to introduce a different signal into modifying circuit 220 of FIG. 1, or, more particularly, replace R-1 with a potentiometer which more appropriately introduces a function commensurate with the convergence of the longitude meridians. Similar changes must be made after an appropriate X, Y coordinate system has been selected.

In certain applications, computer 100 may be simplified considerably when only sub-polar navigation is contemplated. For example, all SP relays may be eliminated including the modifying circuits and including potentiometers R-10, R-11 and R-22. In other applications it may be desirable to convert shaft position, providing latitude and longitude, into electrical signals. Accordingly, potentiometers may be utilized whose slider arms are fastened to the latitude and longitude output shafts.

Also included as part of the data processing apparatus is a relative position computer which is responsive to the output quantities of the latitude-longitude computer and the output quantities of one or more station simulators, and which is operative to provide quantities commensurate with the relative positions, such as range and bearing, of a simulated vehicle and one or more stations. The relative position computer converts the input quantities into digital form and also provides an interpolation signal bridging the gap between successive digits. For example, an input quantity commensurate with the number 9.32 applied to a relative position computer in accordance with this invention which includes a four-bit binary converter may be split up as follows: the digital representation of the input quantity may be 1001, being commensurate with the natural number 9, and the residue amounting to 0.32 is provided in the form of an interpolation signal of, say, 32 volts.

From the above example it is immediately seen that the relative position computer of this invention may be utilized advantageously with any numbers upon which some arithmetic operation is to be performed. The relative position computer of this invention may also be employed with two or more latitude-longitude computers so that output quantites commensurate with instantaneous range and bearing between two moving vehicles are continuously provided. For example, such an arrangement may be employed to train aviation or marine students in the art of chasing or following another vehicle or perhaps to compute the path of a missile to be launched from one vehicle for impact upon a second vehicle. The great advantage of such a computer is the accuracy and resolution which may be obtained with simple and economical circuits without sacrificing an inherently inertial navigation system.

Many other uses suggest themselves when it is realized that the relative position computer of this invention is universal in nature; that is, the computer is adapted to operate upon some input quantity and first convert that input quantity into a digital representation and an analog residuary. The apportionment between digital and analog signals is selected in such a way that the analog portion provides the required accuracy and resolution at minimum cost. For example, conventional analog computers may be economically provided if the desired accuracy is less than 0.1 percent or 1000:1. As soon as the desired accuracy exceeds 0.1 percent, the cost rises very sharply even for small improvements. The computer of this invention may be utilized successfully to reduce the demands on conventional analog computers by "zoning" the input quantity so that each zone has a width commensurate with easily obtainable resolution. A good rule of thumb to follow in selecting the appropriate number of zones, that is the number of bits in the binary representation, is as follows: First, decide what accuracy or resolution is required. Second, divide this number by the accuracy or resolution which is easily and economically provided by conventional analog components, say 0.5 to 0.1 percent. Then select a binary representation having a number of bits sufficient to provide a number equal to that of the quotient of desired and available resolution.

For example, if an accuracy or resolution of 100,000:1 is desired and available analog components have an accuracy or resolution of, say, 1000:1, the quotient therebetween is 100. Consequently, the input quantity may be divided into 100 zones, or perhaps 128 zones requiring 8 bits. The corresponding zone width therefore is such that an accuracy or resolution of 782:1 per zone corresponds to an overall accuracy or resolution of 100,000:1. Therefore the interpolation signal only requires a resolution of 782:1.

What I claim is:

1. A computer device comprising: integrating means responsive to analog computer input quantities and operative to integrate said computer input quantities with respect to time to provide analog computer output quantities; converting means responsive to said computer output quantities and operative to derive pairs of output quantities, each pair being commensurate with a different computer output quantity and including a digital signal commensurate with the qantized magnitude of the computer output quantity and an analog interpolation signal commensurate with the difference between the quantized magnitude and the actual magnitude of the computer output quantity; simulating means for providing further pairs of output quantities, each of said further pairs of output quantities being commensurate with a simulated computer output quantity and at least one simulated computer output quantity being associated with each of said computer output quantities, each of said further pairs of output quantities including a simulated digital signal commensurate with the quantized magnitude of the simulated computer quantity and a simulated interpolation signal commensurate with the difference between the quantized magnitude and the actual magnitude of the simulated computer quantity; arithmetic computing means responsive to said pairs and said further pairs of output quantities and operative to derive digital output quantities and interpolation output quantities, each of said digital output quantities being commensurate with the difference of the digital signal and its associated simulated digital signal and each of said interpolation output quantities being commensurate with the difference of the interpolation signal and its associated simulated interpolation signal; digital-to-analog conversion means responsive to said digital output quantities and operative to provide analog output quantities; and summing means responsive to said interpolation output quantities and said analog output quantities and operative to derive further computer output quantities, each of said further computer output quantities being commensurate with the sum of the interpolation output quantity and the analog output quantity associated with the same computer input quantity.

2. A computer device according to claim 1 in which said integrating means comprises velocity servomechanism type of integrators and in which said computer input quantities are electrical signals and said analog computer output quantities are angular shaft positions.

3. A computer device according to claim 1 in which said converting means comprises an analog-to-digital shaft encoder and a transducer for each analog computer output quantity, and where said transducer is co-operating with said encoder to provide the analog interpolation signal whose magnitude linearly increases with increase in said analog computer output quantity from a predetermined minimum to a predetermined maximum value in stair-step manner, and where the occurrence of said stair-steps coincides with predetermined changes of the digital signal from said encoder.

4. A computer device according to claim 3 in which said encoder and said transducer are actuated by a common shaft and where said transducer includes potentiometer means having windings dispersed along circular arcs.

5. A computer device comprising: integrating means responsive to analog computer input quantities and operative to integrate said computer input quantities with respect to time to provide analog computer output quantities; converting means responsive to said computer output quantities and operative to derive pairs of output quantities, each pair being commensurate with a different computer output quantity and including a digital signal commensurate with the quantized magnitude of the computer output quantity and an analog interpolation signal commensurate with the dicerence between the quantized magnitude and the actual magnitude of the computer output quantity; simulating means for providing further pairs of output quantities, each of said further pairs of output quantities being commensurate with a simulated computer output quantity and at least one simulated computer output quantity being associated with each of said computer output quantities, each of said further pairs of output quantities including a simulated digital signal commensurate with the quantized magnitude of the simulated computer quantity and a simulated interpolation signal commensurate with the difference between the quantized magnitude and the actual magnitude of the simulated computer quantity; arithmetic computting means responsive to said pairs and said further pairs of output quantities and operative to derive digital output quantities and interpolation output quantities, each of said digial output quantities being commensurate with the sum of the digital signal and its associated simulated digital signal and each of said interpolation output quantities being commensurate with the sum of the interpolation signal and its associated simulated interpolation signal; digital-to-analog conversion means responsive to said digital output quantities and operative to provide analog output quantities; and summing means responsive to said interpolation output quantities and said analog output quantities and operative to derive further computer output quantities, each of said further computer output quantities being commensurate with the sum of the interpolation output quantity and the analog output quantity associated with the same computer input quantity.

6. A computer device comprising: integrating means responsive to an analog computer input quantity and operative to integrate said computer input quantity with respect to time to derive an analog computer output quantity; converting means responsive to said computer output quantity and operative to derive a pair of output quantities, said pair of output quantities including a digital signal commensurate with the quantized magnitude of said computer output quantity and an analog interpolation signal commensurate with the difference between said quantized magnitude and the actual magnitude of said computer output quantity; simulating means for providing at least one further pair of output quantities commensurate with a simulated computer quantity, said further pair of signals including a digital signal commensurate with the quantized magnitude of said computer output quantity and an analog interpolation signal commensurate with the difference between said quantized magnitude and the actual magnitude of said simulated computer quantity; arithmetic computing means responsive to said pair and said further pair of output quantities and operative to derive a digital output quantity and an interpolation output quantity, said digital output quantity being commensurate with the difference between the digital signals of said pair and said further pair of output quantities and said interpolation output quantity being commensurate with the difference between the interpolation signals of said pair and said further pair of output quantities; digital-to-analog conversion means responsive to said digital output quantity and operative to provide an analog output quantity; and summing means responsive to said interpolation output quantity and said analog output quantity and operative to derive a further computer output quantity, said further computer output quantity being commensurate with the sum of said computer input quantity and said simulated computer quantity.

7. A computer device comprising: integrating means for integrating a first and a second analog computer input quantity with respect to time to provide a first and a second analog computer output quantity; converting means responsive to said first and said second computer output quantity and operative to derive a first pair and a second pair of output quantities, each of said pairs being commensurate with a different one of said computer output quantities and including a digital signal commensurate with the quantized magnitude of the computer output quantity and an analog interpolation signal commensurate with the difference between said quantized magnitude and the actual magnitude of the computer output quantity; simulating means for providing at least one further first pair and one further second pair of output quantities commensurate respectively with a first and a second simulated computer output quantity, each further pair of signals including a digital signal commensurate with the quantized magnitude of the simulated computer output quantity and an interpolation signal commensurate with the difference between said quantized magnitude and the actual magnitude of the simulated computer output quantity; arithmetic computing means responsive to said first, second, further first and further second pair of output quantities and operative to derive a first digital, a first interpolation, a second digital and a second interpolation output quantity, said first and said second digital output quantity being commensurate respectively with the difference between the digital signals of said first and said further first pair of output quantities, and said second and said further second pair of output quantities, said first and said second interpolation output quantities being commensurate respectively with the difference between the interpolation signals of said first and said further first pair of output quantities and said second and said further second pair of output quantities; digital-to-analog conversion means responsive to said first and said second digital output quantity and operative to provide a first and a second analog output quantity; and summing means responsive to said first interpolation output quantity and said first analog output quantity and operative to derive a further first computer output quantity and also responsive to said second interpolation output quantity and said second analog output quantity and operative to derive a further second computer output quantity, said further first and said further second computer output quantity being commensurate respectively with the sum of said first computer input quantity and said first simulated computer output quantity and with the sum of said second computer input quantity and said second simulated computer output quantity.

8. A navigation computer for operating upon a latitude and a longitude computer input quantity $V_N$ and $V_E$ from a conventional flight simulator and for deriving the distance between a simulated vehicle and one or more navigation aid stations, said computer comprising: velocity servomechanism integrator means responsive to said latitude and longitude computer input quantities and operative to derive the position components latitude L and longitude λ of a vehicle; converting means responsive to said position components latitude L and longitude λ and operative to derive a latitude pair and a longitude pair of output quantities, each of said pairs including a digital signal commensurate with the quantized magnitude of the position component and an analog interpolation signal commensurate with the difference between said quantized magnitude and the actual magnitude of the position component; simulating means for providing at least one simulated latitude pair and one simulated longitude pair of output quantities respectively commensurate with the simulated position components latitude $L_1$ and longitude $\lambda_1$ of a navigation aid station, each simulated pair of output quantities including a digital signal commensurate with the quantized magnitude of the simulated position component and an interpolation signal commensurate with the difference between said quantized magnitude and the actual magnitude of the simulated position components; arithmetic computing means responsive to said latitude, longitude, simulated latitude and simulated longitude pair of output quantities and operative to derive a latitude digital, a latitude interpolation, a longitude digital and a longitude interpolation signal, said latitude and said longitude digital signals being commensurate respectively with the difference of the digital signals of said latitude and said simulated latitude pair of output quantities and said longitude and said simulated longitude pair of output quantities, said latitude and said longitude interpolation signals being commensurate respectively with the difference of the interpolation signals of said latitude and said simulated latitude pair of output quantities and said longitude and said simulated longitude pair of output quantities; digital-to-analog conversion means responsive to said latitude and said longitude digital signals and operative to provide a latitude and a longitude analog output signal; and summing means responsive to said latitude interpolation signal and said latitude analog signal and operative to derive a further latitude computer output quantity and also responsive to said longitude interpolation signal and said longitude analog signal and operative to derive a further longitude computer output quantity, said further latitude and said further longitude computer output quantity being commensurate respectively with the difference $L-L_1$ and $\lambda-\lambda_1$.

9. A computer comprising: first means responsive to a first computer input quantity and operative to provide a first digital signal commensurate with the quantized magnitude of said first computer input quantity and a first interpolation signal commensurate with the difference between said quantized magnitude and the actual magnitude of said first computer input quantity; second means responsive to a second computer input quantity and operative to provide a second digital signal commensurate with the quantized magnitude of said second computer quantity and a second interpolation signal commensurate with the difference between said quantized magnitude and the actual magnitude of said second computer input quantity; digital subtracter means responsive to said first and said second digital signal and operative to provide a digital difference signal commensurate with the difference between said first and said second digital signal; analog subtracter means responsive to said first and said second interpolation signal and operative to provide an interpolation difference signal commensurate with the difference between said first and said second interpolation signal; digital-to-analog converter means responsive to said digital difference signal and operative to convert said digital difference signal to a quantized analog signal; and summing means responsive to said interpolation difference signal and said quantized analog signal and operating to provide a computer output quantity commensurate with the sum of said interpolation difference signal and said quantized analog signal, said computer output quantity being commensurate with the difference between said first and said second computer input quantities.

10. A computer comprising: first means responsive to a first computer input quantity and operative to provide a first digital signal commensurate with the quantized magnitude of said first computer input quantity and a first interpolation signal commensurate with the difference between said quantized magnitude and the actual magnitude of said first computer input quantity; second means responsive to a second computer input quantity and operative to provide a second digital signal commensurate with the quantized magnitude of said second computer quantity and a second interpolation signal commensurate with the difference between said quantized magnitude and the actual magnitude of said second computer input quantity; digital adder means responsive to said first and said second digital signal and operative to provide a digital sum signal commensurate with the sum of said first and said second digital signals; analog summing means responsive to said first and said second interpolation signal and operative to provide an interpolation sum signal commensurate with the sum of said first and said second interpolation signals; digital-to-analog converter means responsive to said digital sum signal and operative to convert said digital sum signal to a quantized analog signal; and further summing means responsive to said interpolation sum signal and said quantized analog signal and operative to provide a computer output quantity commensurate with the sum of said interpolation sum signal and said quantized analog signal, said computer output quantity being commensurate with the sum of said first and said second computer input quantities.

11. A computer comprising: first means responsive to a first computer input quantity and operative to provide a first digital signal commensurate with the quantized magnitude of said first computer input quantity and a first interpolation signal commensurate with the difference between said quantized magnitude and the actual magnitude of said first computer input quantity; second means operative to provide a second digital signal and a second interpolation signal having preselected fixed values commensurate with a further computer input quantity; digital subtracter means responsive to said first and said second digital signal and operative to provide a digital difference signal commensurate with the difference between said first and said second digital signal; analog subtracter means response to said first and said second interpolation signal and operative to provide an interpolation difference signal commensurate with the difference between said first and said second interpolation signal; digital-to-analog converter means responsive to said digital difference signal and operative to convert said digital difference signal to a quantized analog signal; and summing means responsive to said interpolation difference signal and said quantized analog signal and operative to provide a computer output quantity commensurate with the sum of said interpolation difference signal and said quantized analog signal, said computer output quantity being commensurate with the instantaneous difference between said computer input quantity and said further computer input quantity.

12. A computer comprising: first means responsive to a plurality of computer input quantities and operative to derive a plurality of first signal pairs, each first signal pair being associated with a different computer input quantity and including a first digital signal commensurate with the quantized magnitude of its associated computer input quantity and a first interpolation signal commensurate with the difference between said quantized magnitude and the actual magnitude of its associated computer input quantity; second means operative to provide a plurality of second signal pairs, each of said second signal pairs being associated with a different one of said computer input quantities and simulating a further computer input quantity, each second signal pair including a second digital signal and a second interpolation signal of preselected values; digital subtracter means responsive to said first and said second digital signals and operative to derive a plurality of digital difference signals, each of said digital difference signals being commensurate with the difference between a first and a second digital signal associated with the same computer input quantity; analog subtracter means responsive to said first and said second interpolation signals and operative to derive a plurality of interpolation difference signals, each of said interpolation difference signals being commensurate with the difference between a first and a second interpolation signal associated with the same computer input quantity; digital-to-analog converter means responsive to said plurality of digital difference signals and operative to convert said digital difference signals into quantized analog signals; and summing means responsive to said plurality of interpolation difference signals and said plurality of quantized analog signals and operative to provide a plurality of computer output quantities, each of said computer output quantities being commensurate with the sum of an interpolation difference signal and a quantized analog signal associated with the same computer input quantity, whereby each of said computer output quantities is commensurate with the instantaneous difference between a computer input quantity and its associated further computer input quantity.

13. A computer comprising: an analog-to-digital encoder means responsive to a first computer input quantity and operative to provide a first digital signal commensurate with the quantized value of said computer input quantity; a transducer means responsive to said first computer input quantity and said first digital signal and operative to provide a first interpolation signal, said first interpolation signal changing its magnitude linearly with change of said first computer input quantity in stair-step fashion, the occurrences of said stair-steps being related to changes of said first digital signal; a simulator means for providing a second digital signal and a second interpolation signal in accordance with a second computer input quantity of predetermined value; digital subtracter means responsive to said first and said second digital signal and operative to provide a digital difference signal commensurate with the difference between said first and said second digital signal; analog subtracter means responsive to said first and said second interpolation signal and operative to provide an interpolation difference signal commensurate with the difference between said first and said second interpolation signal; digital-to-analog converter means responsive to said digital difference signal and operative to convert said digital difference signal to a quantized analog signal; and summing means responsive to said interpolation difference signal and said quantized analog signal and operative to provide a computer output quantity commensurate with the sum of said interpolation difference signal and said quantized analog signal, said computer output signal being commensurate with the difference between said computer input quantity and said further computer input quantity.

14. A computer in accordance with claim 13 wherein said first computer input quantity comprises the angular position of an input shaft and where said analog-to-digital encoder means includes a plurality of lobed cams intercoupled by successive gear reduction units and actuated by said input shaft.

15. A computer in accordance with claim 14 wherein said transducer comprises: a plurality of potentiometers, each of said potentiometers including an arcuately disposed winding and a slider arm, said slider arms being coupled to a common shaft; potential source means for causing current flow through said windings; gear reduction means coupling said common shaft to said input shaft, the transmission ratio of said gear reduction means being selected such that one revolution of said common shaft corresponds to an integer number of changes of said first digital signal; and switching means having a plurality of input circuits and one output circuit, said switching means being responsive to said first digital signal and being operative to selectively connect one of said input circuits to said output circuit, each of said input circuits being connected to a different one of said slider arms and said output circuit being connected to said summing means.

16. A computer in accordance with claim 14 wherein said transducer comprises a plurality of potentiometers each of which includes an arcuately disposed winding and a slider arm, said slider arms being coupled to a common shaft; potential source means for causing current flow through said windings; gear reduction means coupling said common shaft to said input shaft, the transmission ratio of said gear reduction means being selected such that one revolution of said common shaft corresponds to an integer number of changes of said first digital signal; and switching means having a plurality of input circuits, each connected to a different one of said slider arms, and two output circuits, said switching means being responsive to said first digital signal and being operative to selectively connect one of said input circuits to each of said output circuits in accordance with said first digital signal, a further switching means connected to said summing means and having two input circuits each connected to a different one of the output circuits of said switching means, said further switching means being responsive to said second digital signal and operative to provide said first interpolation signal.

17. A computer comprising: a latitude and a longitude encoder means respectively responsive to a latitude and a longitude input shaft whose rotational position is commensurate with the latitude L and the longitude $\lambda$ of a vehicle and respectively operative to provide a latitude and a longitude digital signal, each of said encoder means including a plurality of lobed cams intercoupled by successive gear reduction units for activating cam switches, a plurality of cam switches, one of said lobed cams being coupled to said input shaft and having a single cam switch associated therewith, said single cam switch being connected to provide an output quantity when actuated, said output quantity being the least significant digit of said digital signal, the remaining lobed cams each having a pair of cam switches associated therewith, circuit means for successively interconnecting each of said pair of cam switches, said output quantity being applied to said circuit means, each pair of cam switches providing successively a more significant digit of said digital signal upon being actuated by its associated lobed cam; a latitude and longitude transducer means respectively responsive to said latitude and said longitude input shafts and respectively operative to provide a latitude and a longitude interpolation signal, each transducer means including at least two potentiometers having arcuate windings and slider arms pivoted about the center of said winding, potential source means for causing current flow through said windings, each of said slider arms being operated by said input shaft and providing an output potential in accordance with its respective angular positional relationship to its winding; switch means connected to said output potentials and responsive to selected digits of said binary signal for providing a selected output potential in accordance with said binary signal, said selected output potential being said interpolation signal; a simulator means for providing a simulated latitude and longitude digital signal and a simulated latitude and longitude interpolation signal commensurate respectively with the latitude $L_1$ and longitude $\lambda_1$ of a navigation aid station; latitude adder means responsive to said latitude and said simulated latitude digital signals and operative to provide a latitude digital difference signal commensurate with the difference therebetween; longitude adder means responsive to said longitude and said simulated longitude digital signals and operative to provide a longitude digital difference signal commensurate with the difference therebetween; latitude summing means responsive to said latitude and said simulated latitude interpolation signals and operative to provide a latitude interpolation difference signal commensurate with the difference therebetween; longitude summing means responsive to said longitude and said simulated longitude interpolation signals and operative to provide a longitude interpolation difference signal commensurate with the difference therebetween; latitude decoder means responsive to said latitude digital difference signal and operative to convert said latitude digital difference signal to a latitude quantized analog signal; longitude decoder means responsive to said longitude digital difference signal and operative to convert said longitude digital difference signal to a longitude quantized analog signal; further latitude summing means responsive to said latitude interpolation difference signal and said latitude quantized analog signal and operative to provide a latitude computer output quantity commensurate with the sum of said latitude interpolation difference signal and said latitude quantized analog signal, said computer output quantity being commensurate with the difference between said latitude L and said simulated latitude $L_1$; and further longitude summing means responsive to said longitude interpolation difference signal and said longitude quantized analog signal and operative to provide a longitude computer output quantity commensurate with the sum of said longitude interpolation difference signal and said longitude quantized analog signal, said further longitude summing means including a modifying circuit responsive to said latitude shaft for modifying said longitude computer output quantity in accordance with the cosine of latitude L, said longitude computer quantity as modified being commensurate with the difference between said longitude $\lambda$ and said simulated longitude $\lambda_1$.

18. Apparatus for converting an angular shaft position of an input shaft into a digital signal commensurate with the angular displacement of said shaft from a predetermined angular position and for providing an analog signal commensurate with the angular displacement of said shaft from an angular position coinciding with each change of a predetermined digit of said digital signal; said apparatus comprising: an analog-to-digital shaft encoder coupled to said input shaft and operative to provide said digital signal, the least significant digit of said digital signal changing each time said input shaft traverses an angular displacement of $\theta$ degrees; a mechanical-to-electrical transducer having an actuating shaft and operative to provide said analog signal, said analog signal being commensurate with the angular position of said actuating shaft and varying linearly from a minimum value to a maximum value each time said actuating shaft traverses an angular displacement of $\psi$ degrees; and shaft coupling means for coupling said actuating shaft to said input shaft, said coupling means providing an angular transmission ratio equal to $\psi/n\theta$ where $n$ is an integer.

19. Apparatus according to claim 18 wherein said transducer comprises a potentiometer having an arcuately disposed winding.

20. Apparatus according to claim 18 including a further transducer coupled to said shaft coupling means and providing a further analog signal; and logical circuit means coupled to the output circuits of said transducer and said further transducer and having an output terminal, said logical circuit element being actuated by said digital signal to select one of said analog signals and apply said selected analog signal to said output terminal.

21. Apparatus according to claim 20 wherein said further analog signal is electrically displaced from said analog signal by an amount substantially equal to an actuating shaft displacement of $\psi/2$ degrees.

22. In aircraft course recording apparatus including a flight computer providing ground speed signals of the aircraft in flight along orthogonal directions: plotting and projection map means for plotting the flight path; drive means for imparting relative motion as between said map and plotting means, said drive means including a first pair of integrators for integrating a first pair of input signals ultimately derived from said ground speed signals, said integrators imparting said relative motion in the directions of orthogonal coordinates defining the plane of the map respectively thereby to provide a continuous plot of the flight path, said integrators respectively providing first and second output signals representative of the instant location of the flight on said map means in terms of positions along the latter orthogonal directions thereon; longitude ($\theta$) and latitude ($\phi$) indicators and integrators, the latter for integrating a second pair of signals ultimately derived from said ground speed signals respectively and actuating their associated indicators to provide longitude and latitude indications respectively, said latter integrators respectively providing $\theta$ and $\phi$ output signals representative of the instant flight location in terms of longitude and latitude; earth curvature correction factor computing means for modifying said ground speed signals in accordance with a function of at least one of said output signals to provide said first pair of input signals whereby to cause the plotted instant flight location to be substantially in agreement with the latitude and longitude indications; means for recomputing one pair of said output signals as functions of the other output signal pair; means for comparing the recomputed and the thereto corresponding original output signals respectively to provide a pair of error signals; means responsive to said first pair of integrators for sensing "off map" and "on map" location of the flight; and means for applying said error signals to said $\phi$ and $\theta$ computers respectively under "on map" condition to force the $\phi$ and $\theta$ indications into agreement with the map flight location.

23. In aircraft course recording apparatus including a flight computer providing ground speed signals of the aircraft in flight along orthogonal directions: plotting and conic projection map means for plotting the flight path; drive means for imparting relative motion as between said map and plotting means, said drive means including a first pair of integrators for integrating a first pair of input signals ultimately derived from said ground speed signals, said integrators imparting said relative motion in the directions of orthogonal coordinates defining the plane of the map respectively thereby to provide a continuous plot of the flight path, said integrators respectively providing first and second output signals representative of the instant location of the flight on said map means in terms of positions along the latter orthogonal directions thereon; longitude ($\theta$) and latitude ($\phi$) indicators and integrators, the latter for integrating a second pair of signals ultimately derived from said ground speed signals respectively and actuating their associated indicators to provide longitude and latitude indications respectively, said latter integrators respectively providing $\theta$ and $\phi$ output signals representative of the instant flight location in terms of longitude and latitude; earth curvature correction factor computing means for modifying said ground speed signals in accordance with a function of at least one of said output signals to provide said first pair of input signals whereby to cause the plotted instant flight location to be substantially in agreement with the latitude and longitude indications; means for recomputing one pair of said output signals as functions of the other output signal pair; means for comparing the recomputed and the thereto corresponding original output signals respectively to provide a pair of error signals; means responsive to said first pair of integrators for sensing "off map" and "on map" location of the flight; and means for applying said error signals to said $\phi$ and $\theta$ computers respectively under "on map" condition to force the $\phi$ and $\theta$ indications into agreement with the map flight location.

24. In aircraft course recording apparatus including a flight computer providing ground speed signals of the aircraft in flight along orthogonal directions: plotting and Lambert projection map means for plotting the flight path; drive means for imparting relative motion as between said map and plotting means, said drive means including a first pair of integrators for integrating a first pair of input signals ultimately derived from said ground speed signals, said integrators imparting said relative motion in the directions of orthogonal coordinates defining the plane of the map respectively thereby to provide a continuous plot of the flight path, said integrators respectively providing first and second output signals representative of the instant location of the flight on said map means in terms of positions along the latter orthogonal directions thereon; longitude ($\theta$) and latitude ($\phi$) indicators and integrators, the latter for integrating a second pair of signals ultimately derived from said ground speed signals respectively and actuating their associated indicators to provide longitude and latitude indications respectively, said latter integrators respectively providing $\theta$ and $\phi$ output signals representative of the instant flight location in terms of longitude and latitude; earth curvature correction factor computing means for modifying said ground speed signals in accordance with a function of at least one of said output signals to provide said first pair of input signals whereby to cause the plotted instant flight location to be substantially in agreement with the latitude and longitude indications; means for recomputing one pair of said output signals as functions of the other output signal pair; means for comparing the recomputed and the thereto corresponding original output signals respectively to provide a pair of error signals; means responsive to said first pair of integrators for sensing "off map" and "on map" location of the flight; and means for applying said error signals to said $\phi$ and $\theta$ computers respectively under "on map" condition to force the $\phi$ and $\theta$ indications into agreement with the map flight location.

25. In aircraft course recording apparatus including a flight computer providing ground speed signals of the aircraft in flight along orthogonal directions: plotting and projection map means for plotting the flight path; drive means for imparting relative motion as between said map and plotting means, said drive means including X and Y integrators for integrating a first pair of input signals ultimately derived from said ground speed signals, said integrators imparting said relative motion in the horizontal and vertical directions respectively thereby to provide a continuous plot of the flight path, said integrators respectively providing X and Y output signals representative of the instant location of the flight on said map means in terms of horizontal and vertical positions thereon; longitude ($\theta$) and latitude ($\phi$) indicators and integrators, the latter for integrating a second pair of signals ultimately derived from said ground speed signals respectively and actuating their associated indicators to provide longitude and latitude indications respectively, said latter integrators respectively providing $\theta$ and $\phi$ output signals representative of the instant flight location in terms of longitude and latitude; earth curvature correction factor computing means for modifying said ground speed signals in accordance with a function of at least one of said output signals to provide said first pair of input signals whereby to cause the plotted instant flight location to be substantially in agreement with the latitude and longitude indications; means for recomputing one pair of said output signals as functions of the other output signal pair; means for comparing the recomputed and the thereto corresponding original output signals respectively to provide a pair of error signals; means responsive to said X and Y integrators for sensing "off map" and "on map" location of the flight; and means for applying said error signals to said $\phi$ and $\theta$ computers respectively under "on map" condition to force the $\phi$ and $\theta$ indications into agreement with the map flight location.

26. In aircraft course, recording apparatus including a flight computer providing ground speed signals of the aircraft in flight along orthogonal directions: plotting and conic projection map means for plotting the flight path; drive means for imparting relative motion as between said map and plotting means, said drive means including X and Y integrators for integrating a first pair of input signals ultimately derived from said ground speed signals, said integrators imparting said relative motion in the horizontal and vertical directions respectively thereby to provide a continuous plot of the flight path, said integrators respectively providing X and Y output signals representative of the instant location of the flight on said map means in terms of horizontal and vertical positions thereon; longitude ($\theta$) and latitude ($\phi$) indicators and integrators, the latter for integrating a second pair of signals ultimately derived from East-West and North-South ground speed signals respectively and actuating their associated indicators to provide longitude and latitude indications respectively, said latter integrators respectively providing $\theta$ and $\phi$ output signals representative of the instant flight location in terms of longitude and latitude; earth curvature correction factor computing means for modifying said ground speed signals to provide said first pair of signals whereby to cause the plotted instant flight location to be substantially in agreement with the latitude and longitude indications, said correction factor computing means including means for computing the meridian tilt angle $\delta$ applicable to the instant flight location as a function of one of said output signals; means for recomputing one pair of said output signals as functions of the other output signal pair; means for comparing the recomputed and the thereto corresponding original output signals respectively to provide a pair of error signals; means responsive to said X and Y integrators for sensing "off map" and "on map" location of the flight; and means for applying said error signals to said φ and θ computers respectively under "on map" condition to force the φ and θ indications into agreement with the map flight location.

27. In aircraft course recording apparatus including a flight computer providing ground speed signals of the aircraft in flight along orthogonal directions: plotting and conic projection map means for plotting the flight path; drive means for imparting relative motion as between said map and plotting means, said drive means including X and Y integrators for integrating a first pair of input signals ultimately derived from said ground speed signals, said integrators imparting said relative motion in the horizontal and vertical directions respectively thereby to provide a continuous plot of the flight path, said integrators respectively providing X and Y output signals representative of the instant location of the flight on said map means in terms of horizontal and vertical positions thereon; longitude (θ) and latitude (φ) indicators and integrators, the latter for integrating a second pair of signals ultimately derived from said East-West and North-South ground speed signals respectively and actuating their associated indicators to provide longitude and latitude indications respectively, said latter integrators respectively providing θ and φ output signals representative of the instant flight location in terms of longitude and latitude; earth curvature correction factor computing means for modifying said ground speed signals to provide said first pair of signals whereby to cause the plotted instant flight location to be substantially in agreement with the latitude and longitude indications, said correction factor computing means including means for computing the meridian tilt angle δ applicable to the instant flight location as a function of said θ output signal; means for recomputing one pair of said output signals as functions of the other output signal pair; means for comparing the recomputed and the thereto corresponding original output signal respectively to provide a pair of error signals; means responsive to said X and Y integrators for sensing "off map" and "on map" location of the flight; and means for applying said error signals to said φ and θ computers respectively under "on map" condition to force the φ and θ indications into agreement with the map flight location.

28. In aircraft course recording apparatus including a flight computer providing ground speed signals of the aircraft in flight along orthogonal directions: plotting and projection map means for plotting the flight path; drive means for imparting relative motion as between said map and plotting means, said drive means including X and Y integrators for integrating a first pair of input signals ultimately derived from said ground speed signals, said integrators imparting said relative motion in the horizontal and vertical directions respectively thereby to provide a continuous plot of the flight path, said integrators respectively providing X and Y output signals representative of the instant location of the flight on said map means in terms of horizontal and vertical positions thereon; longitude (θ) and latitude (φ) indicators and integrators, the latter for integrating a second pair of signals ultimately derived from said East-West and North-South ground speed signals respectively and actuating their associated indicators to provide longitude and latitude indications respectively, said latter integrators respectively providing θ and φ outputs signals representative of the instant flight location in terms of longitude and latitude; earth curvature correction factor computing means for modifying said ground speed signals to provide said first pair of signals whereby to cause the plotted instant flight location to be substantially in agreement with the latitude and longitude indications, said correcion factor computing means including means for computing the map scale factor applicable to the instant flight location as a function of one of said output signals; means for recomputing one pair of said output signals as functions of the other output signal pair; means for comparing the recomputed and thereto corresponding original output signals respectively to provide a pair of error signals; means responsive to said X and Y integrators for sensing "off map" and "on map" location of the flight; and means for applying said error signals to said φ and θ computers respectively under "on map" condition to force the φ and θ indications into agreement with the map flight location.

29. In aircraft course recording apparatus including a flight computer providing ground speed signals of the aircraft in flight along orthogonal directions: plotting and projection map means for plotting the flight path; drive means for imparting relative motion as between said map and plotting means, said drive means including X and Y integrators for integrating a first pair of input signals ultimately derived from said ground speed signals, said integrators imparting said relative motion in the horizontal and vertical directions respectively thereby to provide a continuous plot of the flight path, said integrators respectively providing X and Y output signals representative of the instant location of the flight on said map means in terms of horizontal and vertical positions thereon; longitude (θ) and latitude (φ) indicators and integrators, the latter for integrating a second pair of signals ultimately derived from said East-West and North-South ground speed signals respectively and actuating their associated indicators to provide longitude and latitude indications respectively, said latter integrators respectively providing (θ) and (φ) output signals representative of the instant flight location in terms of longitude and latitude; earth curvature correction factor computing means for modifying said ground speed signals to provide said first pair of signals whereby to cause the plotted instant flight location to be substantially in agreement with the latitude and longitude indications, said correction factor computing means including means for computing the map scale factor applicable to the instant flight location as a function of said (φ) output signal; means for recomputing one pair of said output signals as functions of the other output signal pair; means for comparing the recomputed and thereto corresponding original output signals respectively to provide a pair of error signals; means responsive to said integrators for sensing "off map" and "on map" location of the flight; and means for applying said X and Y error signals to said (φ) and (θ) computers respectively under "on map" condition to force the φ and θ indications into agreement with the map flight location.

30. In aircraft course recording apparatus including a flight computer providing East-West and North-South ground speed signals of the aircraft in flight: plotting means including conic projection map means for plotting the flight path; drive means for imparting relative motion as between said map and and plotting means, said drive means including X and Y integrators for integrating a first pair of signals ultimately derived from said East-West and North-South ground speed signals, said integrators imparting said relative motion in the horizontal and vertical directions respectively thereby to provide a continuous plot of the flight path, said integrators respectively providing X and Y output signals representative of the instant location of the flight on said map means in terms of horizontal and vertical positions thereon; longitude (θ) and latitude (φ) indicators and integrators, the latter for integrating a second pair of signals ultimately derived from said East-West and North-South ground speed signals respectively and actuating their associated indicators to provide longitude and latitude indications respectively, said latter integrators respectively providing θ and φ output signals representative of the instant flight location in terms of longitude and latitude; earth curvature correction factor computing means for modifying said ground speed signals to provide said first pair of signals whereby to cause the plotted instant flight location to be substantially in agreement with the latitude and longitude indications, said correction factor computing means including means for computing the meridian tilt angle δ applicable to the instant flight location as a function of one of said output signals; means for computing the distance ρ from the pole point of the projection to the instant flight location as a function of said φ output signal; means for recomputing X and Y signals as functions of the computed ρ and δ; means for comparing the recomputed and output X signals and the recomputed and output Y signals and providing X and Y error signals respectively; means responsive to said X and Y integrators for sensing "off map" and "on map" location of the flight; and means for alternately applying said X and Y error signals to said φ and θ computers respectively under "on map" condition to force the φ and θ indications into agreement with the map flight location, and to said X and Y computers respectively under "off map" conditions to force the plotting and chart means to prepare for plotting, on attaining the "on map" conditions.

31. In aircraft course recording apparatus including a flight computer providing East-West and North-South ground speed signals of the aircraft in flight: plotting means including conic projection map means for plotting the flight path; drive means for imparting relative motion as between said map and plotting means, said drive means including X and Y integrators for integrating a first pair of signals ultimately derived from said East-West and North-South ground speed signals, said integrators imparting said relative motion in the horizontal and vertical directions respectively thereby to provide a continuous plot of the flight path, said integrators respectively providing X and Y output signals representative of the instant location of the flight on said map means in terms of horizontal and vertical positions thereon; longitudinal (θ) and latitude (φ) indicators and integrators, the latter for integrating a second pair of signals ultimately derived from said East-West and North-South ground speed signals respectively and actuating their associated indicators to provide longitude and latitude indications respectively, said latter integrators respectively providing θ and φ output signals representative of the instant flight location in terms of longitude and latitude; earth curvature correction factor computing means for modifying said ground speed signals to provide said first pair of signals whereby to cause the plotted instant flight location to be substantially in agreement with the latitude and longitude indications, said correction factor computing means including means for computing the meridian tilt angle δ applicable to the instant flight location as a function of said θ output signal; means for computing the distance ρ from the pole point of the projection to the instant flight location as a function of said φ output signal; means for comparing X and Y signals as functions of the computed ρ and δ; means for comparing the recomputed and output X signals and the recomputed and output Y signals and providing X and Y error signals respectively; means responsive to said X and Y integrators for sensing "off map" and "on map" location of the flight; and means for alternately applying said X and Y error signals to said φ and θ computers respectively under "on map" condition to force the φ and θ indications into agreement with the map flight location, and to said X and Y computers respectively under "off map" conditions to force the plotting and chart means to prepare for plotting on attaining the "on map" condition at a location in agreement with the φ and θ indications.

32. In aircraft course recording apparatus including a flight computer providing East-West and North-South ground speed signals of the aircraft in flight: plotting and Lamber projection map means for plotting the flight path; drive means for imparting relative motion as between said map and plotting means, said drive means including X and Y integrator for integrating a first pair of signals ultimately derived from said East-West and North-South ground speed signals, said integrators imparting said relative motion in the horizontal and vertical directions respectively thereby to provide a continuous plot of the flight path, said integrators respectively providing X and Y output signals representative of the instant location of the flight on said map means in terms of horizontal and vertical positions thereon; longitude (θ) and latitude (φ) indicators and integrators, the latter for integrating a second pair of signals ultimately derived from said East-West and North-South ground speed signals respectively and actuating their associated indicators to provide longitude and latitude indications respectively, said latter integrators respectively providing θ and φ output signals representative of the instant flight location in terms of longitude and latitude; earth curvature correction factor computing means for modifying said ground speed signals to provide said first pair of signals whereby to cause the plotted instant flight location to be substantially in agreement with the latitude and longitude indications, said correction factor computing means including means for computing the meridian tilt angle δ applicable to the instant flight location as a function of said θ output signal, and further including means for computing the map scale factor applicable to the instant flight location as a function of said φ output signal; means for computing the distance ρ from the pole point of the projection to the instant flight location as a function of said φ output signal; means for recomputing X and Y signals as functions of the computed ρ and δ; means for comparing the recomputed and output X signals and the recomputed and output Y signals and providing X and Y error signals respectively; means responsive to said X and Y integrators for sensing "off map" and "on map" location of the flight; and means for alternately applying said X and Y error signals to said φ and θ computers respectively under "on map" conditions, to force the φ and θ indications into agreement with the map flight location, and to said X and Y computers respectively under "off map" conditions to force the plotting and chart means to prepare for plotting, on attaining the "on map" condition, at a location in agreement with the φ and θ indications.

33. Aircraft course recording apparatus comprising a first pair of computers for computing instant aircraft longitude and latitude provided with a first set of indicating elements that are subject to automatic actuation by their respective computers; a second set of indicating elements in the form of utilization means including projection map means for plotting the flight path of the aircraft; a second pair of computers for computing the instant flight location in terms of orthogonal directions defining the plane of the map, said second set of indicating elements being subject to automatic actuation relative to each other by said second computer pair for relative movement whereby to plot said flight path, both sets of actuated elements also being externally actuatable for setting in initial coordinates for the respective pairs of computers actuating the same; selector means operable to select either computer pair to operate as master computers for the other computer pair to follow as slaves; means for applying signals derived from the master computer pair to the slave computer pair to force the latter and their respective indicating elements to agreement respectively with the master computer pair and the indicating elements actuated thereby; further computer means interacting with the aforesaid computers for computing at least one earth curvature correction factor applicable to said second computer pair; indicating means actuated by the earth curvature correction factor computing means and calibrated in terms of the respective earth curvature correction factors for indicating the same; means for applying a computed earth curvature correction signal to said second computer pair to place the computer pairs and their associated indicating elements in alignment with each other; a plurality of elements settable to indicate the coordinates of a reference location and its earth curvature correction factors corresponding to the indicated earth curvature correction factors; and computing means responsive to the latter settable elements and cooperating with the aforesaid computers to compute and indicate the instant interrelation of the aircraft and reference location.

34. In aircraft course recording apparatus including a flight computer providing ground speed signals of the aircraft in flight along orthogonal directions: plotting and projection map means for plotting the flight path; drive means for imparting relative motion as between said map and plotting means; said drive means including a first pair of integrators for integrating a first pair of input signals ultimately derived from said ground speed signals, said integrators imparting said relative motion in the directions of orthogonal coordinates defining the plane of the map respectively thereby to provide a continuous plot of the flight path, said integrators respectively providing first and second output signals representative of the instant location of the flight on said map means in terms of positions along the latter orthogonal directions thereon; longitude ($\theta$) and latitude ($\phi$) indicators and integrators, the latter for integrating a second pair of signals ultimately derived from said ground speed signals respectively and actuating their associated indicators to provide longitude and latitude indications respectively, said latter integrators respectively providing $\theta$ and $\phi$ output signals representative of the instant flight location in terms of longitude and latitude; earth curvature correction factor computing means for modifying said ground speed signals to provide said first pair of input signals whereby to cause the plotted instant flight location to be substantialy in agreement with the latitude and longitude indications; said correction factor computing means including means for computing the map scale factor applicable to the instant flight location and a function of one of said output signals; means for recomputing one pair of said output signals as functions of the other output signal pair; means for comparing the recomputed and the thereto corresponding original output signals respectively to provide a pair of error signals; means responsive to said first pair of integrators for sensing "off map" and "on map" location of the flight; and means for applying said error signals to said $\phi$ and $\theta$ computers respectively under "on map" condition to force the $\phi$ and $\theta$ indications into agreement with the map flight location.

35. In aircraft course recording apparatus including a flight computer providing ground speed signals of the aircraft in flight along orthogonal directions: plotting means and projection map means for plotting the flight path; drive means for imparting relative motion as between said map and plotting means; said drive means including a first pair of integrators for integrating a first pair of input signals ultimately derived from said ground speed signals, said integrators imparting said relative motion in the directions of orthogonal coordinates defining the plane of the map respectively thereby to provide a continuous plot of the flight path, said integrators respectively providing first and second output signals representative of the instant location of the flight on said map means in terms of positions along the latter orthogonal directions thereon; longitude ($\theta$) and latitude ($\phi$) indicators and integrators, the latter for integrating a second pair of signals ultimately derived from said ground speed signals respectively and actuating their associated indicators to provide longitude and latitude indications respectively, said latter integrators respectively providing $\theta$ and $\phi$ output signals representative of the instant flight location in terms of longitude and latitude; earth curvature correction factor computing means for modifying said ground speed signals to provide said first pair of input signals whereby to cause the plotted instant flight location to be substantially in agreement with the latitude and longitude indications; said correction factor computing means including means for computing the map scale factor applicable to the instant flight location as a function of said $\phi$ output signal; means for recomputing one pair of said output signals as functions of the other output signal pair; means for comparing the recomputed and the thereto corresponding original output signals respectively to provide a pair of error signals; means responsive to said first pair of integrators for sensing "off map" and "on map" location of the flight; and means for applying said error signals to said $\phi$ and $\theta$ computers respectively under "on map" condition to force the $\phi$ and $\theta$ indications into agreement with the map flight location.

36. In aircraft course recording apparatus including a flight computer providing ground speed signals of the aircraft in flight along orthogonal directions: plotting and projection map means for plotting the flight path; drive means for imparting relative motion as between said map and plotting means, said drive means including a first pair of integrators for integrating a first pair of input signals ultimately derived from said ground speed signals, said integrators imparting said relative motion in the directions of orthogonal coordinates defining the plane of the map respectively thereby to provide a continuous plot of the flight path, said integrators respectively providing first and second output signals representative of the instant location of the flight on said map means in terms of positions along the latter orthogonal directions thereon; a second pair of flight location indiactors and integrators, the latter for integrating a second pair of signals ultimately derived from said ground speed signals respectively and actuating their associated indicators to provide additional indication of the flight location, said latter integrators providing a second pair of output signals representative of the instant flight location, earth curvature correction factor computing means for modifying said ground speed signals in accordance with a function of at least one of said output signals to provide said first pair of input signals whereby to cause the plotted instant flight location to be substantially in agreement with the indications of said second indicator pair, means for recomputing one pair of said output signals as functions of the other output signal pair; means for comparing the recomputed and the thereto corresponding original output signals respectively to provide a pair of error signals; means responsive to said first pair of integrators for sensing presence of the flight in a predetermined area; and means responsive to such sensed presence for applying said error signals to one of said integrator pairs in addition to the integrand input signals received by such pair to force them into computational agreement with the other integrator pair and to produce complete agreement as between the two sets of flight location indications.

37. In aircraft course recording apparatus including a flight computer providing ground speed signals of the aircraft in flight along orthogonal directions: plotting and projection map means for plotting the flight path; drive means for imparting relative motion as between said map and plotting means, said drive means including a first pair of integrators for integrating a first pair of input signals ultimately derived from said ground speed signals, said integrators imparting said relative motion in the direction of orthogonal coordinates defining the plane of the map respectively thereby to provide a continuous plot of the flight path, said integrators respectively providing first and second output signals representative of the instant location of the flight on said map means in terms of positions along the latter orthogonal directions thereon; a second pair of flight location indicators and integrators, the latter for integrating a second pair of signals ultimately derived from said ground speed signals respectively and actuating their associated indicators to provide additional indication of the flight location, said latter integrators providing a second pair of output signals representative of the instant flight location, earth curvature correction factor computing means for modifying said ground speed signals, including means for computing the map scale factor applicable to the instant flight location as a function of at least one of said output signals to provide said first pair of input signals whereby to cause the plotted instant flight location to be substantially in agreement with the indications of said second indicator pair, means for recomputing one pair of said output signals as functions of the other output signal pair; means for comparing the recomputed and the thereto corresponding original output signals respectively to provide a pair of error signals; means responsive to said first pair of integrators for sensing presence of the flight in a predetermined area; and means responsive to such sensed presence for applying said error signals to one of said integrator pairs in addition to the integrand input signals received by them to force them into computational agreement with the other integrator pair and to produce complete agreement as between the two sets of flight location indications.

38. In aircraft course recording apparatus including a flight computer providing ground speed signals of the aircraft in flight along orthogonal directions: plotting and projection map means for plotting the flight path; drive means for imparting relative motion as between said map and plotting means, said drive means including a first pair of integrators for integrating a first pair of input signals ultimately derived from said ground speed signals, said integrators imparting said relative motion in the directions of orthogonal coordinates defining the plane of the map respectively thereby to provide a continuous plot of the flight path, said integrators respectively providing first and second output signals representative of the instant location of the flight on said map means in terms of positions along the latter orthogonal directions thereon; longitude ($\theta$) and latitude ($\phi$) indicators and integrators, the latter for integrating a second pair of signals ultimately derived from said ground speed signals respectively and actuating their associated indicators to provide longitude and latitude indications respectively, said latter integrators respectively providing $\theta$ and $\phi$ output signals representative of the instant flight location in terms of longitude and latitude; means for computing a plurality of earth curvature correction factors as functions of said $\theta$ and $\phi$ signals, for modifying said ground speed signals, to provide said first pair of input signals whereby to cause the plotted instant flight location to be substantially in agreement with the latitude and longitude indications; means for recomputing said first pair of output signals as functions of two of said computed correction factors; means for comparing the recomputed and the thereto corresponding original output signals repsectively to provide a pair of error signals; means responsive to said first pair of integrators for sensing "off map" and "on map" location of the flight; and means for applying said error signals to said first pair of integrators respectively under "off map" condition to prepare for plotting, on attaining the "on map" condition, at a location in agreement with the $\theta$ and $\phi$ indications.

39. Aircraft course recording apparatus comprising a first pair of computers for computing instant aircraft location provided with a first set of indicating elements that are subject to automatic actuation by their respective computers; a second set of indicating elements in the form of a utilization device including projection map means for plotting the flight path of the aircraft; a second pair of computers for computing the instant flight location in terms of orthogonal directions defining the plane of the map, said second set of indicating elements being subject to automatic actuation relative to each other by said second computer pair for relative movement whereby to plot said flight path; means responsive to said second computer pair for sensing conditions of flight location as inside and outside of a predetermined area on the map; means for applying signals derived from the second computer pair, to the first computer pair under "inside predetermined area" conditions to force said first computer pair and the indicating elements actuated thereby into agreement respectively with the second computer pair and the indicating elements actuated thereby; and means for applying signals derived from said first computer pair, to the second computer pair under "outside predetermined area" conditions to prepare said second computer pair for plotting, upon attaining "inside predetermined area" conditions, in agreement with the first indicating element set.

References Cited

UNITED STATES PATENTS

| | | | |
|---|---|---|---|
| 2,616,965 | 11/1952 | Hoeppner | 340—347 |
| 2,794,594 | 6/1957 | Ergen et al. | 235—187 |
| 2,894,685 | 7/1959 | Spencer et al. | 235—150 |
| 2,898,040 | 8/1959 | Steele | 235—151 |
| 2,929,553 | 3/1960 | Child | 235—61 |
| 2,936,950 | 5/1960 | Parsons | 235—61 |
| 2,944,737 | 7/1960 | Cail et al. | 235—151 |
| 2,953,303 | 9/1960 | Sedgfield | 235—187 |
| 3,011,715 | 12/1961 | Goldman | 235—187 |

MALCOLM A. MORRISON, *Primary Examiner.*

MARTIN P. HARTMAN, WALTER W. BURNS, LEO SMILOW, *Examiners.*

K. W. DOBYNS, S. LUBITZ, *Assistant Examiners.*